United States Patent

Bae et al.

(10) Patent No.: US 10,891,005 B2
(45) Date of Patent: Jan. 12, 2021

(54) ELECTRONIC DEVICE WITH BENT DISPLAY AND METHOD FOR CONTROLLING THEREOF

(71) Applicant: SAMSUNG ELECTRONICS CO., LTD., Suwon-si (KR)

(72) Inventors: Yu-dong Bae, Suwon-si (KR); Hyun-sub Park, Suwon-si (KR); Dae-myung Kim, Hwaseong-si (KR); Jin-hyoung Park, Suwon-si (KR); Shi-yun Cho, Anyang-si (KR); So-young Kim, Suwon-si (KR); Hee-seok Jeong, Suwon-si (KR); Ho-seong Seo, Suwon-si (KR); Yu-su Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/842,409

(22) Filed: Sep. 1, 2015

(65) Prior Publication Data

US 2016/0062515 A1 Mar. 3, 2016

(30) Foreign Application Priority Data

Sep. 2, 2014 (KR) .................. 10-2014-0116509
Apr. 10, 2015 (KR) .................. 10-2015-0050967

(51) Int. Cl.
*G06F 3/044* (2006.01)
*G06F 3/041* (2006.01)
*G06F 3/0488* (2013.01)

(52) U.S. Cl.
CPC ............ *G06F 3/044* (2013.01); *G06F 3/0414* (2013.01); *G06F 3/0416* (2013.01);
(Continued)

(58) Field of Classification Search
CPC .......... G06F 3/041–04897; G06F 2203/04104; G06F 2203/04106; G06F 2203/04803; G06F 2203/04808
See application file for complete search history.

(56) References Cited

U.S. PATENT DOCUMENTS 8,195,254 B2   6/2012   Oksman et al.
9,285,989 B2   3/2016   Park et al.
(Continued)

FOREIGN PATENT DOCUMENTS

CN   101432677 A   5/2009
CN   102419687 A   4/2012
(Continued)

OTHER PUBLICATIONS

Communication dated Apr. 22, 2015 issued by the Korean Intellectual Property Office in counterpart Korean Patent Application No. 10-2014-0116509.
(Continued)

*Primary Examiner* — William Boddie
*Assistant Examiner* — Jeffrey Parker
(74) *Attorney, Agent, or Firm* — Sughrue Mion, PLLC

(57) ABSTRACT

A electronic device and a display method thereof are provided. A control method of the electronic device includes: detecting a touch input on an auxiliary display area; in response to a touch input being detected on a first area of the auxiliary display area in a and the electronic being in a state in which the electronic is gripped by a user, processing the touch input as a user input; and, in response to the touch input being detected on a second area of the auxiliary display area different from the first area and the electronic being in the state in which the electronic is gripped by the user, disregarding the touch input.

13 Claims, 81 Drawing Sheets

(52) U.S. Cl.
CPC ........ *G06F 3/0418* (2013.01); *G06F 3/04886* (2013.01); *G06F 2203/04104* (2013.01)

(56) References Cited

U.S. PATENT DOCUMENTS

| | | | |
|---|---|---|---|
| 9,360,952 | B2 | 6/2016 | Lee |
| D770,504 | S | 11/2016 | Kim et al. |
| 10,042,534 | B2 | 8/2018 | Lee |
| 2006/0238517 | A1 | 10/2006 | King et al. |
| 2008/0146285 | A1 | 6/2008 | Lee et al. |
| 2009/0184935 | A1* | 7/2009 | Kim ................ G06F 3/0416 345/173 |
| 2010/0085317 | A1* | 4/2010 | Park ................ G06F 1/1626 345/173 |
| 2012/0032979 | A1 | 2/2012 | Blow et al. |
| 2012/0075212 | A1* | 3/2012 | Park ................ G06F 3/04886 345/173 |
| 2012/0162078 | A1 | 6/2012 | Ferren et al. |
| 2012/0287076 | A1 | 11/2012 | Dao et al. |
| 2013/0002572 | A1 | 1/2013 | Jin et al. |
| 2013/0002593 | A1 | 1/2013 | Mlller et al. |
| 2013/0009890 | A1* | 1/2013 | Kwon ............... G06F 3/04886 345/173 |
| 2013/0033434 | A1 | 2/2013 | Richardson et al. |
| 2013/0073999 | A1 | 3/2013 | Swanson et al. |
| 2013/0076649 | A1 | 3/2013 | Myers et al. |
| 2013/0222286 | A1 | 8/2013 | Kang et al. |
| 2013/0234982 | A1 | 9/2013 | Kang |
| 2013/0237288 | A1 | 9/2013 | Lee |
| 2013/0300697 | A1 | 11/2013 | Kim et al. |
| 2013/0335375 | A1 | 12/2013 | Nishikawa et al. |
| 2014/0125612 | A1 | 5/2014 | Park et al. |
| 2014/0132481 | A1 | 5/2014 | Bell et al. |
| 2014/0240252 | A1 | 8/2014 | Park |
| 2014/0253477 | A1* | 9/2014 | Shim ................ G06F 3/0416 345/173 |
| 2014/0320420 | A1* | 10/2014 | Ida .................. G06F 3/044 345/173 |
| 2015/0242006 | A1 | 8/2015 | Kim et al. |
| 2016/0253076 | A1 | 9/2016 | Lee |
| 2018/0267642 | A1 | 9/2018 | Kim et al. |

FOREIGN PATENT DOCUMENTS

| | | |
|---|---|---|
| CN | 103052937 A | 4/2013 |
| CN | 103718088 A | 4/2014 |
| CN | 104007911 A | 8/2014 |
| EP | 2434385 A2 | 3/2012 |
| EP | 2624120 A2 | 8/2013 |
| EP | 2 713 261 A2 | 4/2014 |
| EP | 2770418 A1 | 8/2014 |
| KR | 10-2012-0101508 | 9/2012 |
| KR | 10-2013-0081617 A | 7/2013 |
| KR | 10-2013-0102834 A | 9/2013 |
| KR | 10-2013-0127050 A | 11/2013 |
| KR | 10-2014-0066253 A | 5/2014 |
| KR | 10-2013-0102298 A | 9/2017 |
| WO | 2007/103631 A2 | 9/2007 |
| WO | 2012/021417 A1 | 2/2012 |
| WO | 2013/021331 A1 | 2/2013 |
| WO | 2013/048881 A1 | 4/2013 |
| WO | 2013/103278 A1 | 7/2013 |

OTHER PUBLICATIONS

Search Report dated Dec. 15, 2015 by the International Searching Authority in related Application No. PCT/KR215/009247, (PCT/ISA/210).
Written Opinion dated Dec. 15, 2015 by the International Searching Authority in related Application No. PCT/KR215/009247, (PCT/ISA/237).
Communication dated Dec. 23, 2015 by the European Patent Office in related Application No. 15183392.8.
Communication dated Jan. 2, 2019, issued by the European Patent Office in counterpart European Application No. 15183392.8.
Communication dated Mar. 27, 2019, issued by the Taiwanese Patent Office in counterpart Taiwanese Application No. 104126773.
Communication dated Jun. 14, 2019, issued by the Chinese Patent Office in counterpart Chinese Application No. 201510557879.4.
Communication dated Jul. 31, 2019, issued by the Taiwan Patent Office in counterpart Taiwan Application No. 104126773.
Communication dated Aug. 10, 2019, issued by the Korean Patent Office in counterpart Korean Application No. 10-2015-0050967.
Communication dated Nov. 4, 2019, from the European Patent Office in counterpart European Application No. 15183392.8.
Communication dated Dec. 30, 2019 by the Indian Patent Office in counterpart Application No. 3271/MUM/2015.
Communication dated Feb. 24, 2020 from the Korean Patent Office in application No. 10-2015-0050967.
Communication dated Mar. 11, 2020 from the European Patent Office in application No. 15183392.8.
Communication dated Apr. 20, 2020 from the Taiwanese Patent Office in application No. 104126773.
Communication dated Nov. 3, 2017, issued by the Australian Patent Office in counterpart Australian Application No. 2015312634.
Communication dated Aug. 6, 2020 issued by the Taiwan Intellectual Property Office in counterpart Taiwan Application No. 104126773.
Communication dated Oct. 9, 2020, issued by the European Patent Office in counterpart Application No. 20173974.5.
Communication dated Oct. 16, 2020, issued by the Korean Intellectual Patent Office in Application No. 10-2015-0050967.

* cited by examiner

ELECTRONIC DEVICE WITH BENT DISPLAY AND METHOD FOR CONTROLLING THEREOF

CROSS-REFERENCE TO RELATED APPLICATION(S)

This application claims priority under 35 U.S.C. § 119(a) from Korean Patent Application No. 10-2014-0116509, filed on Sep. 2, 2014, and Korean Patent Application No. 10-2015-0050967, filed on Apr. 10, 2015, in the Korean Intellectual Property Office, the entire disclosure of which is hereby incorporated by reference.

TECHNICAL FIELD

Apparatuses and methods consistent with exemplary embodiments relate to controlling a electronic device with a bent or curved display and a display method thereof, and more particularly, to controlling a electronic device based on a user's grip of the device, and a display method thereof.

BACKGROUND

With the advancement of digital technology, various electronic devices which are able to communicate and process personal information while being carried. For example, electronic devices such as a Personal Digital Assistant (PDA), an electronic scheduler, a smartphone, a tablet Personal Computer (PC), and the like are coming into the market. Such electronic devices have developed into mobile convergence stages encompassing fields of other terminal devices as well as their traditional fields. For example, the electronic device may perform various functions such as making voice calls, making video calls, message transmission such as a Short Message Service (SMS)/Multimedia Message Service (MMS), electronic scheduling, photographing, exchanging emails, replaying a broadcast, replaying a moving image, Internet, electronic commerce, replaying music, schedule management, Social Networking Service (SNS), find friends service, messenger, dictionary, and the like.

In particular, electronic devices equipped with a bent or curved display, which are implemented by combining a flexible display and a electronic device, are being researched and developed. The flexible display can be freely bent and unbent, and the bent display holds its deformed shape depending on the intended design. In addition, there is a demand for developing electronic devices equipped with a bent display in view of the exterior thereof, and there is also a demand for a method for improving convenience in controlling functions of the electronic device using the bent display mounted in the electronic device.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a electronic device with a bent or curved display, which can reduce unintended malfunctions or erroneous inputs, which may be caused when a user uses the electronic device, and a method for controlling thereof.

One or more exemplary embodiments also provide a electronic device with a bent or curved display, which can reduce unintended malfunctions or erroneous inputs, which may be caused when a user uses a side display area, and a method for controlling thereof.

One or more exemplary embodiments also provide a electronic device, which can reduce unintended malfunctions or inputs by considering various states, orientations, or postures of the electronic device (for example, a state in which the electronic device is gripped or a state in which the electronic device is held).

According to an aspect of an exemplary embodiment, there is provided a control method which is performed by a electronic device which includes a curved display including a main display area and an auxiliary display area corresponding, the control method including: in a state in which the electronic device is gripped by a user, detecting a touch input on the auxiliary display area; in response to the touch input being detected on a first area of the auxiliary display area and the electronic being in a state in which the electronic is gripped by a user, processing the touch input as a user input; and, in response to the touch input being detected on a second area of the auxiliary display area different from the first area and the electronic being in a state in which the electronic is gripped by a user, controlling to disregard the touch input.

The controlling to disregard the touch input may include: deactivating a touch sensor corresponding to the second area or not processing, discarding or disregarding information related to a touch input through the touch sensor corresponding to the second area.

The processing the touch input as the user input may include, in response to a touch input touching a UI element displayed on the first area being detected, executing a function related to the UI element.

Locations of the first area and the second area of the auxiliary display area may vary according to whether the state in which the electronic device is gripped by the user is a state in which the main display is upward facing or downward facing.

Locations of the first area and the second area of the auxiliary display area may vary according to whether the state in which the electronic device is gripped by the user is a state in which the electronic device is gripped by a right hand or a state in which the electronic device is gripped by a left hand.

The control method may further include displaying a UI element on a location of the first area of the auxiliary display area where the touch input is detected.

The control method may further include determining the state of the electronic device, and the determining the state of the electronic device comprises determining whether the electronic device is gripped based on at least one of a location of a touch input on the main display area or the auxiliary display area of the electronic device, information indicating whether a touch input of the user is detected on a rear surface of the electronic device, or motion of the electronic device.

According to an aspect of another exemplary embodiment, there is provided a control method which is performed by a electronic device which includes a curved display including a main display area and an auxiliary display area, the control method including: displaying a UI element on a first location of the auxiliary display area; and, in response to detecting that the electronic device is being gripped by a user, displaying the UI element on a second location of the auxiliary display area different from the first location.

The displaying the UI element on a second location of the auxiliary display area may include: in response to detecting that the electronic device is being gripped by a right hand, displaying the UI element on the second location of the auxiliary display area; and, in response to detecting that the electronic device is being gripped by a left hand, displaying the UI element on a third location of the auxiliary display area different from the second location.

The displaying the UI element on a second location of the auxiliary display area may include: in response to detecting that the electronic device is oriented in a first direction so that a top part of the electronic device is positioned higher than a bottom part of the electronic device, displaying the UI element on the second location of the auxiliary display area; and, in response to detecting that the electronic device is oriented in a second direction so that the top part of the electronic device is positioned lower than the bottom part of the electronic device, displaying the UI element on a third location of the auxiliary display area different from the second location.

According to an aspect of another exemplary embodiment, there is provided a electronic device which includes a curved display including a main display area and an auxiliary display area, the electronic device including: a deformed display including a main display area and an auxiliary display area; a touch sensor configured to detect a touch input; and a controller configured to, in response to the touch input being detected on a first area of the auxiliary display area in a state in which the controller determines that the electronic device is gripped by a user, process the touch input as a user input, and, in response to the touch input being detected on a second area of the auxiliary display area different from the first area in the state in which in which the controller determines that the electronic device is being gripped by the user, control to disregard the touch input.

In response to controlling to disregard the touch input, the controller may be further configured to a touch sensor corresponding to the second area or not to process, discard, or disregard information related to a touch input through the touch sensor corresponding to the second area.

In response to processing the touch input as the user input and a touch input touching a UI element displayed on the first area being detected, the controller may be configured to execute a function related to the UI element.

Locations of the first area and the second area of the auxiliary display area may vary according to whether the state in which main display is upward facing or downward facing.

Locations of the first area and the second area of the auxiliary display area may vary according to whether the state in which the electronic device is gripped by the user is a state in which the electronic device is gripped by a right hand or a state in which the electronic device is gripped by a left hand.

The controller may be configured to control the curved display to display a UI element on a location of the first area of the auxiliary display area where the touch input is detected.

The controller may be configured to determine whether the electronic device is gripped or not or a gripping state based on at least one of a location of a touch input on the main display area or the auxiliary display area of the electronic device, information on whether a touch input of the user is detected on a rear surface of the electronic device, or a motion of the electronic device.

According to an aspect of another exemplary embodiment, there is provided a electronic device which includes a bent display including a main display area and an auxiliary display area, the electronic device including: a deformed display including a main display area and an auxiliary display area; a touch sensor configured to detect a touch input; and a controller configured to, in response to detecting that the electronic device is being gripped by a user while a UI element is displayed on a first location of the auxiliary display area, control the deformed display to display the UI element on a second location of the auxiliary display area different from the first location.

The controller may be configured to, in response to detecting that the electronic device is being gripped by a right hand, control the deformed display to display the UI element on the second location of the auxiliary display area, and, in response to detecting that the electronic device is being gripped by a left hand, control the deformed display to display the UI element on a third location of the auxiliary display area different from the second location.

The controller may be configured to, in response to detecting that the electronic device is oriented in a first direction so that a top part of the electronic device is positioned higher than a bottom part of the electronic device, control the deformed display to display the UI element on the second location of the auxiliary display area, and, in response to detecting that the electronic device is oriented in a second direction so that the top part of the electronic device is positioned lower than the bottom part of the electronic device, control the deformed display to display the UI element on a third location of the auxiliary display area different from the second location.

According to various exemplary embodiments as described above, malfunctions or unwanted input which may be caused unintentionally by a user when the user uses a electronic device with a bent display can be minimized.

In particular, when the user grips the electronic device, the malfunctions and unwanted input are more likely to occur. However, according to various exemplary embodiments, the malfunctions or unwanted input are less likely to occur.

In addition, by adjusting the location of a UI element to be displayed according to a user's gripping state of the electronic device, the user can more easily and conveniently use the electronic device.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1:
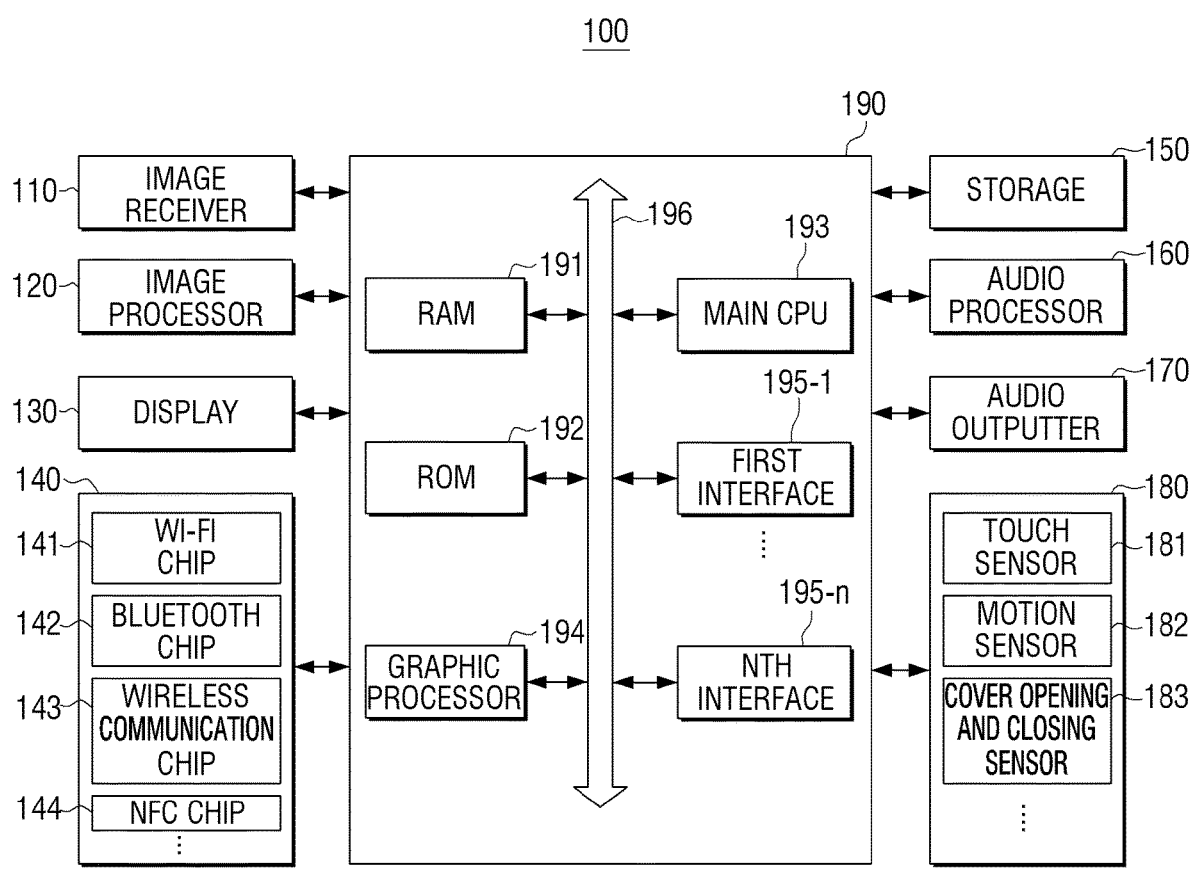
FIG. 1 is a block diagram showing a configuration of a electronic device in detail according to an exemplary embodiment.

Hereinafter, the terms used in exemplary embodiments will be briefly explained, and exemplary embodiments will be described in greater detail with reference to the accompanying drawings.

Although the terms used in the exemplary embodiments are general terms, which are widely used in the present time considering the functions in the present disclosure, the terms may be changed depending on an intention of a person skilled in the art, a precedent, and introduction of new technology. In addition, in a special case, terms selected by the applicant may be used. In this case, the meaning of the terms will be explained in detail in the corresponding detailed descriptions. Therefore, the terms used in the exemplary embodiments should be defined based on the meaning thereof and the descriptions of the present disclosure, rather than based on their names only.

Although specific exemplary embodiments of the present disclosure are illustrated in the drawings and relevant detailed descriptions are provided, various changes can be made and various exemplary embodiments may be provided. Accordingly, various exemplary embodiments of the present disclosure are not limited to the specific embodiments and should be construed as including all changes and/or equivalents or substitutes included in the ideas and technological scopes of exemplary embodiments of the present disclosure. In the following description, well-known functions or constructions are not described in detail since they would obscure the inventive concept in unnecessary detail Although the terms such as "first" and "second" may be used to explain various elements, the elements should not be limited by these terms. These terms may be used for the purpose of distinguishing one element from another element.

As used herein, the singular forms are intended to include the plural forms as well, unless the context clearly indicates otherwise. The terms "include" or "comprise" used in the exemplary embodiments indicate the presence of disclosed corresponding features, numbers, steps, operations, elements, parts or a combination thereof, and do not limit additional one or more features, numbers, steps, operations, elements, parts, or a combination thereof.

"Module" or "Unit" used in the exemplary embodiments perform at least one function or operation and may be implemented by using hardware or software or a combination of hardware and software. In addition, a plurality of "modules" or a plurality of "units" may be integrated into at least one module and implemented by using at least one processor (not shown), except for "modules" or "units" which need to be implemented by using specific hardware.

It will be understood that, when an element is mentioned as being "connected" to another element, the element may be "directly connected" to another element, and may be "electrically connected" to another element with an intervening element between the element and another element. It will be further understood that, when an element "includes" another element, the term "include" do not preclude the presence or addition of one or more other elements.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the inventive concept. In the explanation of the drawings, similar reference numerals are used for similar elements.

The term "cover" used in the exemplary embodiments may be an object or a device for protecting a display by covering a part or entirety of a display area of the electronic device (or portable terminal device). The cover may be electrically or non-electrically connected with the electronic device. In addition, the cover may be connected with the electronic device for communication. In addition, the cover may be removably mounted to the electronic device or removable from the electronic device and thus may be sold or separately provided, or may be integrated into the electronic device and may be sold along with the electronic device.

The term "user input" in the exemplary embodiments may include at least one of a touch input, a bending input, a deformation input, a voice input, a button input, and a multimodal input, but is not limited to these inputs.

The term "touch input" in the exemplary embodiments refers to a touch gesture which is performed by a user on a display and a cover to control a device. In addition, "touch input" may include a touch which is not in contact with the display and is distanced away from the display by more than a predetermined distance (for example, floating or hovering). The touch input may include a touch and hold gesture, a tap gesture which touches and then removes the touch, a double tap gesture, a panning gesture, a flick gesture, and a touch and drag gesture which touches and then moves in one direction while still touching, a pinch gesture, and the like, but is not limited to these.

The term "button input" in the exemplary embodiments refers to an input of a user to control a device by using a physical button attached to the device The term "motion input" in the exemplary embodiments refers to motion which is made by a user for a device to control the device. For example, the motion input may include a user motion of rotating a device, a user motion of tilting a device, and a user motion of moving a device vertically and horizontally.

The term "multi-input" in the exemplary embodiments refers to a combination of two or more input methods. For example, a device may receive a touch input and a motion input of a user, and may receive a touch input and a voice input of a user.

The term "application" in the exemplary embodiments refers to a set of computer programs designed to perform a specific function. There may be various applications in the exemplary embodiments. For example, the application may include a game application, a moving image replay application, a map application, a memo application, a calendar application, a phone book application, a broadcast application, an exercise support application, a payment application, a photo folder application, and the like, but is not limited these.

The term "application identification information" in the exemplary embodiments may be unique information for distinguishing one application from the other applications. For example, the application identification information may include an icon, an index item, link information, and the like, but is not limited these.

The term "User Interface (UI) element" in the exemplary embodiments refers to an element which can interact with a user and thus provide visual, auditory, or olfactory feedback according to a user input. The UI element may be represented in the form of at least one of an image, a text, and a moving image. In addition, an area which does not display the above-described information but can provide feedback according to a user input may be referred to as a UI element. In addition, the UI element may be the above-described application identification information, for example.

FIG. 1 is a block diagram showing a configuration of a electronic device 100 in detail according to an exemplary embodiment.

For example, the electronic device 100 may be a smartphone, a laptop, a PDA, a media player, an MP3 player, a micro server, a Global Positioning System (GPS) device, an electronic book terminal, a digital broadcasting terminal, a kiosk, an electronic album, a navigation device, a wearable device including a wrist watch or a Head-Mounted Display (HMD), and other mobile devices or non-mobile computing devices.

As shown in FIG. 1, the electronic device 100 includes an image receiver 110, an image processor 120, a display 130, a communicator 140 (e.g. a transceiver, etc.), a storage 150 (e.g., a memory, etc.), an audio processor 160, audio outputter 170 (e.g., a speaker, audio output device, etc.), a sensor 180, and a controller 190.

The electronic device 100 shown in FIG. 1 is provided with various functions such as a content providing function, a display function, and the like, and FIG. 1 illustrates the overall elements of the electronic device 100. Therefore, according to an exemplary embodiment, some of the elements shown in FIG. 1 may be omitted or changed and other elements may be added.

The image receiver 110 receives image data via various sources. For example, the image receiver 110 may receive broadcast data from external broadcasting stations, may receive Video on Demand (VOD) data from external servers on a real time basis, and may receive image data from external devices.

The image processor 120 is an element for processing the image data received at the image receiver 110. The image processor 120 may perform various image processing operations such as decoding, scaling, noise filtering, frame rate conversion, resolution conversion, and the like with respect to the image data.

The display 130 displays a video frame which is a result of processing the image data by the image processor 120, or at least one of various screens which are generated by a graphic processor 194.

The display 130 is not limited to a specific implementation. For example, the display 130 may be implemented by using various types of displays such as a Liquid Crystal Display (LCD), an Organic Light Emitting Diode (OLED) display, an Active-Matrix (AM)-OLED, a Plasma Display Panel (PDP), and the like. The display 130 may further include an additional element according to its implementation. For example, when the display 130 is an LCD, the display 130 may include an LCD panel (not shown), a backlight unit (not shown) to supply light to the LCD panel (not shown), and a panel driving substrate (not shown) to drive the panel (not shown). The display 110 may be combined with a touch sensor 181 of the sensor 180 to be provided as a touch screen.

The display 130 may be connected with at least one of a front surface area and a side surface area or a rear surface area of the electronic device 100 in the form of a bent display (i.e. curved display). The bent display may be implemented by using a flexible display, or may be implemented by using a normal display which is not flexible. For example, the bent display may be implemented by connecting a plurality of flat displays with one another.

When the bent display is implemented by using a flexible display, the flexible display may be bent, crooked, or rolled without being damaged through a substrate which is thin and flexible like paper. The flexible display may be manufactured using a plastic substrate as well as a general glass substrate. When the plastic substrate is used, a low-temperature manufacturing processor may be used instead of an existing manufacturing processor in order to prevent damage to the substrate. In addition, the flexible display may have the flexibility to be folded or unfolded by substituting the glass substrate enclosing liquid crystals in the LCD, OLED display, AM-OLED, PDP, and the like, with a plastic film. Such a flexible display is thin and light and is also resistant to a shock. In addition, since the flexible display can be bent, curved, deformed or crooked as described above, it may be manufactured in various forms.

The flexible display may have an active matrix screen of a specific screen size (for example, 3 inches, 4 inches, 4.65 inches, 5 inches, 6.5 inches, 8.4 inches, and the like) according to the size of the electronic device 100, and may be extended to at least one side surface of the electronic device 100 (for example, a surface of at least one of the left side, right side, upper side, and lower side). The flexible display may be folded to have a radius of curvature lower than a radius of curvature allowable in the flexible display and may be connected with the side surface of the electronic device 100.

The communicator 140 is configured to communicate with various kinds of external devices in various communication methods. The communicator 140 includes one or more of a WiFi chip 141, a Bluetooth chip 142, a wireless communication chip 143, and a Near Field Communication (NFC) chip 144. The controller 190 may communicate with the various kinds of external devices using the communicator 140.

In particular, the WiFi chip 141 and the Bluetooth chip 142 communicate in a WiFi method and a Bluetooth method, respectively. When the WiFi chip 141 or the Bluetooth chip 142 is used, a variety of connection information such as an SSID and a session key may be exchanged first, and communication may be established using the connection information, and then a variety of information may be exchanged. The wireless communication chip 143 communicates according to various communication standards such as IEEE, Zigbee, $3^{rd}$ Generation (3G), $3^{rd}$ Generation Partnership Project (3GPP), Long Term Evolution (LTE), and the like. The NFC chip 144 operates in an NFC method using a band of 13.56 MHz from among various RF-ID frequency bands such as 135 kHz, 13.56 MHz, 433 MHz, 860-960 MHz, and 2.45 GHz.

The storage 150 may store various programs and data necessary for the operations of the electronic device 100.

The storage 150 may include a non-volatile memory, a volatile memory, a flash memory, a Hard Disk Drive (HHD), or a Solid State Drive (SSD). The storage 150 may be accessed by the controller 190 and may read/record/correct/delete/update data under the control of the controller 190. The term "storage" used in the present disclosure may include the storage 150, a Read Only Memory (ROM) in the controller 190, and a memory card (not shown) (for example, a micro SD card, a memory stick) mounted in a Random Access Memory (RAM) or the electronic device 100.

Specifically, the storage 150 may store programs and data for configuring various screens to be displayed on a display area.

Figure 2:
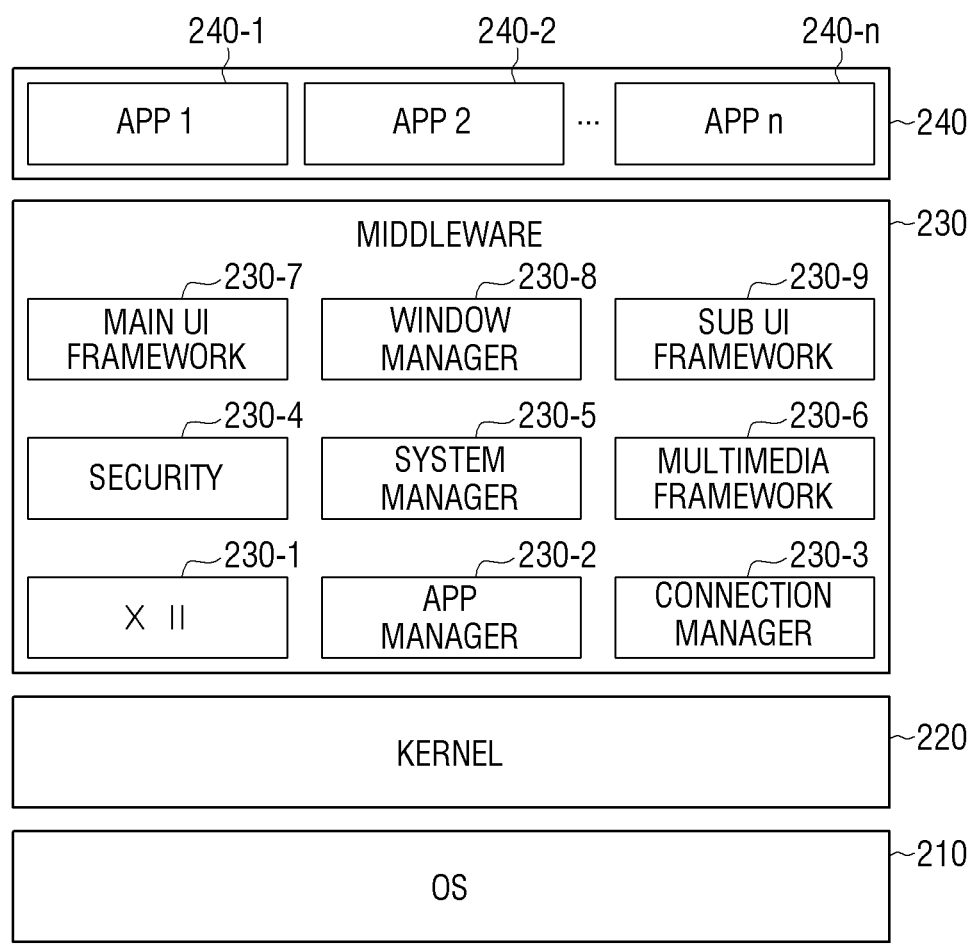
FIG. 2 is a view to explain a configuration of software stored in a electronic device according to an exemplary embodiment.

Hereinafter, a configuration of software stored in the electronic device 100 will be explained with reference to FIG. 2. Referring to FIG. 2, software including an Operating System (OS) 210, a kernel 220, middleware 230, an application 240, and the like may be stored in the storage 150.

The OS 210 controls and manages the overall operations of the hardware. That is, the OS 210 is a layer which is responsible for basic functions such as hardware management, memory, and security.

The kernel 220 serves as a channel to transmit various signals including a touch signal detected in the display 130 to the middleware 230.

The middleware 230 includes various software modules to control the operations of the electronic device 100. Referring to FIG. 2, the middleware 230 includes an X11 module 230-1, an APP manager 230-2, a connection manger 230-3, a security module 230-4, a system manager 230-5, a multimedia framework 230-6, a User Interface (UI) framework 230-7, a window manager 230-8, and a sub-UI framework 230-9.

The X11 module 230-1 receives various event signals from a variety of hardware provided in the electronic device 100. The event recited herein refers to an event in which a user gesture is detected, an event in which a system alarm is generated, an event in which a specific program is executed or ends, or the like.

The APP manager 230-2 manages the execution states of various applications 240 installed in the storage 150. In response to an application execution event being detected by the X11 module 230-1, the APP manager 230-2 calls and executes an application corresponding to the event.

The connection manager 230-3 supports wired or wireless network connections. The connection manager 230-3 may include various sub modules such as a DNET module, a Universal Plug and Play (UPnP) module, and the like.

The security module 230-4 supports certification, permission, secure storage for the hardware.

The system manager 230-5 monitors the states of the elements of the electronic device 100, and provides the result of the monitoring to the other modules. For example, in response to a battery life level being low, an error being generated, or communication being disconnected, the system manager 230-5 provides the result of the monitoring to the main UI framework 230-7 or the sub UI framework 230-9 and output a notification message or a notification sound.

The multimedia framework 230-6 reproduces multimedia contents which are stored in the electronic device 100 or provided from external sources. The multimedia framework 230-6 may include a player module, a camcorder module, a sound processing module, and the like. Accordingly, the multimedia framework 230-6 may reproduce various multimedia contents, generate a screen and a sound, and reproduce the same.

The main UI framework 230-7 provides various UIs to be displayed on a main area of the display 130, and the sub UI framework 230-9 provides various UIs to be displayed on a sub area. The main UI framework 230-7 and the sub UI framework 230-9 may include an image compositor module to configure various UI elements, a coordinates compositor module to calculate coordinates for displaying the UI elements, a rendering module to render the configured UI elements on the calculated coordinates, a 2D/3D UI toolkit to provide a tool for configuring a UI in the form of 2D or 3D.

The window manager 230-8 may detect a touch event which is generated using a user's body or a pen, or other input events. When such an event is detected, the window manager 230-8 transmits an event signal to the main UI framework 230-7 or the sub UI framework 230-9 such that an operation corresponding to the event is performed.

In addition, various program modules such as a writing module which, when the user touches or drags on the screen, draws a line by tracing the dragged line, or an angle calculation module which calculates a pitch angle, a roll angle, and a yaw angle based on a sensor value detected by a motion sensor 182 may be stored.

The application module 240 includes applications 240-1 to 240-n to support various functions. For example, the application module 240 may include program modules to provide various services, such as a navigation program module, a game module, an electronic book module, a calendar module, a notification management module, and the like. The applications may be set as default or may be temporarily set and used when the user uses the applications. When a UI element is selected, the main CPU 193 may execute an application corresponding to the selected UI element using the application module 240.

The software configuration shown in FIG. 2 is merely an example and is not limited to this. Therefore, some of the elements may be omitted or changed or an element may be added when necessary. For example, the storage 150 may be additionally provided with various programs such as a sensing module to analyze signals sensed by various sensors, a messaging module such as a messenger program, a Short Message Service (SMS) & Multimedia Message Service (MMS) program, and an email program, a call information aggregator program module, a VoIP module, a web browser module, and the like.

Referring back to FIG. 1, the audio processor 160 processes audio data of image content. The audio processor 160 may perform various processing operations such as decoding, amplifying, noise filtering, and the like with respect to the audio data. The audio data processed by the audio processor 160 may be outputted to the audio outputter 170.

The audio outputter 170 may be configured to output various notification sounds or voice messages as well as various audio data which undergone various processing operations such as decoding, amplifying, and noise filtering in the audio processor 160. In particular, the audio outputter 170 may be implemented by using a speaker. However, this is merely an example and the audio outputter 170 may be implemented by using an output terminal which can output audio data.

The sensor 180 detects a variety of user interaction. The sensor 180 may detect at least one of various changes such as state, orientation, or a posture change, a luminance change, an acceleration change of the electronic device 100, and transmit a corresponding electric signal to the controller 390. That is, the sensor 180 may detect a state change which is made based on the electronic device 100, generate a corresponding detection signal, and transmits the same to the controller 390. The sensor 180 may include various sensors. When the electronic device 100 is driven (or based on user settings), power is supplied to at least one sensor set under the control of the sensor 180 and the sensor detects a state change.

The sensor 180 may include at least one device of all types of sensing devices which are able to detect the state change of the electronic device 100. For example, the sensor 180 may include at least one sensor of various sensing devices such as a touch sensor, an acceleration sensor, a gyro sensor, an luminance sensor, a proximity sensor, a pressure sensor, a noise sensor (for example, a microphone), a video sensor (for example, a camera module), and a timer.

The sensor 180 may be divided into the touch sensor 181, the motion sensor 182, and a cover opening and closing sensor 183 according to a sensing purpose, as shown in FIG. 1. However, this should not be considered as limiting and the sensor 180 may be divided according to other purposes. This does not mean physical division and at least one sensor may be combined to serve as the sensors 181, 182, and 183. In addition, some of the elements or functions of the sensor 180 may be included in the controller 190 according to an implementation method.

For example, the touch sensor 181 may detect a user's touch input using a touch sensor attached to a rear surface of a display panel. The controller 190 may determine the type of touch input (for example, a tap gesture, a double tap gesture, a panning gesture, a flick gesture, a touch and drag gesture, and the like) by acquiring information on touch coordinates and touch time from the touch sensor 181. In addition, the touch sensor 181 may determine the type of touch input for itself using the touch coordinates and the touch time acquired by the touch sensor 181.

The cover opening and closing sensor 183 may determine whether a cover connected with the electronic device 100 is opened or closed using at least one of a hall sensor, a luminance sensor, and a pressure sensor. The hall sensor is an element in which voltage changes according to a magnitude of an electric field, and may detect a potential difference of electricity flowing in a conductor when the cover is opened or closed. The controller 190 may acquire the potential difference which is generated when the cover is opened or closed from the cover opening and closing sensor 183, and determine whether the cover is opened or closed using information related to the acquired potential difference.

In addition, when the luminance sensor is used, the luminance sensor may detect an electric signal which is generated by the change in ambient luminance according to whether the cover is opened or closed. The controller 190 may determine whether the cover is opened or closed by comparing the result of detecting by the cover opening and closing sensor 183 and a pre-set reference value. For example, when the brightest luminance that can be measured by the luminance sensor is 100, the darkest luminance is 0, and luminance of the pre-set reference value is 30, and when the luminance value measured by the luminance sensor is less than or equal to the reference value of 30, the controller 190 may determine whether the cover is closed.

Figure 4:
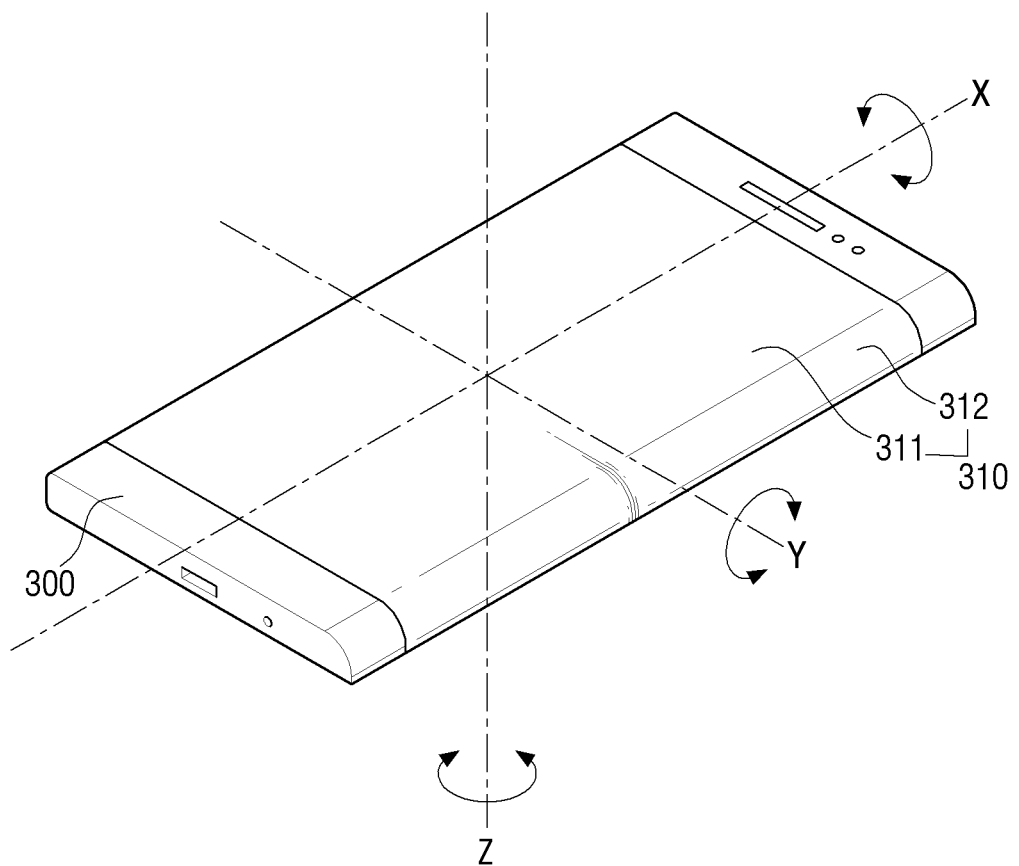
FIG. 4 is a view showing a motion of a electronic device according to an exemplary embodiment.

The motion sensor 182 may detect the motion (for example, rotation, tilting and the like) of the electronic device 100 using at least one of an acceleration sensor, a tilt sensor, and a gyro sensor, a 3-axis magnetic sensor. The motion sensor 182 may transmit a generated electric signal to the controller 190. For example, when the acceleration sensor is used, the motion sensor 182 may measure gravitational acceleration for each of the X-axis, Y-axis, and Z-axis with reference to the electronic device 100, as shown in FIG. 4. In particular, the motion sensor 182 may measure acceleration added with motion acceleration and gravitational acceleration of the electronic device 100. However, when there is no motion in the electronic device 100, only the gravitational acceleration may be measured. For example, the following explanation is made on the assumption that, when the electronic device 100 is placed its front surface up, the gravitational acceleration is a positive (+) direction, and, when the electronic device 100 is placed its rear surface up, the gravitational acceleration is a negative (−) direction.

As shown in FIG. 4, when the electronic device 100 is placed with its rear surface being in contact with the plane surface, as the gravitational acceleration measured by the motion sensor 182, the X-axis and Y-axis components measure 0 m/sec^2, and the Z-axis component measures a specific positive value (for example, +9.8 m/sec^2). On the other hand, when the electronic device 100 is placed with its front surface being in contact with the plane surface, as the gravitational acceleration measured by the motion sensor 182, the X-axis and Y-axis components measure 0 m/sec^2, and the Z-axis component measures a specific negative value (for example, −9.8 m/sec^2).

In addition, when the electronic device 100 is placed obliquely with respect to the surface of a table, as the gravitational acceleration measured by the motion sensor 182, at least one axis measures a value other than 0 m/sec^2. In this case, the square root of a sum of squares of the three axis components, that is, the vector sum, may be the above-mentioned specific value (for example, 9.8 m/sec^2). In the above example, the motion sensor 182 detects the acceleration for each of the X-axis, Y-axis, and Z-axis directions on the coordinate system. The axes and gravitational acceleration corresponding to the axes may be changed according to the location where the sensor is attached.

When the gravitational acceleration transmitted from the motion sensor 182 is measured by at least one axis component, the controller 190 may determine (calculate) the state, orientation, or posture of the electronic device 100 placed using the acceleration for each of the exes. The state, orientation, or posture may be indicated by a roll angle ($\Phi$), a pitch angle ($\theta$), and a yaw angle ($\psi$). The roll angle ($\Phi$) indicates a rotation angle with reference to the X-axis in FIG. 4, the pitch angle ($\theta$) indicates a rotation angle with reference to the Y-axis in FIG. 4, and the yaw angle ($\psi$) indicates a rotational angle with reference to the Z-axis in FIG. 4. In the example shown in FIG. 4, when the Z-axis gravitational acceleration of the gravitational acceleration transmitted from the motion sensor 182 is +9.8 m/sec^2, the roll angle ($\Phi$) and the pitch angle ($\theta$) are '0' and thus the state, orientation, or posture of the electronic device 100 placed is determined to be a state, orientation, or posture in which the rear surface subject to the gravitational acceleration of the Z-axis is placed in the direction of gravity. In the above-described method, the controller 190 may detect any state, orientation, or posture of the electronic device 100, and a state, orientation, or posture detector for detecting the state, orientation, or posture of the electronic device 100 may be additionally implemented.

The controller 190 may determine the state, orientation, or posture of the electronic device 100 using an algorithm such as a state, orientation, or posture calculation algorithm using an Euler angle, a state, orientation, or posture calculation algorithm using an extended Kalman filter, and an acceleration estimation switching algorithm. That is, the method for measuring the state, orientation, or posture of the electronic device 100 using an accelerometer may be implemented in various ways according to an exemplary embodiment.

The controller 190 controls the overall operations of the electronic device 100 using various programs stored in the storage 150.

As shown in FIG. 1, the controller 190 includes a Random Access Memory (RAM) 191, a Read Only Memory (ROM) 192, a graphic processor 193, a main CPU 194, first to nth interfaces 195-1 to 195-*n*, and a bus 196. In this case, the RAM 191, the ROM 192, the graphic processor 193, the main CPU 194, and the first to nth interfaces 195-1 to 195-*n* may be connected with one another via the bus 196.

The ROM 192 stores a set of commands for booting a system. When a turn-on command is input and power is supplied, the main CPU 194 copies an O/S stored in the storage 150 onto the RAM 191 according to the command stored in the ROM 192, executes the O/S and boots the system. When booting is completed, the main CPU 194 copies various application programs stored in the storage 150 onto the RAM 191, executes the application programs copied onto the RAM 191, and performs various operations.

The graphic processor 193 generates a screen including various objects such as an item, an image, a text, and the like, using a calculator (not shown) and a renderer (not shown). The calculator calculates attribute values of the objects to be displayed such as coordinate values, shape, size, color, and the like of the objects according to the layout of the screen using a control command received from the sensor 180. The renderer generates the screen of various layouts including the objects based on the attribute values calculated by the calculator. The screen generated by the renderer is displayed on a display area of the display 130.

The main CPU 194 accesses the storage 150 and performs booting using the O/S stored in the storage 150. In addition, the main CPU 194 performs various operations using various programs, contents, and data stored in the storage 150.

The first to nth interfaces 195-1 to 195-*n* are connected with the above-described various elements. One of the interfaces may be a network interface which is connected with an external device through a network.

In particular, when a touch input is detected on a first area of a side display area in response to the touch input detected by the sensor 180, in a state in which the electronic device 100 is gripped by the user, the controller 190 processes the touch input as a user input. When a touch input is detected on a second area different from the first area of the side display area, the controller 190 may control to disregard the touch input. In addition, while a UI element is displayed on a first location of the side display area, the controller 190 may determine whether the electronic device 100 is gripped by the user based on the information detected by the sensor. In response to the electronic device 100 being gripped, the controller 190 may display a UI element which is displayed on a second location of the side display area different the first location.

FIGS. 3A to 3D are views showing an example of a electronic device 100 according to exemplary embodiments.

As shown in FIGS. 3A to 3D, the electronic device 100 according to an exemplary embodiment includes a bent display 310, a body 300 in which the bent display 310 is seated and secured, and additional devices which are disposed in the body 300 to perform the functions of the electronic device 100. The additional devices may include a speaker 321, a sensor (for example, a luminance sensor 322, a front camera module 323, and the like), a connection interface 324 (for example, a charging port, a data input/output port, and an audio input/output port), a microphone 325, and/or a physical button (not shown).

The "bent display area" used in exemplary embodiments refers to an area on the bent display 310 in which data is displayed. In addition, the "display area" refers to an area on the bent display and a flat display which is not bent, in which data is displayed. The data includes all kinds of information which can be displayed on the display area, such as an image, a text, and a moving image, and may be displayed through various screens. The screen may include a single layer or a plurality of layers. The plurality of layers may be superimposed one on another serially, configuring the screen. In this case, the user may recognize a variety of data arranged on the plurality of layers as a single screen.

Figure 3A:
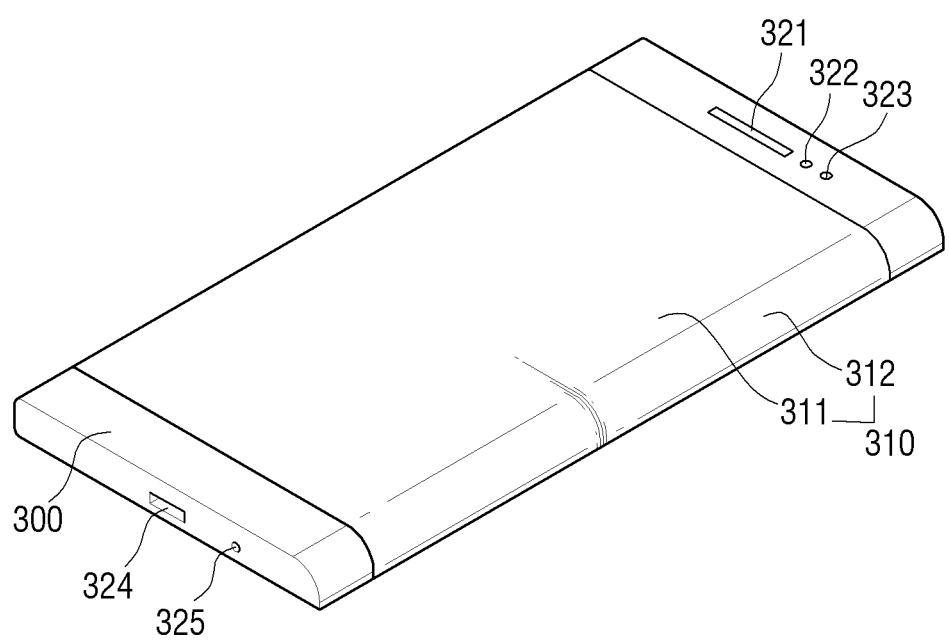
FIGS. 3A to 3D are views illustrating examples of a electronic device according to exemplary embodiments.
Figure 3B:
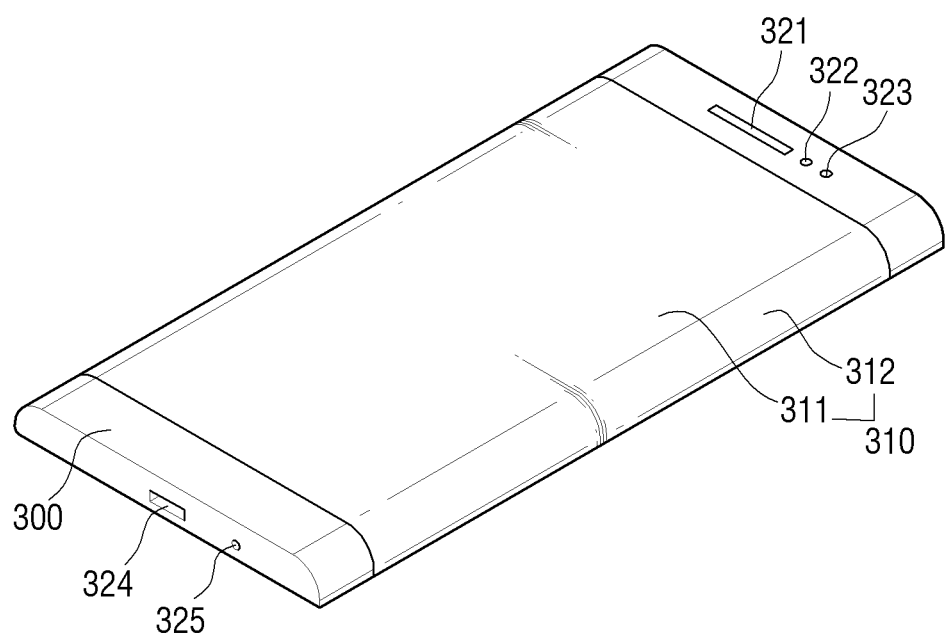
Figure 3C:
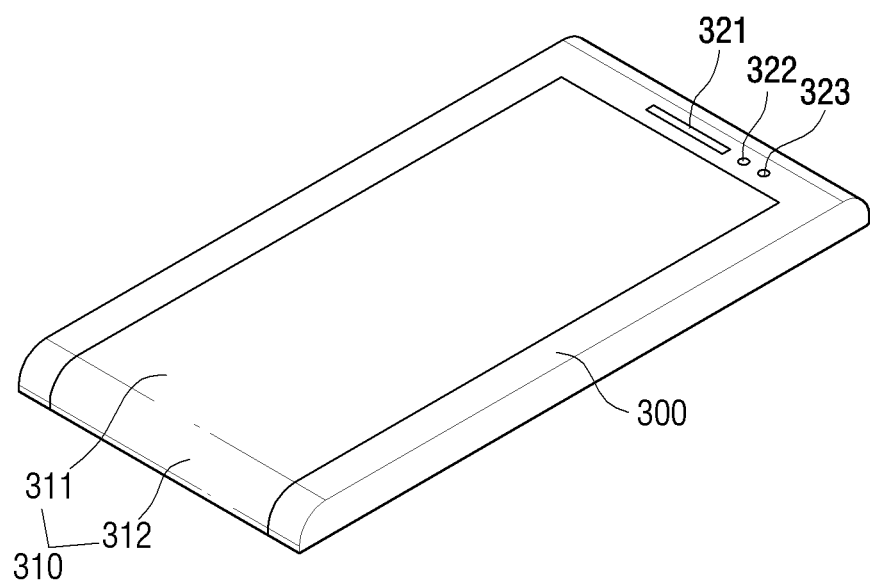

In addition, in the electronic device 100 having the bent display as shown in FIGS. 3A to 3C, the bent display area 311 corresponding to the front surface of the electronic device 100 is referred to as a front display area 311 or a main display area 311, and the display area 312 corresponding to the side surface of the electronic device 100 is referred to as a side display area 312, a sub display area 312 or an auxiliary display area.

Figure 3D:
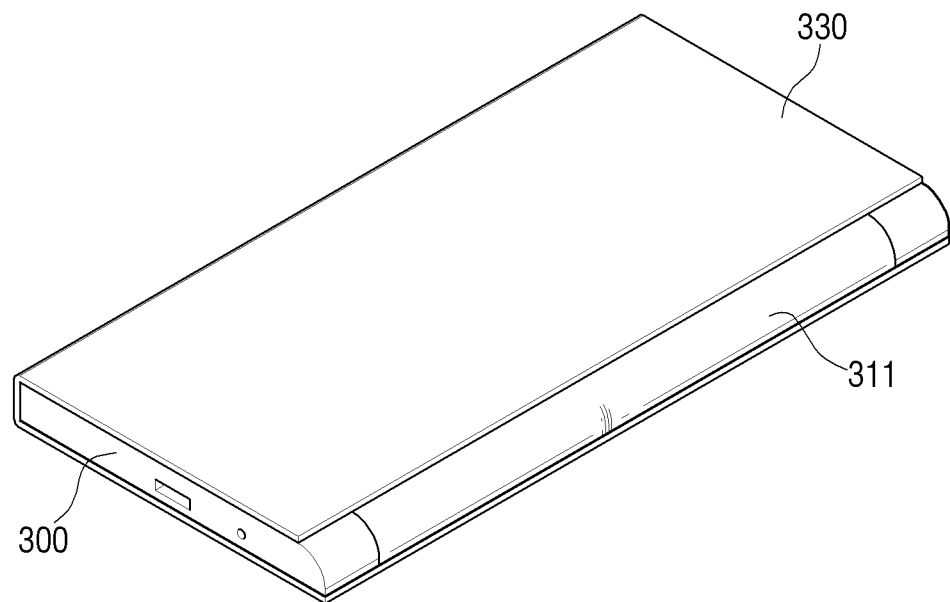
Figure 3D:
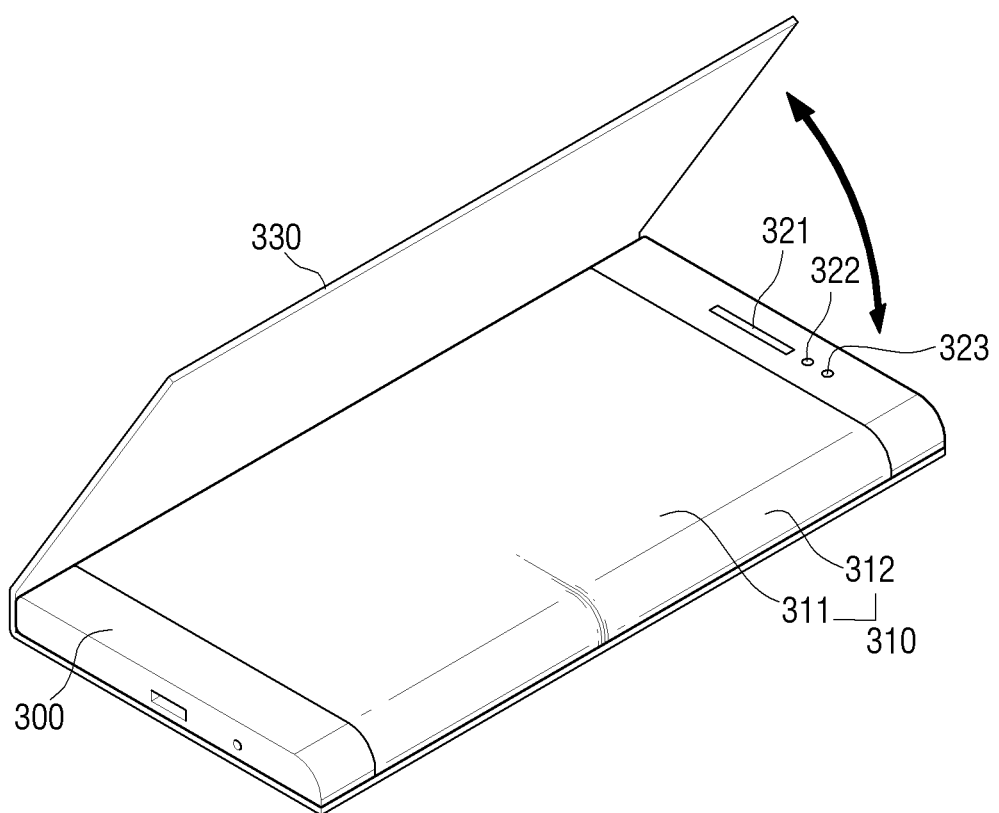

In addition, in the case of the electronic device 100 having both a bent display and a cover as shown in FIG. 3D, when the electronic device 100 has its front surface covered by the cover 330, the display area on the front surface of the electronic device 100 covered by the cover is referred to as a front display area 311, a main display area 311, or a display area 311 in the cover. On the other hand, the display area on the side surface of the electronic device 100 which is not covered by the cover 330 is referred to as a side display area 312, a sub display area 312, a display area 312 out of the cover, or an exposed display area 312.

Figure 5:
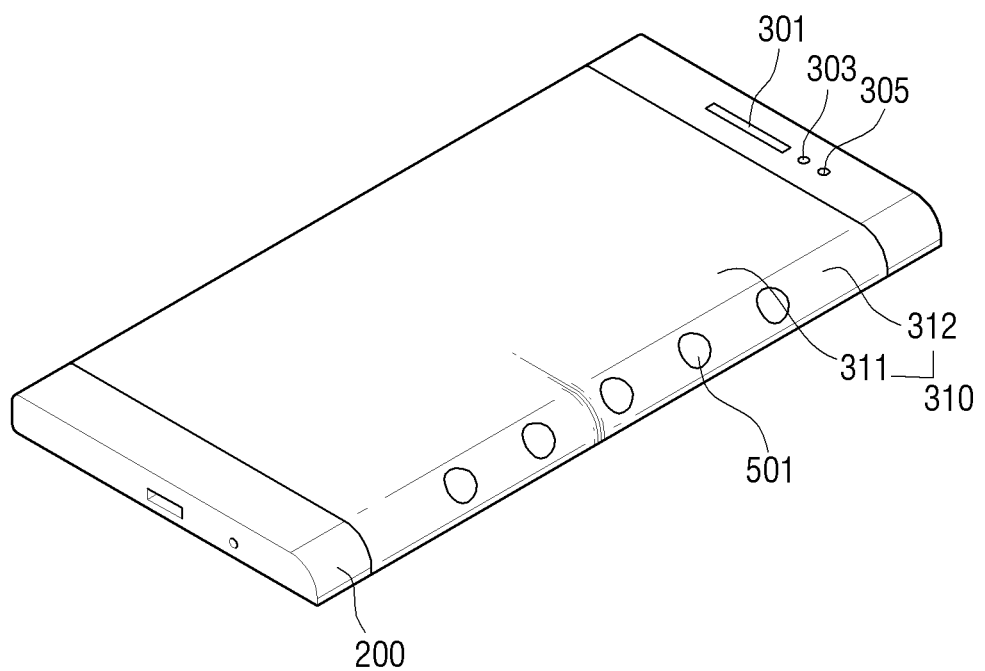
FIG. 5 is a view showing a electronic device which provides notification information according to an exemplary embodiment.

FIG. 5 is a view showing a electronic device 100 which provides notification information according to an exemplary embodiment.

Referring to FIG. 5, the electronic device 100 may provide notification information 501 using the side display area. The notification information 501 may refer to information which is received from another external device. For example, the notification information 501 may include an event such as call reception, message reception (for example, message reception based on SMS/MMS), mail reception, information reception of a push service, notification reception of a SNS. In addition, the notification information 501 may refer to information which is generated in the electronic device 100 and is related to the current state of the electronic device 100. For example, the notification information 501 may include information on a remaining battery life of the electronic device 100, a current time, a connection state of a long-distance or short-distance network of the electronic device 100, a reception mode state of the electronic device (for example, a vibrate mode, a silent mode, a sound mode, and the like), or presence/absence of notification information set by the user.

According to an exemplary embodiment, in response to the notification information 501 being generated in a state in which the front display area of the electronic device 100 is not used (for example, the front display area is hidden by other objects (for example, the cover of the electronic device 100, a notebook, etc.), or the electronic device 100 is placed its front surface down in contact with the surface of a table), the electronic device 100 provides the notification information 501 through the side display area 312. This case may include a case in which the user places the electronic device 100 upside down on the table in a meeting. That is, the user may change the state of the electronic device 100 as in the case in which the electronic device 100 is placed its front display area down in contact with the surface of the table. In addition, the front display area of the electronic device 100 may be hidden by a separate cover as shown in FIG. 3D or hidden by a notebook.

In this state, the electronic device 100 may detect the state of the electronic device 100 and enter a side display using mode. The state of the electronic device 100 may be detected by an luminance sensor which detects a change in the amount of light, a sensor for detecting the state, orientation, or posture of the electronic device 100 (for example, a geomagnetic sensor, an acceleration sensor, etc.), a hall sensor, a timer, and the like. The sensors may be integrated into a single chip or the plurality of sensors may be implemented as separate chips. For example, the electronic device 100 may determine the current state based on a luminance value detected by the luminance sensor. In addition, the electronic device 100 may determine the current state based on state, orientation, or posture information (for example, measurement values for the x-axis, y-axis, and z-axis) detected by the motion sensor. In addition, the electronic device 100 may determine the current state based on a current time detected by the timer. When the timer is used, the electronic device 100 may determine whether the current time corresponds to a time zone set by the user to automatically execute a manner notification mode, and may enter the manner notification mode in response to the current time corresponding to the time set by the user.

As described above, in response to the front display area of the electronic device 100 being hidden and the side display area using mode being executed, the front display area may be processed in monochrome (for example, black), or power is divided into power for the front display area and power for the side display area and the power for the front display area is shut off. In this case, in the side display using mode, only the screen is output and a sound output or a vibrate output may be omitted. This may be set variously by the user.

In addition, a right hand mode and a left hand mode of the electronic device 100 may be defined through environment settings or a separate application provided by the electronic device 100. In this case, the electronic device 100 may operate only the side display area corresponding to the determined mode. For example, in a state in which the electronic device 100 has both the right side display area and the left side display area as shown in FIG. 3B, in response to the right hand mode being set, the electronic device 100 may output the notification information using the right side display area, and, in response to the left hand mode being set, the electronic device 100 may output the notification information using the left side display area.

FIGS. 6A to 21 are views showing a process of controlling a electronic device 100 according to exemplary embodiments.

According to an exemplary embodiment, in a state in which the electronic device 100 is gripped by the user, the sensor 180 may detect a touch input on the side display area. In this case, in response to the touch input being detected on a first location of the side display area, the controller 190 may process the detected touch input as a user input, and, in response to the touch input being detected on a second location different from the first location, the controller 190 may disregard or discard the detected touch input.

Figure 6A:
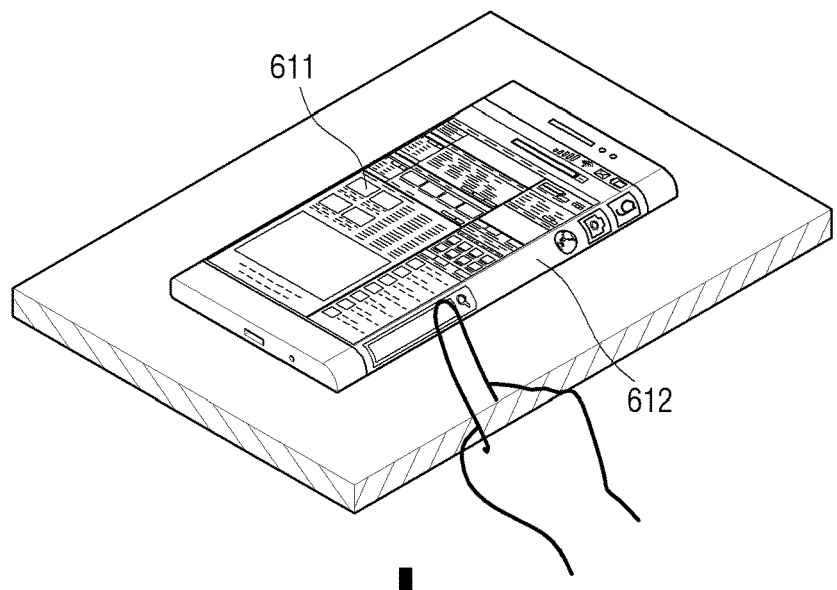
FIGS. 6A to 21 are views showing a process of controlling a electronic device according to exemplary embodiments.
Figure 6A:
Figure 6A:
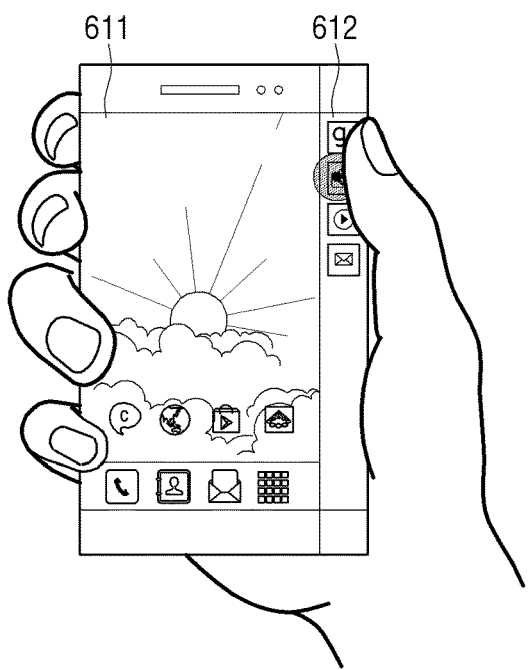

In a state in which the portable display device 100 is placed on a floor or fixed in a holder as shown in view 610 of FIG. 6A, the controller 190 may display at least one UI element on a side display area 612 while displaying a UI element on display area 611. In this case, the UI element may be displayed on a certain area of the side display area 612.

The electronic device 100 may be gripped by the user as shown in view 620 of FIG. 6A. In this case, the controller 190 may use sensor information acquired by the sensor 180 to determine whether the electronic device 100 is gripped or not and may also determine a shape of the grip or grip locations.

For example, the controller 190 may detect the motion of the electronic device 100 using information acquired by the acceleration sensor, and, in response to detecting the user in front of the electronic device 100 using information acquired by the proximity sensor or camera within a predetermined time (for example, 1-1.5 seconds), the controller 190 may determine that the electronic device 100 is gripped.

Figure 7A:
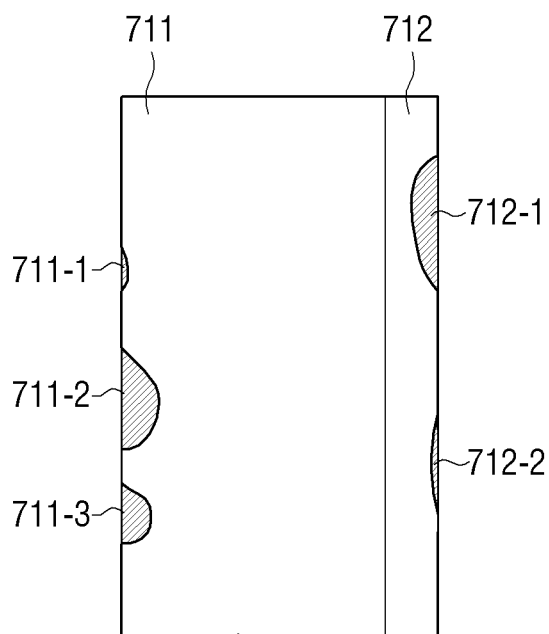
Figure 7B:
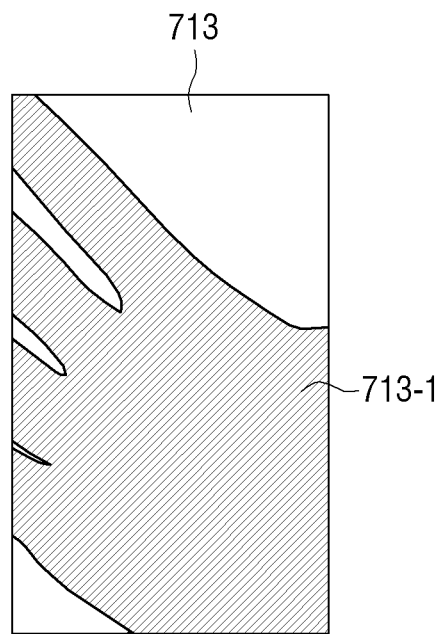

In addition, in response to a touch input on the bent display being determined to correspond to one gripping pattern from among gripping patterns corresponding to various gripping shapes, the controller 190 may determine the gripping shape of the electronic device 100 according to the determined gripping pattern. Specifically, as shown in FIG. 7A, areas 711-1, 711-2, and 711-3 on a front display area 711 corresponding to the middle finger, ring finger, and little finger, respectively, and areas 712-1 and 712-2 on a side display area 712 corresponding to the thumb and palm, respectively, may be pre-set as a gripping pattern. In this case, in response to a touch input on the bent display being determined to be performed in the area of the gripping pattern or to have a similar shape to the gripping pattern, the controller 190 may determine that the electronic device 100 is gripped by the right hand. In addition, as shown in FIG. 7B, an area 713-1 on a rear surface 713 of the electronic device 100 corresponding to the palm may be pre-set as a gripping pattern. In this case, in response to a touch input on the rear surface 713 of the electronic device 100 being determined to be performed in the area of the gripping pattern or to have a similar shape to the gripping pattern, the controller 190 may determine that the electronic device 100 is gripped by the right hand. Alternatively, in response to a touch input being detected on the rear surface 713 of the electronic device 100, the controller 190 may determine that the electronic device 100 is gripped. In addition, the controller 190 may determine whether the electronic device 100 is gripped or not or a gripping shape by considering the number of touch inputs on the bent display. For example, in response to three or more touch inputs being inputted on the bent display within a predetermined time, the controller 190 may determine that the electronic device 100 is gripped. In this case, the three touch inputs may correspond to the middle finger, little finger, and ring finger touching the front display area, for example.

Figure 6B:
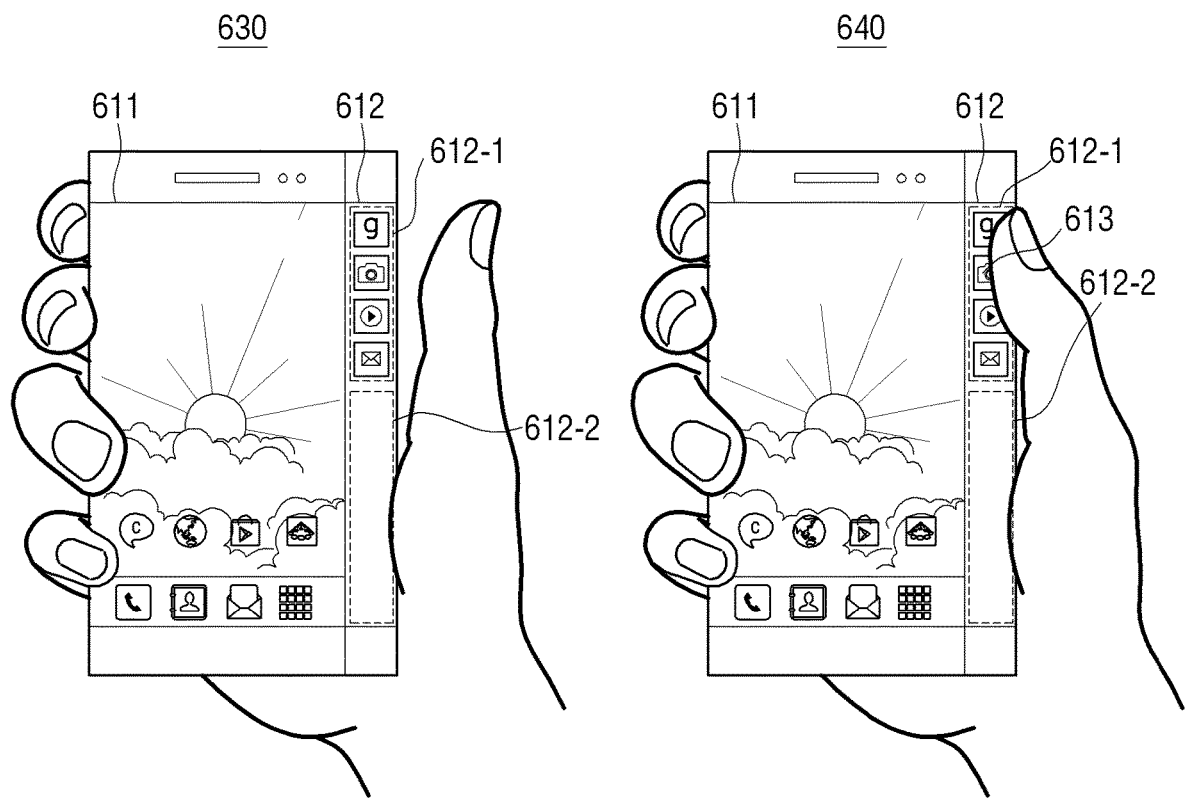

In the state in which the electronic device 100 is gripped, the sensor 180 may detect a user input taking the thumb off the side display area 612 as shown in view 630 of FIG. 6B. In this case, the controller 190 may control the display 130 to display at least one UI element on a first area 612-1 of the side display area 612. In addition, the controller 190 may control the display 130 not to display the UI element on a second area 612-2 of the side display area 612. Herein, the first area 612-1 and the second area 612-2 may be determined by considering locations where the user can touch the side display area 612 with the user's thumb.

Figure 8:
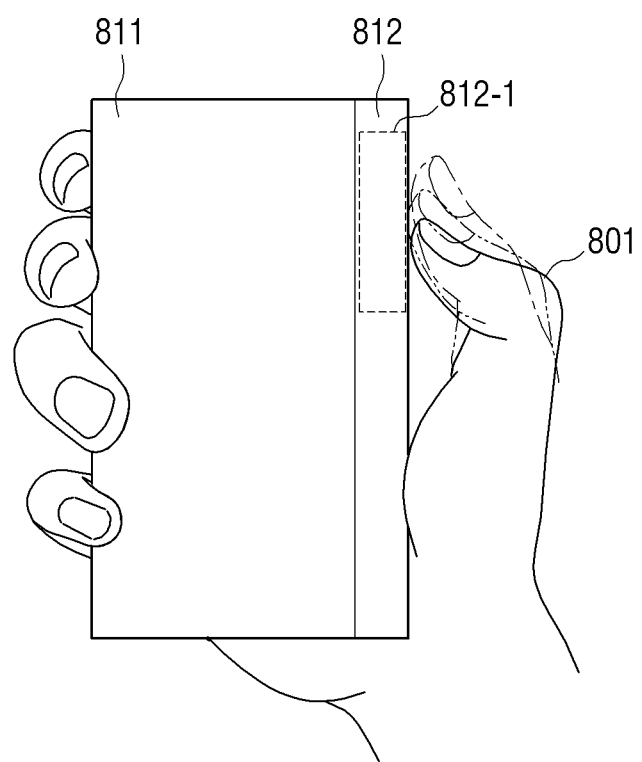

Referring to FIG. 8, when the user grips the electronic device 100, the area that the user can touch using the user's thumb 801 on the side display area 812 may be limited. In general, it is easy for the user to touch a UI element on the side display area 812 using only the thumb 801 while fixing the user's palm 802 on the side display area 812. Therefore, the area where the UI element is displayed may be limited to a range 812-1 from a location that the user can touch by bending the user's thumb 801 to a location that the user can touch by stretching the user's thumb 801. In addition, the area where the UI element is displayed may be changed by considering an area that the palm touches on the side display area 812, or may be determined by considering the age, sex, and hand size of the user.

In addition, as shown in view 640 of FIG. 6B, the sensor 180 may detect a user input touching a UI element 613 on the first area 612-1 again. In this case, the controller 190 may disregard a user touch which is made on the side display area 612 when the electronic device 100 is initially gripped. In response to the user touch input removing the finger after the initial gripping and then touching again, when the touch input is detected on the first area 612-1 of the side display area 612, the controller 190 may process the touch input as a user input, and, when the touch input is detected on the second area 612-2 of the side display area 612, the controller 190 may disregard the touch input. The disregarding the touch input may include controlling, by the controller 190, the sensor 180 to deactivate the touch sensor corresponding to the second area, or not processing or discarding information on a touch input through the sensor 180.

For example, the controller 190 may limit the amount of charge provided by the touch panel to be lower than a predetermined value, or may deactivate at least one of the elements related to touch detection, such that the touch sensor corresponding to the second area 612-2 does not detect the touch of the second area 612-2. In addition, even in response to receiving signals of information (for example, a touch location, a touch direction, and touch time) on the touch input generated in the touch sensor corresponding to the second area 612-2 through the sensor 180, the controller 190 may process the output value related to the touch input to be null or process a function of limiting so as not to provide visual feedback corresponding to the touch input.

Next, in response to the user input on the UI element, the controller 190 may perform a function corresponding to the UI element 613. For example, when the UI element 613 is application identification information, the function corresponding to the UI element may be an application execution screen.

According to another exemplary embodiment, the display 100 may display a UI element on a first location of the side display area. In response to the electronic device 100 being gripped by the user, the electronic device 100 may display the UI element on a second location of the side display area different from the first location.

Figure 9:
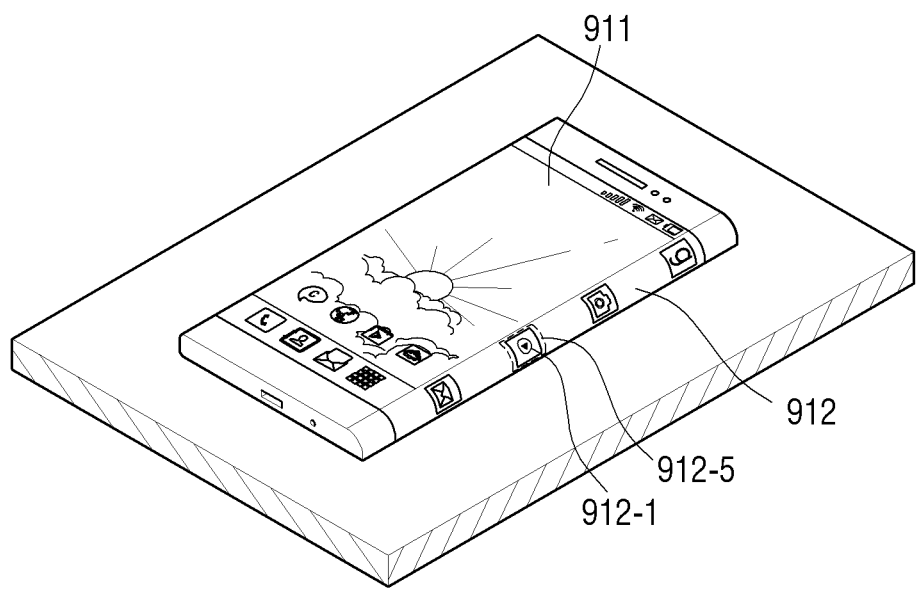
Figure 9:
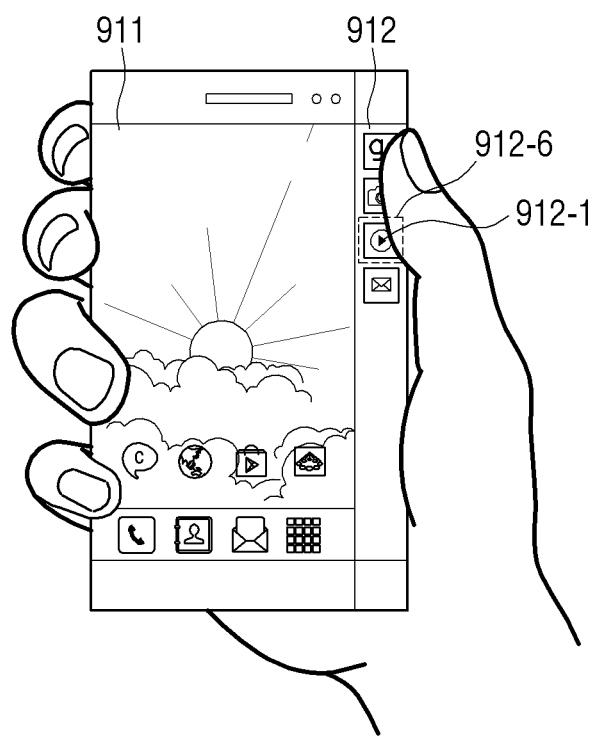

As shown in view 910 of FIG. 9, in the state in which the electronic device 100 is placed on the floor or fixed in the holder, the controller 190 may display a UI element 912-1 on a first location 912-5, which is a certain location of the side display area 912. For example, the certain location where the UI element 912-1 is displayed may be located on the lower end of the side display area 912, but is not limited to this.

In addition, as shown in view 920 of FIG. 9, the electronic device 100 may be gripped by the user. In this case, the controller 190 may control the display 130 to display, on a second location 912-6, the UI element 912-1 which has been displayed on the first location 912-5 in the side display area 912. That is, the controller 190 may move the location where the UI element 912-1 is displayed to a location that is easy for the user to touch based on the grip of the user, the location of the user's fingers and thumb, and state, posture, or orientation of the electronic device 100. For example, as explained in FIG. 8, while the electronic device 100 is gripped by the user, the controller 190 may determine the second location 912-6 to display the UI element 912-1 by considering locations that the user can touch with the thumb 801 on the side display area 812.

According to another exemplary embodiment, in the side display area, the location of the area where the touch input is processed as a user input and the location of the area where the touch input is disregarded may be changed according to whether the electronic device 100 is gripped by the right hand or left hand. In addition, in the side display area, the location of the area where the touch input is processed as a user input and the location of the area where the touch input is disregarded may be changed according to whether the electronic device 100 is turned over or not. For example, the electronic device may be oriented so that the top part including the speaker is pointing upwards as in 1010 or pointing downwards as in 1020. In another example, the terminal device may be oriented in a first direction so that a top part of the electronic device is positioned higher than a bottom part of the electronic device or oriented in a second direction so that the top part of the electronic device is positioned lower than the bottom part of the portable terminal. In yet another example, the display areas 911 and 912 of the electronic may be turned to face the palm of the user's hand or table or may be turned to face away from the palm of the user's hand or the table. The positions of the user interface items in the side display area or other display areas may be determined based on the orientation of the electronic device.

According to another exemplary embodiment, the location in the side display area where the UI element is displayed may be changed according to whether the electronic device is gripped by the right hand or left hand. In addition, the location in the side display area where the UI element is displayed may be changed according to whether the electronic 100 is turned over or not turned over.

Figure 10A:
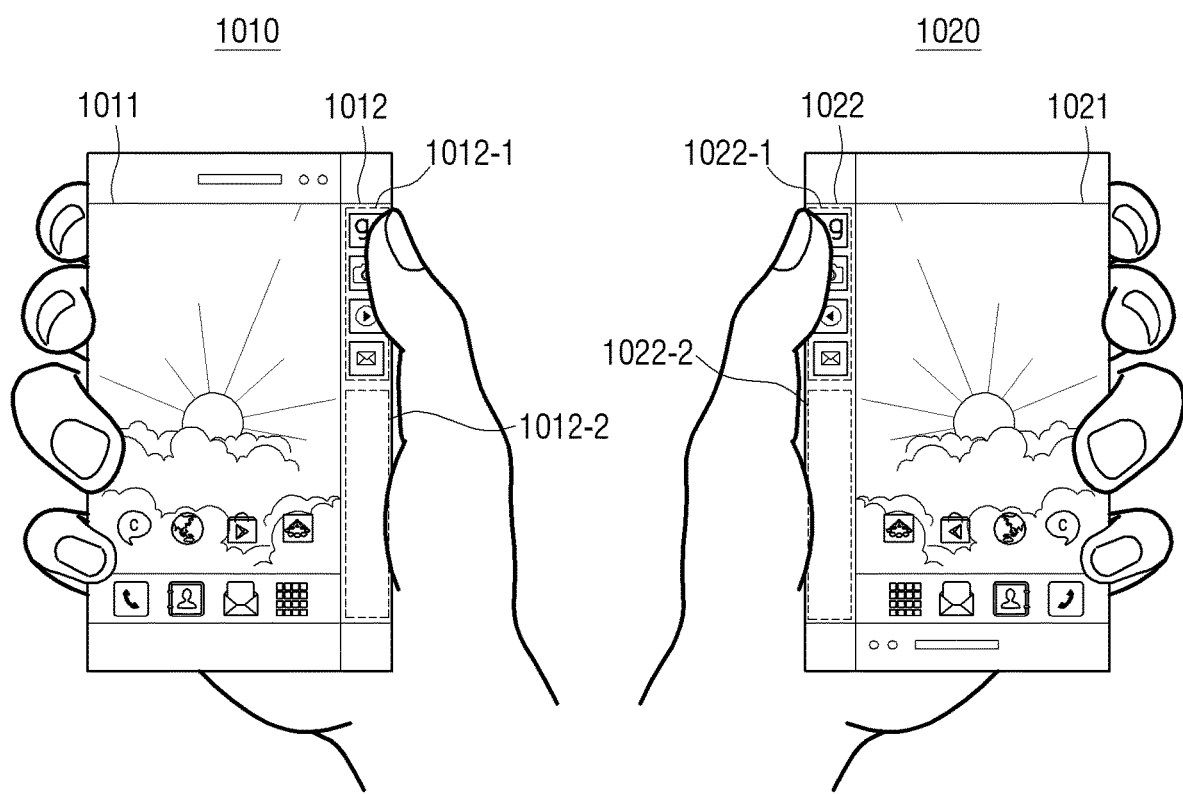
Figure 10B:
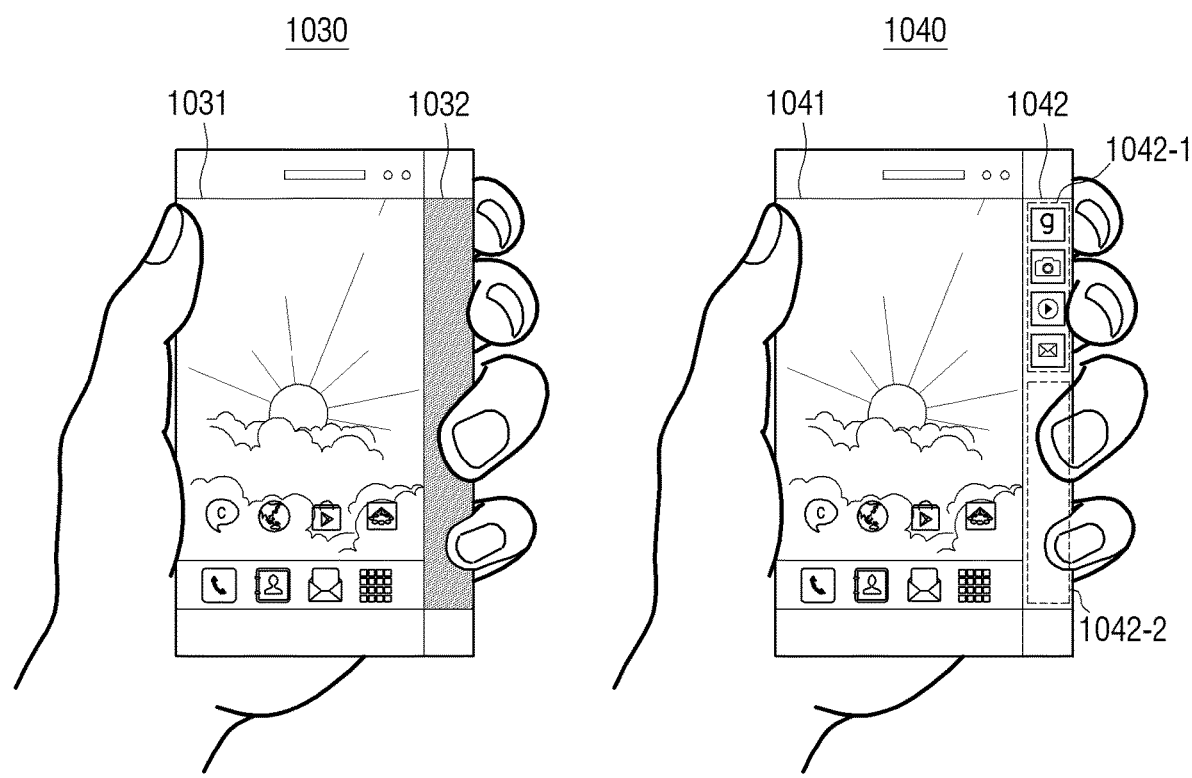

The electronic device 100 may be gripped by the right hand as shown in view 1010 of FIG. 10A, and may be gripped by the left hand as shown in view 1020 of FIG. 10A and views 1030 and 1040 of FIG. 10B.

In response to the electronic device 100 being gripped by the right hand with the side display area 1012 being oriented toward the user's thumb as shown in view 1010 of FIG. 10A, as described above, UI elements may be displayed on a first area 1012-1 of the side display area 1012 that the user can touch with the thumb, and the UI elements may not be displayed on a second area 1012-2 of the side display area 1012 that the user touches with the palm. In this case, in response to a touch input to select a UI element being detected on the first area 1012-1, the controller 190 may process the touch input as a user input and perform a function corresponding to the UI element. On the other hand, in response to a touch input being detected on the second area 1012-1, the controller 190 may control to disregard the touch input.

As shown in view 1020 of FIG. 10A, the electronic device 100 may be gripped by the left hand with the side display area being oriented toward the thumb and the display area 1011 being oriented towards the fingers. In this case, the controller 190 may determine that the electronic device 100 is turned over (for example, rotated by 150° to 200°) and gripped by using acceleration sensor information acquired through the sensor 180. In this case, the controller 190 may control the display 130 to invert contents of the front display area 1021 to avoid inconveniencing the user when viewing the contents. In addition, in the state in which the electronic device 100 is turned over and gripped, the controller 190 may control the display 130 to display the UI elements on a first area 1022-1 of the side display area 1022 that the user can touch with the thumb, and not to display the UI elements on a second area 1022-2 of the side display area 1022 that the user touches with the palm. In this case, the UI elements may be inverted and displayed on the first area 1022-1 so that the user has no inconvenience in viewing the UI elements. In response to a touch input to select a UI element being detected on the first area 1022-1, the controller 190 may process the touch input as a user input and perform a function corresponding to the UI element. On the other hand, in response to a touch input being detected on the second area 1022-2, the controller 190 may control to disregard the touch input.

As shown in view 1030 of FIG. 10B, in response to the electronic device 100 being gripped with the left hand with the side display area 1032 being oriented opposite to the thumb and display area 1031 being oriented towards the thumb, the controller 190 may control to disregard a touch input on the side display area 1032. For example, in response to a plurality of finger touches being detected on the side display area 1032, the controller 190 may determine that the electronic device 100 is gripped by the left hand with the side display area being oriented opposite to the thumb, and control the display 130 to disregard a touch input on the side display area 1032. In this case, the controller 190 may control the display 130 to reduce the brightness of the screen of the side display area 1032, to turn off the bent display corresponding to the side display area 1032, to display the side display area 1032 in monochrome, or not to display the UI elements on the side display area 1032, in order to inform the user that the touch input on the side display area 1032 is disregarded.

According to another exemplary embodiment, as shown in view 1040 of FIG. 10, in response to the electronic device 100 being gripped by the left hand with the side display area 1042 being oriented opposite to the thumb and display area 1041 being oriented towards the thumb, the controller 190 may control the display 130 to display UI elements on first area 1042-1 of the side display area 1042 that the user touches with the index finger and the middle finger, and not to display the UI elements on a second area 1042-2 of the side display area 1042 that the user touches with the ring finger and the little finger.

To achieve this, the controller 190 may determine the locations and number of touch inputs on the side display area 1042. For example, in response to three or more touch inputs being detected on the side display area 1042, the controller 190 may determine that the electronic device 100 is gripped by the left hand. In addition, the controller 190 may control to process, as a user input, the touch input corresponding to the finger at the highest location from among the plurality of touch inputs on the side display area 1042, and to disregard the touch inputs corresponding to the other fingers.

In response to a touch input to select a UI element being detected on the first area 1042-1, the controller 190 may process the touch input as a user input and perform a function corresponding to the UI element. On the other hand, in response to a touch input being detected on the second area 1042-2, the controller 190 may control to disregard the touch input.

Figure 11A:
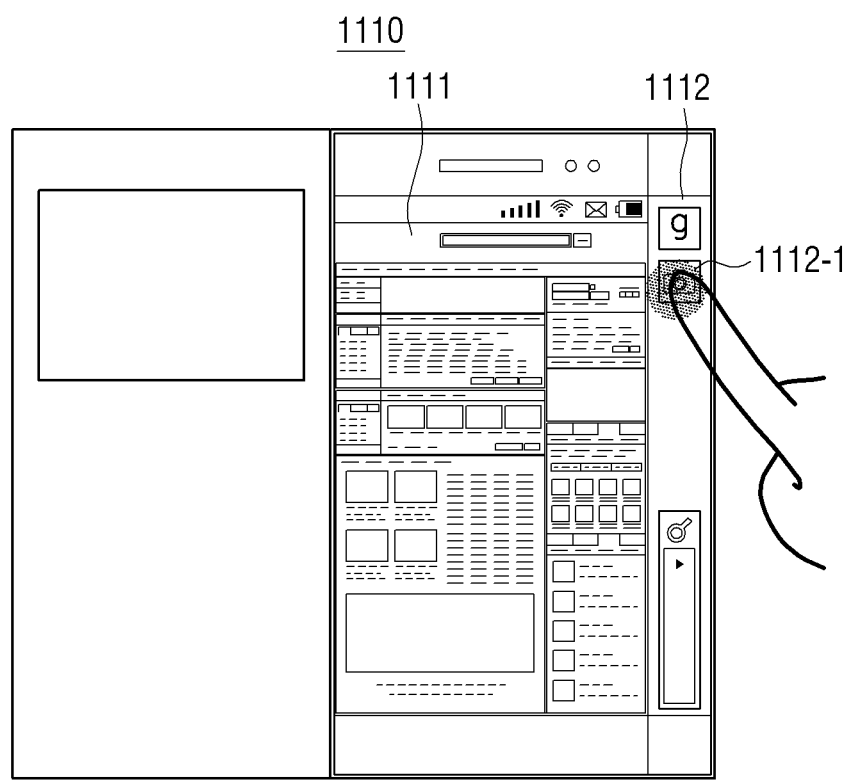
Figure 11A:
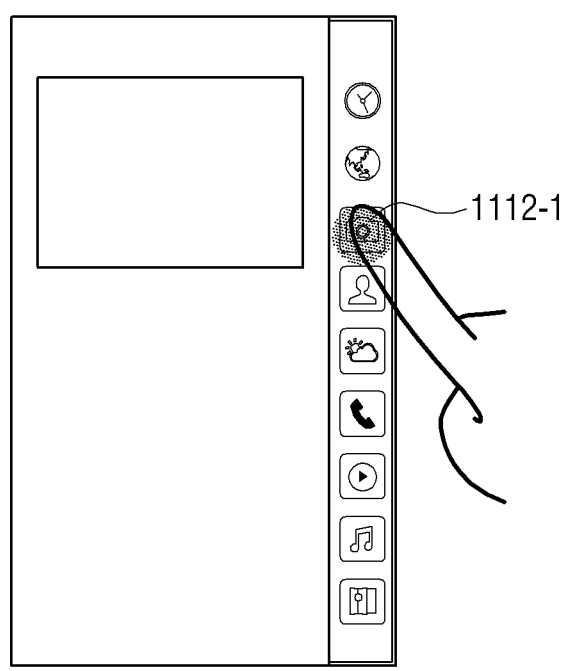
Figure 11B:
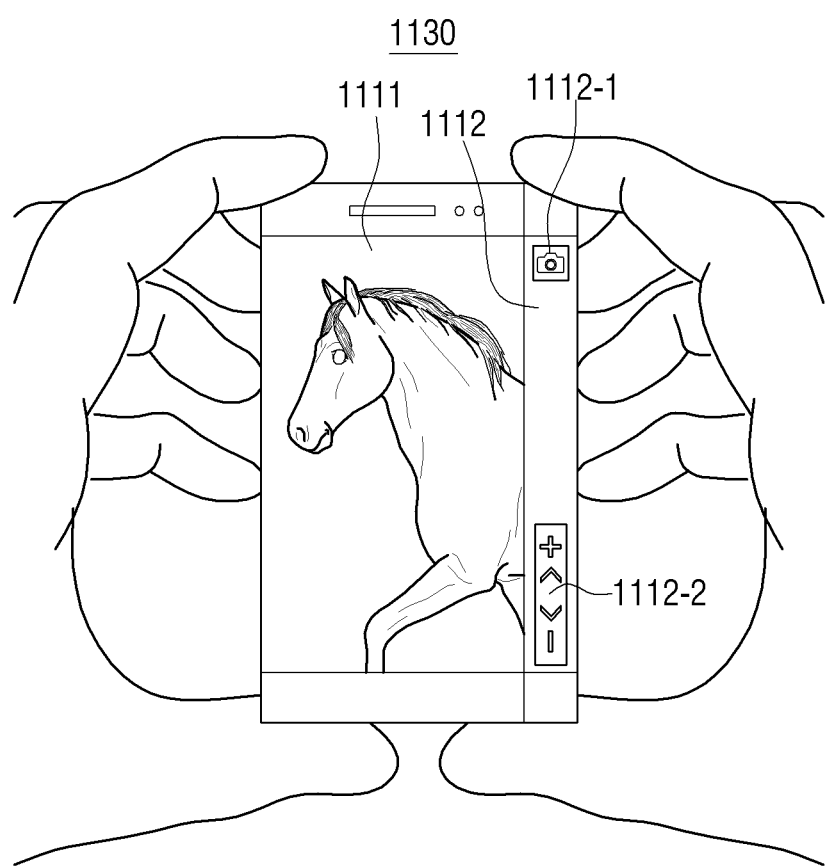
Figure 11C:
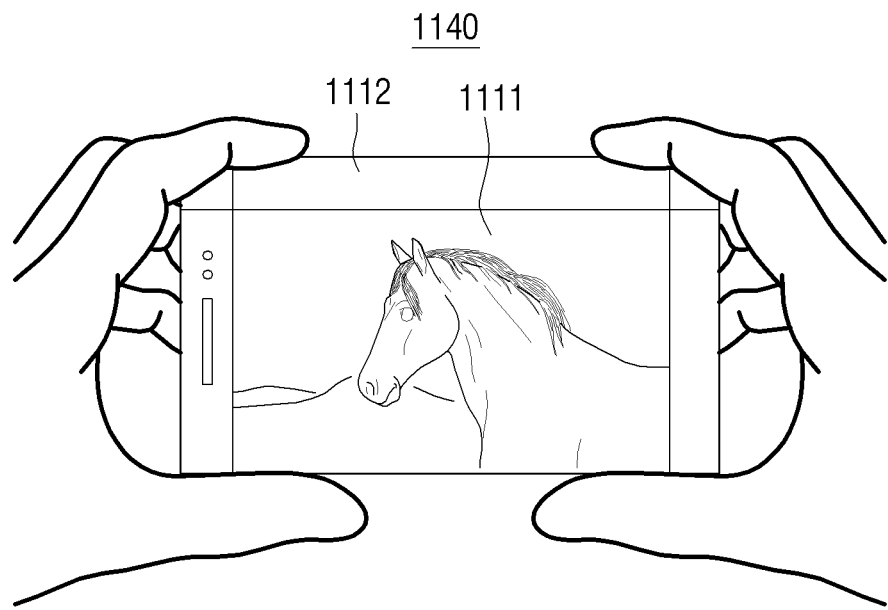
Figure 11C:
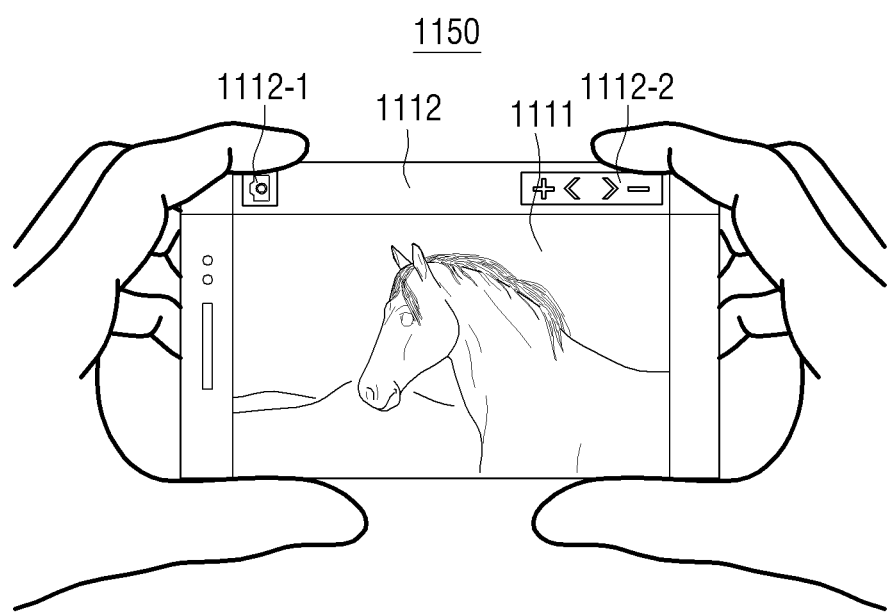

In a state in which the electronic device 100 with a cover is not gripped as shown in FIG. 11A, the sensor 180 may detect a user input to select camera application identification information on a side display area 1112. For example, in a state in which the cover is opened as shown in view 1110 of FIG. 11A, the sensor 180 may detect a user input to select camera application identification information 1112-1 on the side display area 1112. In addition, in a state in which a front display area 1111 is covered by the cover as shown in view 1120 of FIG. 11A, the sensor 180 may detect a user input to select the camera application identification information 1112-1 on the side display area 1112.

Next, the user may grip the electronic device 100 in a portrait mode not to contact the side display area 1112 with a user's finger. In this state, in response to the user input to select the camera application identification information, the controller 190 may execute the camera application and control the display 130 to display the result of executing the camera application on the front display area 1111, as shown in view 1130 of FIG. 11B. The result of executing the camera application may be a screen including a preview image. In addition, the controller 190 may control the display 130 to display UI elements 1112-1 and 1112-2 for controlling the camera application on the side display area 1112. In this case, the UI elements may be displayed on one side of the side display area 1112 by considering the locations of the user's fingers. For example, the UI elements 1112-1 and 1112-2 may be at least one of a zoom-in UI element, a zoom-out UI element, a photographing UI element, a flash UI element, or an end UI element.

In addition, the user may grip the electronic device 100 in a landscape mode to contact the side display area 1112 with a user's finger. In this state, in response to the user input to select the camera application identification information, the controller 190 may execute the camera application and control the display 130 to display the result of executing the camera application on the front display area 1111, as shown in view 1140 of FIG. 11C. Next, in response to the user taking the user's finger off the side display area 1112, the controller 190 may control the display 130 to display the UI elements 1112-1 and 1112-2 on the side display area 1112 as shown in view 1150 of FIG. 11C. In this case, the UI elements 1112-1 and 1112-2 may be displayed on the location of the side display area 1112 that the user touches with the user's finger when the electronic device 100 is initially gripped. Therefore, the location where the UI elements 1112-1 and 1112-2 are displayed may vary according to the contact locations of the user's fingers and/or the orientation of the electronic device. In this state, in response to a user input touching one UI element (for example, a photographing UI element) being detected on the side display area 1112, the controller 190 photographs the preview image and stores it in the storage 150.

The darkness or chrome of the UI element may be different before the UI element is selected and after the UI element is selected. For example, the darkness or chrome of the UI element before the UI element is selected may be higher than the darkness or chrome of the UI element after the UI element is selected.

Figure 12:
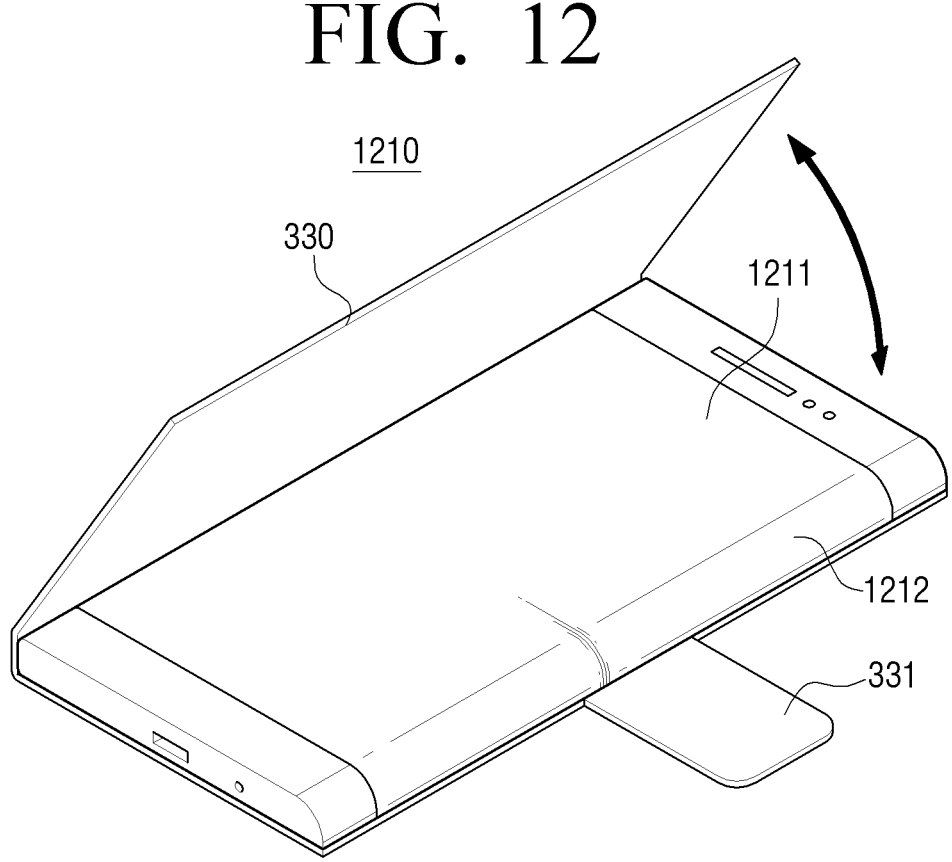
Figure 12:
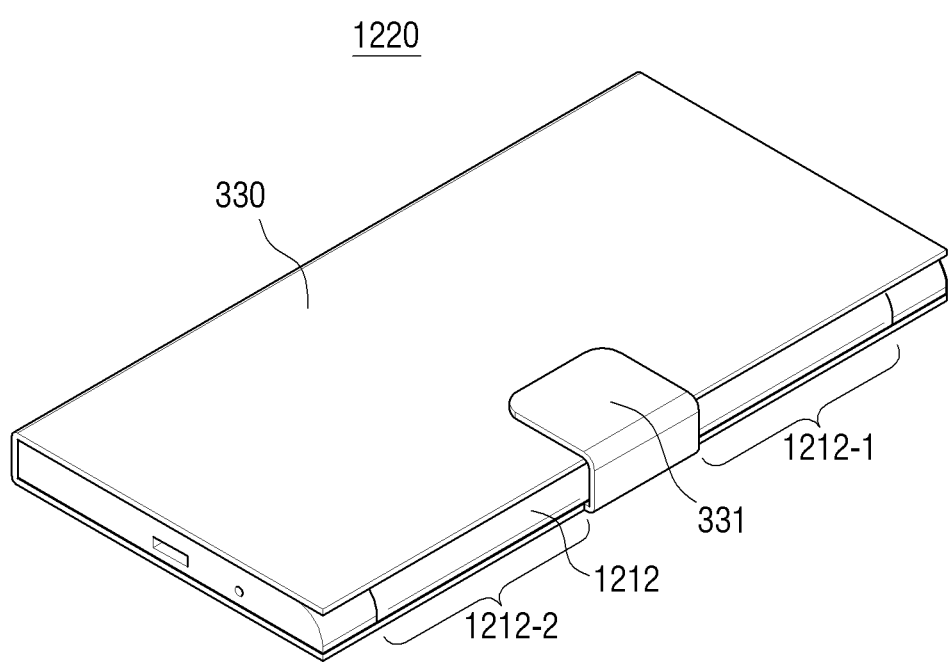

Referring to FIG. 12, the electronic device 100 may have a cover 330 with a fixer 331. In this case, referring to view 1210 of FIG. 12, in response to the cover 330 being opened, the sensor 180 may detect a touch input on the entirety of a front display area 1211 and a side display area 1212. On the other hand, in response to the front display area 1211 and a part of the side display area 1212 being covered by the cover 330 as shown in view 1220 of FIG. 12, the controller 190 may display UI elements on areas 1212-1 and 1212-2 on the side display area 1212 except for the area corresponding to the fixer 331. In addition, in response to a touch input to select a UI element, the controller 190 may perform a function related to the UI element.

Figure 13:
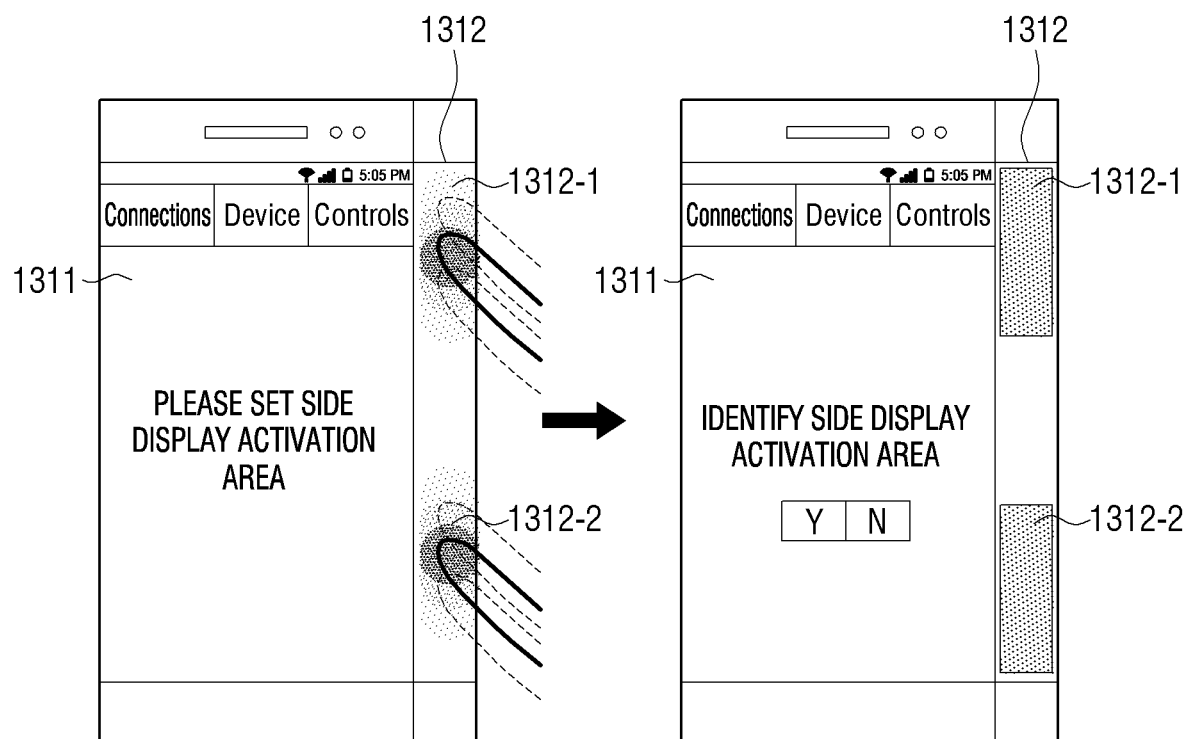

In this case, in order to display the UI elements on the areas 1212-1 and 1212-2 except for the area corresponding to the fixer 331, the user may set an active touch input area and an inactive touch input area through an environment setting menu. The active touch input area may refer to an area where, in response to a touch input of the user, the controller 190 may process the touch input as a user input. On the other hand, the inactive touch input area refers to an area where, in response to a touch input of the user, the controller 190 may control to disregard or discard the touch input. For example, in response to requesting to set an active side display area through the environment setting menu, the user may set the active touch input area by selecting parts 1312-1 and 1312-2 of a side display area 1312 as shown in view 1310 of FIG. 13. Then, the controller 190 may highlight the areas 1312-1 and 1312-2 designated as the active touch input area in the side display area 1312 as shown in view 1320 of FIG. 13. In another exemplary embodiment, the controller 190 may designate an area selected by the user in the side display area 1312 as the inactive touch input area. When the user designates an area where a touch input can be processed in the side display area through the environment setting menu as described above, the controller 190 may display the UI elements on the area except for the side display area covered by the cover with the fixer. In FIG. 13, the user sets the active touch input area and the inactive touch input area in the right side display area of the electronic device 100. However, the user may set the active touch input area and the inactive touch input area in the left side display area of the electronic device 100 or both side display areas of the electronic device 100.

The active touch input and the inactive touch input area may be set by the user sliding their finger across a desired area, selecting or touching one or more areas of predefined units of the side display area 1312, performing a touch and hold in one or more areas of predefined units of the side display area 1312, and/or performing another touch gesture to select desired area of the side display area 1312.

Figure 14:
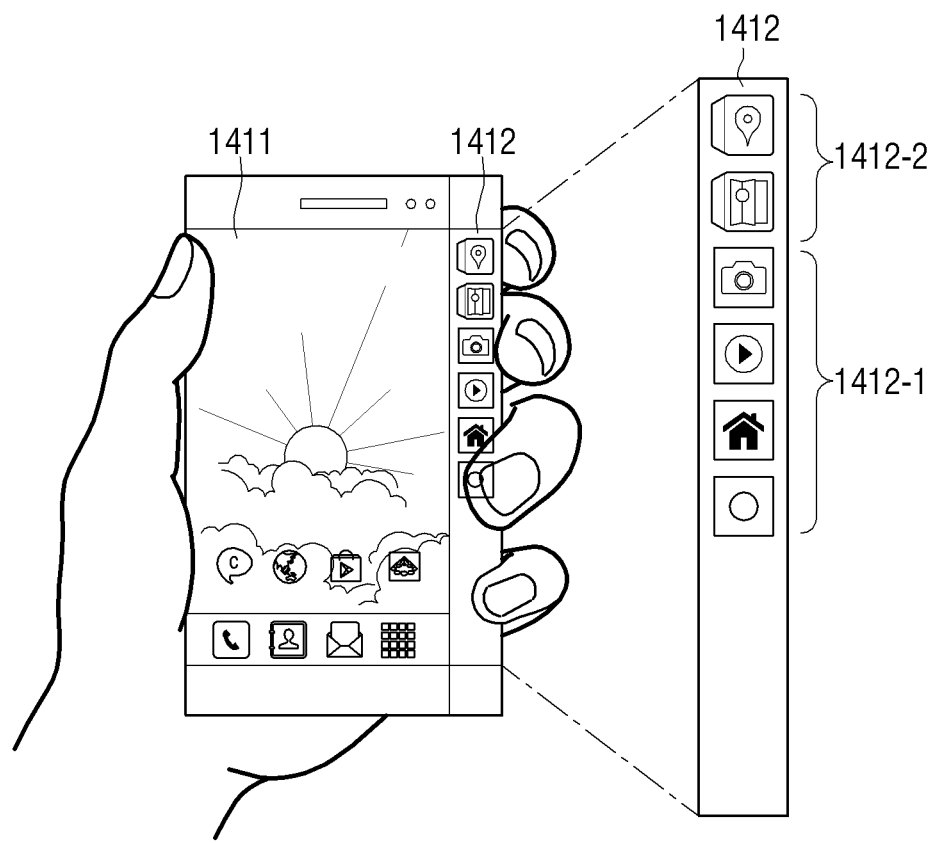

Referring to FIG. 14, in the state in which the electronic device 100 is gripped by the user, the sensor 190 may detect a touch input on a front display area 1411 and a touch input on a side display area 1412 in different ways. For example, the sensor 190 may detect a user's touch input on the front display area using a touch sensor. On the other hand, since there is a high probability that malfunction caused by a user's touch occurs in the side display area 1412, the sensor 190 may detect a touch input on the side display area using a touch sensor and a pressure sensor. For example, in response to the user touching a UI element on the side display area 1412 and pressing it with higher than predetermined pressure, the controller 190 may determine that the UI element is selected and perform a function related to the UI element.

According to another exemplary embodiment, when a plurality of UI elements are displayed on the side display area 1412 as shown in FIG. 14, the controller 190 may detect some 1412-1 of the UI elements using the touch sensor and detect the other UI elements 1412-2 using the touch sensor and the pressure sensor. For example, in the case of the UI elements 1412-2 given high priority, in response to a touch input and a user input pressing a UI element with higher than the predetermined pressure being detected through the sensor 180, the controller 190 may perform a function related to the UI element. On the other hand, in the case of the UI elements 1412-1 given low priority, in response to a touch input being detected through the sensor 180, the controller 190 may perform the function related to the element.

The UI elements 1412-1 which are detected using the touch sensor and the UI elements 1412-2 which are detected using the touch sensor and the pressure sensor may be distinguished from each other and displayed. For example, the UI elements 1412-1 which are detected using the touch sensor may be displayed in 2D graphics, whereas the UI elements 1412 which are detected using the touch sensor and the pressure sensor may be displayed in 3D graphics so as to make the user feel as if the UI elements 1412 can be pressed.

Figure 15:
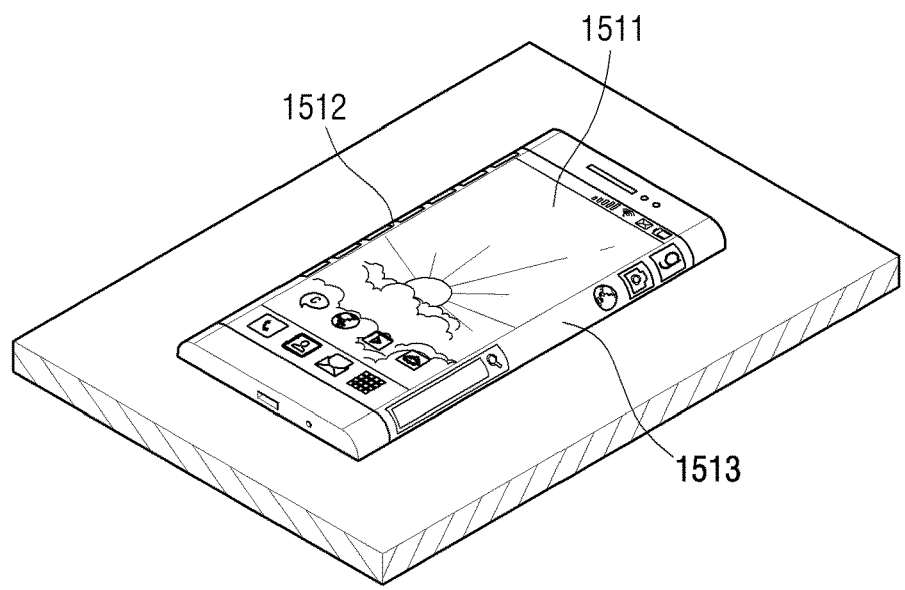
Figure 15:
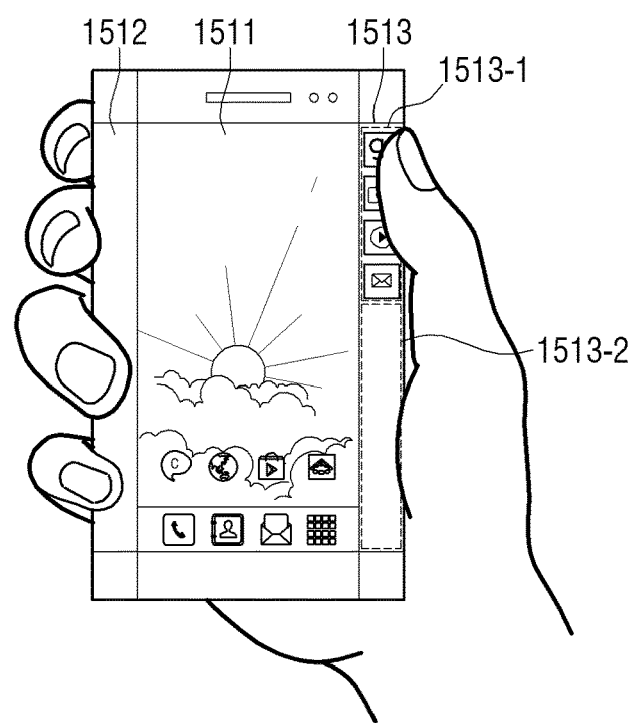

In the state in which the electronic device 100 having display areas on the both side surfaces is placed on the floor or fixed in the holder as shown in view 1510 of FIG. 15, the controller 190 may display at least one UI element on both side display areas 1512 and 1513. In this case, the UI elements may be displayed on certain areas of the both side display areas 1512 and 1513. In this state, in response to a touch input on a UI element being detected, the controller 190 may perform a function related to the UI element.

The electronic device 100 having the display areas 1512 and 1513 on the both side surfaces may be gripped by the user as shown in view 1520 of FIG. 15. In this case, the controller 190 may determine whether the electronic device 100 is gripped or not using information acquired by an acceleration sensor and information acquired by a proximity sensor. In the state in which the electronic device 100 is gripped as shown in view 1520 of FIG. 15, the controller 190 may process, as a user input, a touch input on an area 1513-1 where the user's thumb is located in the both side display areas 1513-1 and 1513-2 and the user's fingers are located in 1512. For example, in response to a user input to select a UI element being detected on the area 1513-1 where the user's thumb is located, the controller 190 may perform a function related to the UI element. On the other hand, the controller 190 may control to disregard a touch input on the areas 1512 and 1513-2 except for the area 1513-1 where the user's thumb is located in the both side display areas 1512 and 1513. For example, the controller 190 may control the display 130 not to display any UI element on the areas 1512 and 1513-2 except for the area 1513-1 where the user's thumb is located.

Figure 16:
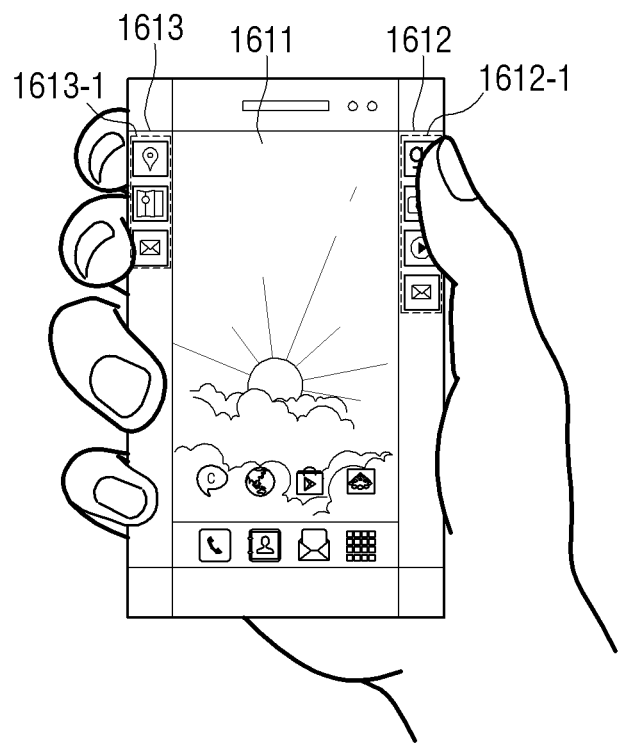

In another exemplary embodiment, when the electronic device 100, which has a central display 11 and side surface display areas 1612 and 1613, is gripped by the user as shown in FIG. 16, the controller 190 may process, as a user input, a touch input on an area 1612-1 where the user's thumb is located and an area 1613-1 where the user's index finger is located in the both side display areas 1612 and 1613, or a touch input pressing with higher than predetermined pressure. For example, the controller 190 may provide UI elements on the area 1612-1 where the user's thumb is located and the area 1613-1 where the user's index finger is located, and, in response to a user input to select the UI element, may perform a function related to the UI element.

Figure 17:
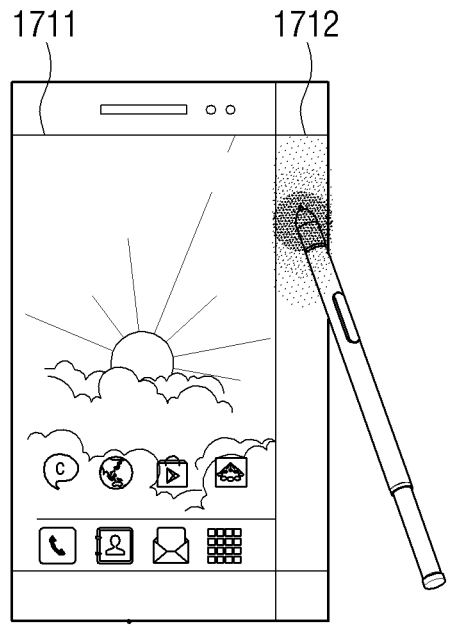
Figure 17:
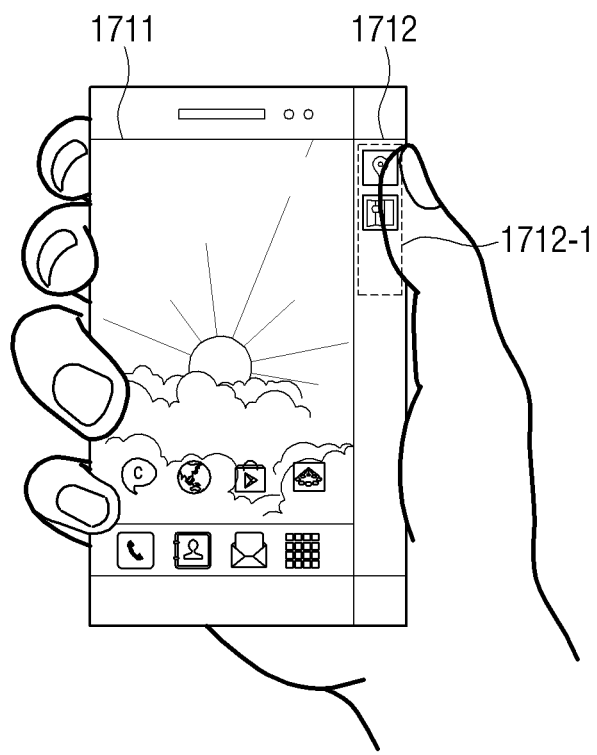

FIG. 17 illustrates another example of the method for the user to set an active touch input area and an inactive touch input area of a side display area 1712. For example, in a state in which the electronic device 100 having a central display area 1711 enters a designation mode of the side display area 1712, the sensor 180 may detect a user input to select an area 1712-1 of the side display area 1712 by touching or using a stylus pen as shown in view 1710 of FIG. 17. In response to the user input, the controller 190 may determine the area 1712-1 selected by touching or using the stylus pen as an active touch input area where a UI element can be displayed. According to another exemplary embodiment, the controller 190 may determine the area selected by touching or using the stylus pen as an area where a touch input is disregarded.

According to another exemplary embodiment, the controller 190 may designate the active touch input area of the side display area 1712 by considering user's gripping habit. For example, the controller 190 may periodically acquire locations that the user touches with the user's thumb in the side display area 1712 and store the locations in the storage 150, and may determine an area that the user touches repeatedly more than a predetermined number of times, as the active touch input area.

In response to the electronic device 100 being gripped in the state in which the active touch input area is determined as shown in view 1720 of FIG. 17, the controller 190 may control the display 130 to display UI elements on the active touch input area 1712-1 of the side display area 1712.

Figure 18A:
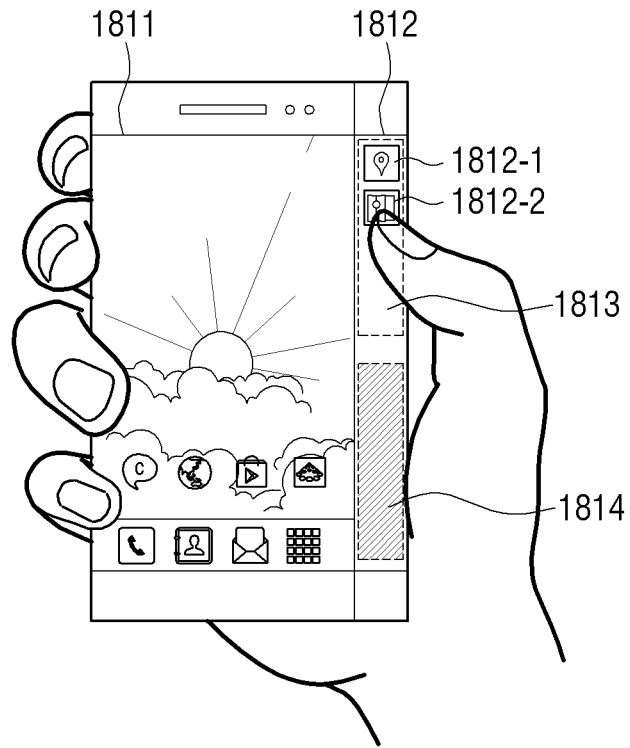
Figure 18A:
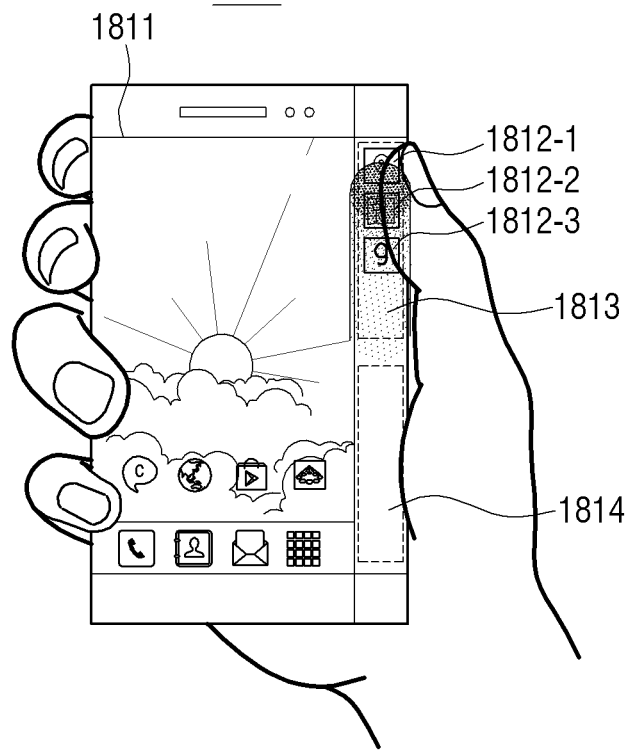

In the state in which the electronic device 100 is gripped as shown in view 1810 of FIG. 18A, the controller 190 may control the display 130 to display UI elements 1812-1 and 1812-2 on a first area 1813 of a side display area. In this case, the UI elements 1812-1 and 1812-2 displayed on the first area 1813 may be UI elements which are frequently used by the user, UI elements which are pre-designated, or UI element which are given high priority. The first area 1813 may be an area where the controller 190 processes a touch input as a user input. In addition, a second area 1813 may be an area where the controller 190 controls to disregard a touch input. In this case, the first area 1813 and the second area 1814 may be displayed in different base colors or have different darkness to be distinguished from each other, or the first area 1813 may be highlighted.

Next, in the state in which the electronic device 100 continues to be gripped by the user as shown in view 1820 of FIG. 18A, the sensor 180 may detect a user input performing a touch and drag gesture or a flick gesture from bottom to top in the side display area 1812 along a longitudinal side. In response to the user input, the controller 190 may control the display 130 to add a new UI element 1812-3 to the first area 1813. In this case, the new UI element 1812-3 may not have been displayed on a front display area 1811 or the side display area 1812 and may abruptly appear. Alternatively, the new UI element 1812-3 may have been displayed on the front display area 1811 and moved to the first area 1813. In addition, the new UI element 1812-3 may have been in the second area 1814 of the side display area 1812 in an inactive state and moved to the first area 1813.

Figure 18B:
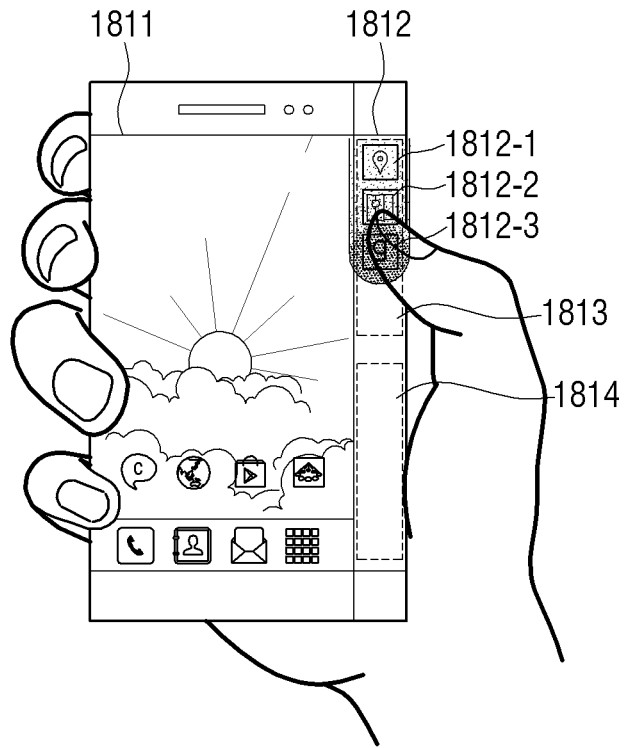
Figure 18B:
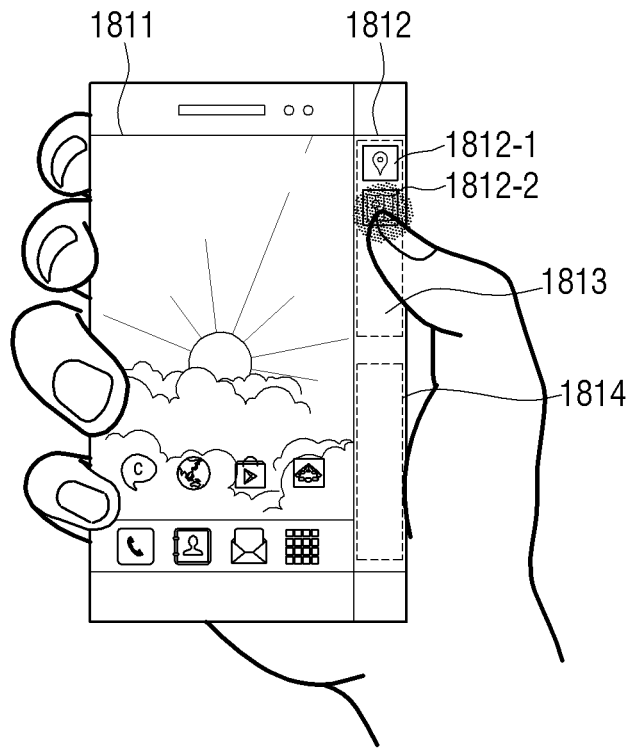

Next, in the state in which the electronic device 100 continues to be gripped by the user as shown in view 1830 of FIG. 18B, the sensor 180 may detect a user input performing a touch and drag gesture or a flick gesture from top to bottom in the side display area 1812 along the longitudinal side. In response to the user input, the controller 190 may control the display 130 to remove one UI element 1812-3 as shown in view 1840 of FIG. 18B. As a result of the removing, the UI element 1812-3 may be deleted, moved to the front display area 1811, or moved to the second area 1814 where a touch input is disregarded. In response to the UI element 1812-3 being moved to the second area 1814, the darkness or chrome of the UI element 1812-3 may be changed.

In the state in which the electronic device 100 continues to be gripped by the user as shown in view 1840 of FIG. 18A, the sensor 180 may detect a user input to select the UI element 1812-2. For example, the user input may be one of a tough gesture touching the UI element 1812-2, a drag gesture dragging the UI element 1812-2 toward the front display area 1811, or a tilting gesture tilting the electronic device 100.

Figure 19:
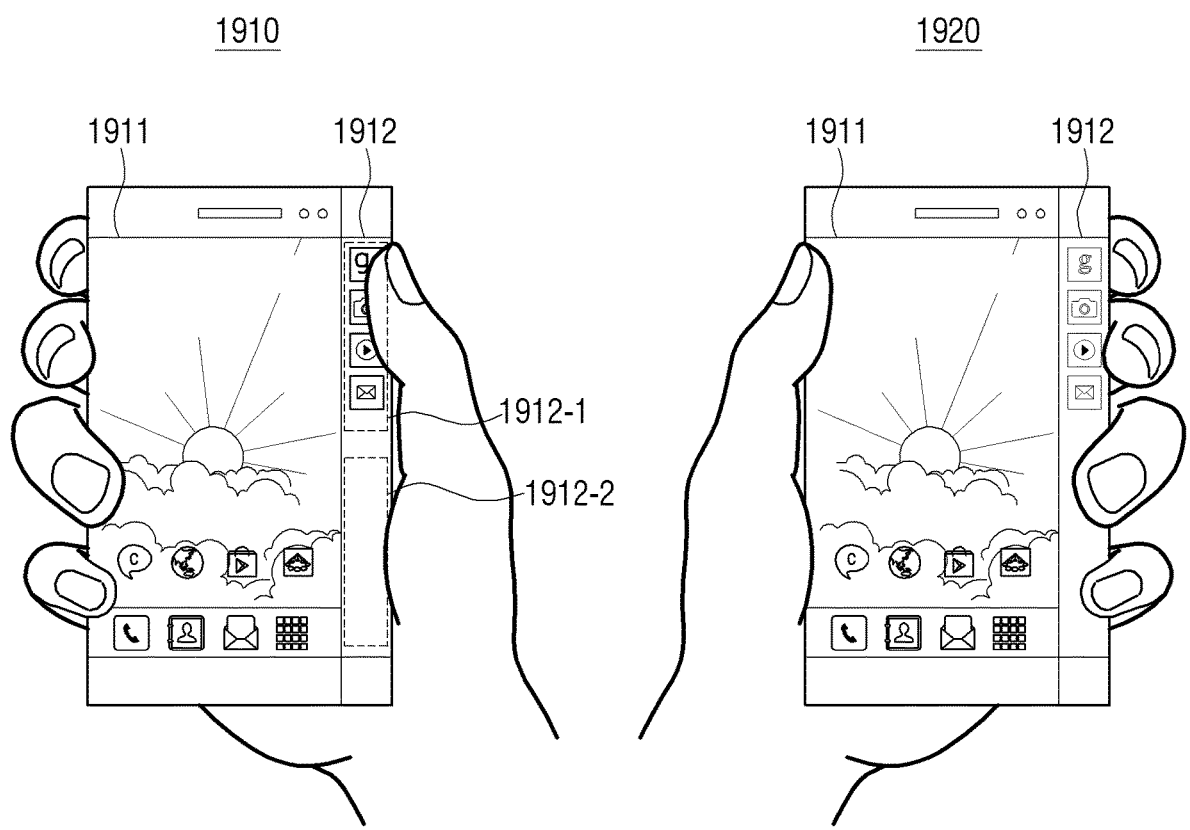

In the state in which the electronic device 100 is gripped by the user as shown in view 1910 of FIG. 19, the controller 190 may control to activate a first area 1912-1 of a side display area 1912, and deactivate a second area 1912-2 of the side display area 1912. In this case, UI elements may be displayed on the activated first area 1912-1. In the state in which the electronic device 100 is turned over and gripped by the user as shown in view 1920 of FIG. 19, the controller 190 may control to deactivate the entirety of the side display area 1912. In response to the side display area 1912 being deactivated, the user may control the UI elements on the front display area 1911 using the user's thumb while fixing the electronic device 100 with the user's four fingers.

Figure 20:
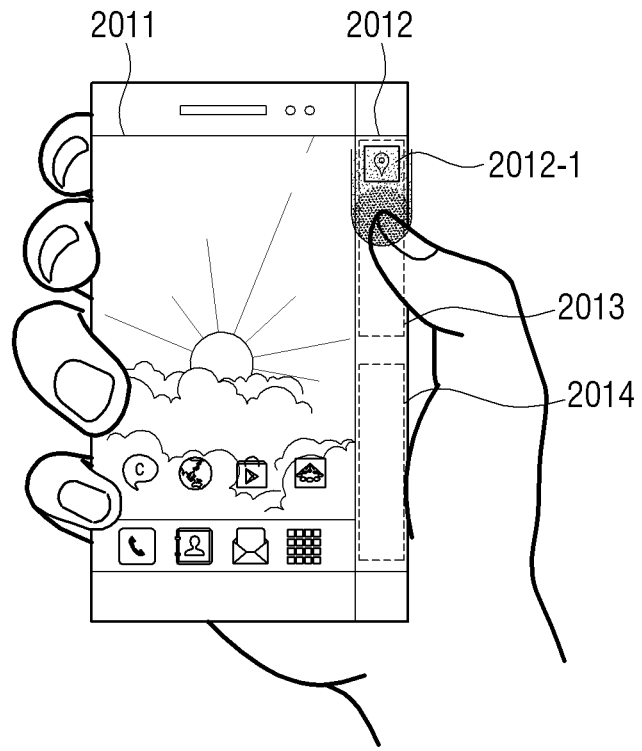
Figure 20:
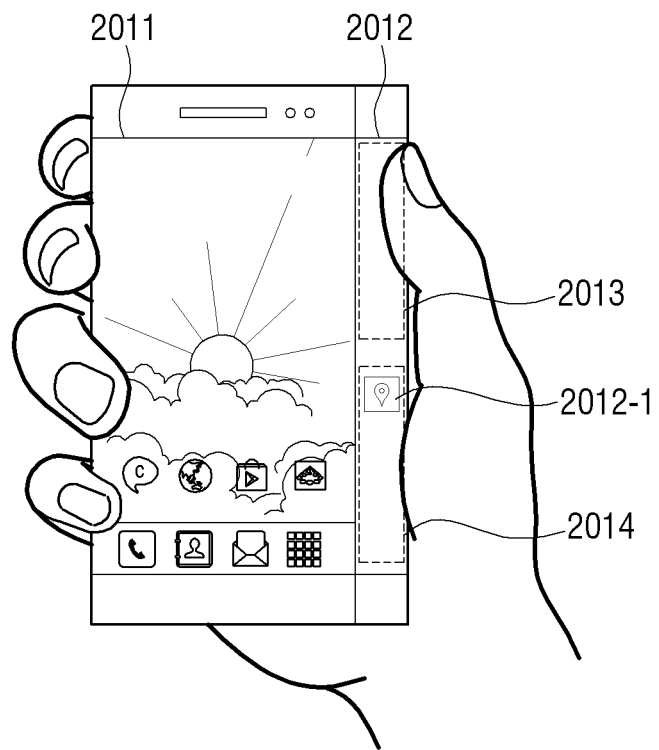

In the state in which the electronic device 100 with display 2011 and that is gripped as shown in view 2010 of FIG. 20, the controller 190 may control to activate a first area 2013 of a side display area 2012, and to deactivate a second area 2014 of the side display area 2012. In this case, a UI element 2012-1 may be displayed on the activated first area 2013. In this state, the sensor 180 may detect a user input touching the UI element 2012-1 and then dragging or flicking from top to bottom. In other words, the sensor 180 may detect a user input to move the UI element 2012-1 to the deactivated second area 2014. In response to the user input, the controller 190 may control the display 130 to display the deactivated UI element 2012-1 on the second area 2014. In this state, the deactivated UI element 2012-1 may have darkness or chrome lower than that before it is deactivated. Thereafter, the deactivated UI element 2012-1 may be activated when the user drags or flicks from the second area 2014 of the side display area 2012 to the first area 2013, places the electronic device 100 on a floor, or fixes the electronic device 100 in a holder.

Figure 21:
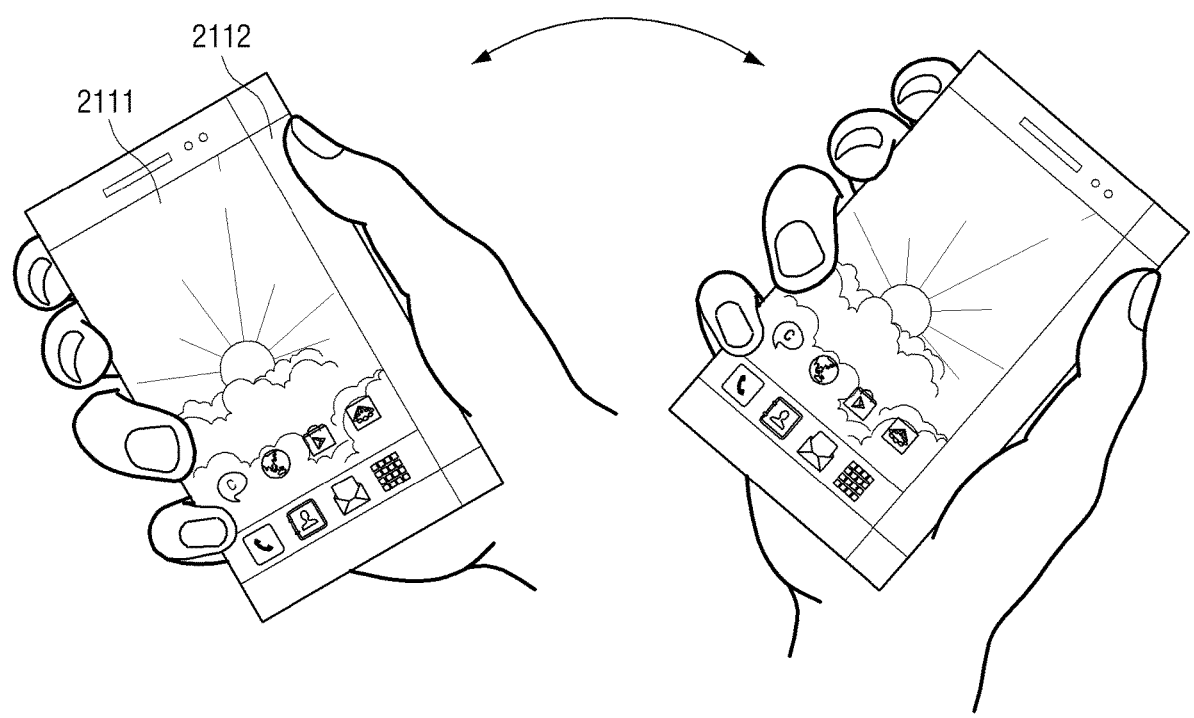

According to an exemplary embodiment, while the user grips the electronic device 100 with display area 2111 and side display area 2112, a UI element on a side display area may be touched unintentionally. In this state, the user may tilt the electronic device 100 horizontally to cancel the selection of the UI element as shown in FIG. 21. In response to the user's tilting gesture, the controller 190 may cancel execution of a function related to the UI element. In addition, at the time of canceling the execution, the controller 190 may deactivate the side display area 2112 such that a touch input on the side display area 2112 is disregarded. In order to activate the side display area 2112 again, the user may tilt the electronic device 100 horizontally again, touch and hold the side display area 2112 for a predetermined time, or drag along the longitudinal side of the side display area 2112.

FIGS. 22A to 36 are views showing a process of displaying an application execution screen in a electronic device 100 according to an exemplary embodiment.

According to an exemplary embodiment, while a UI element is displayed on a side display area, the sensor 180 may detect a user input touching the UI element and then dragging toward a front display area. In response to the user input, the controller 190 may display information related to the UI element on the front display area. For example, when the UI element is application identification information, the information related to the UI element may be an execution screen of an application corresponding to the application identification information. In this case, the user input dragging toward the front display area may be in a diagonal direction or a direction of an arch shape on the front display area. Such a user input may provide more intuitive and more emotional interaction to the user.

Figure 22A:
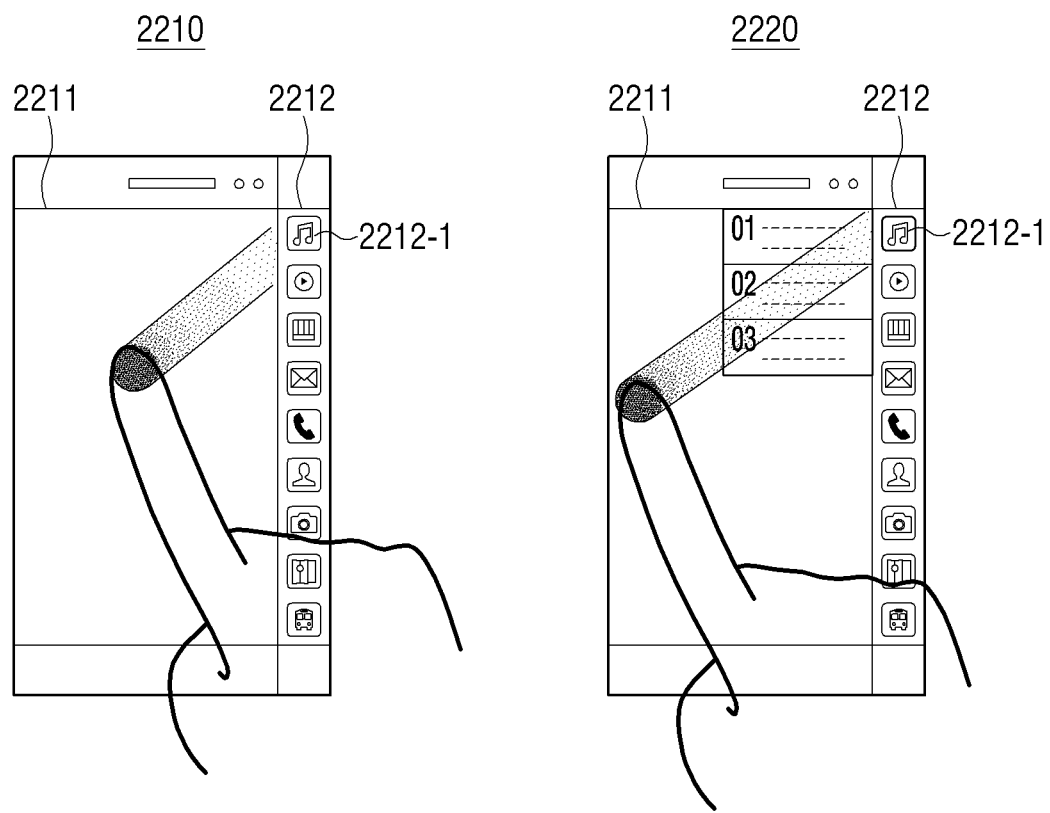
FIGS. 22A to 36 are views showing a process of displaying an application execution screen in a electronic device according to exemplary embodiments.
Figure 22B:
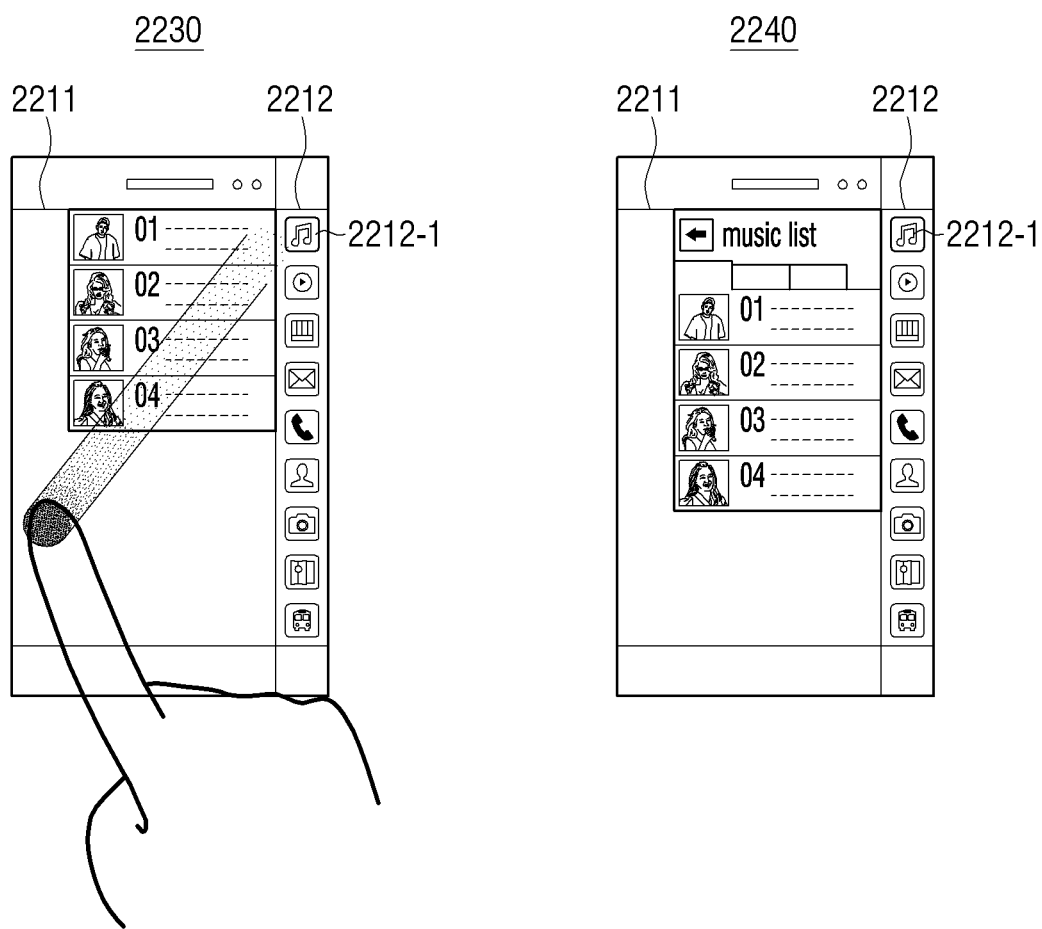

Referring to view 2210 of FIG. 22A, the electronic device 100 may control the display 130 to display an application identification information list on a side display area 2212. While the application identification information is displayed, the sensor 180 may detect a user input touching one piece of application identification information 2212-1 included in the application identification information list and then dragging in one direction while still touching. The one direction may be a direction in which the dragging starts from the touch location of the side display area 2212 and crosses over the front display area 2211 in the diagonal direction. In response to the user input, the controller 190 may control the display 130 to gradually increase the size of the application execution screen corresponding to the application identification information, and display the application execution screen, as shown in view 2220 of FIG. 22A to view 2240 of FIG. 22B. In this case, the size of the application execution screen gradually increasing may correspond to the length of the user's dragging gesture in the diagonal direction. In addition, as the size of the application execution screen increases, the amount of information included in the application execution screen may increase. For example, when the one piece of application identification information 2212-1 is an icon of a music application, the information included in the application execution screen in view 2220 of FIG. 22A may be song titles, the information included in the application execution screen in view 2230 of FIG. 22B may be song titles and thumbnails, and the information included in the application execution screen in view 2240 of FIG. 22B may be at least one of song titles, thumbnails, and a menu.

Figure 23A:
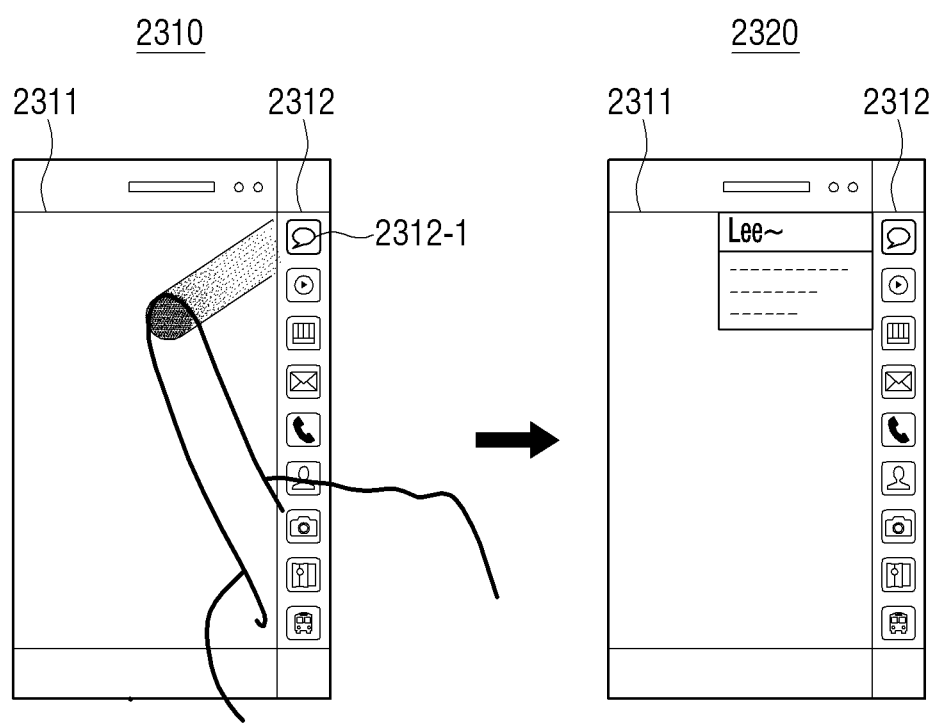
Figure 23B:
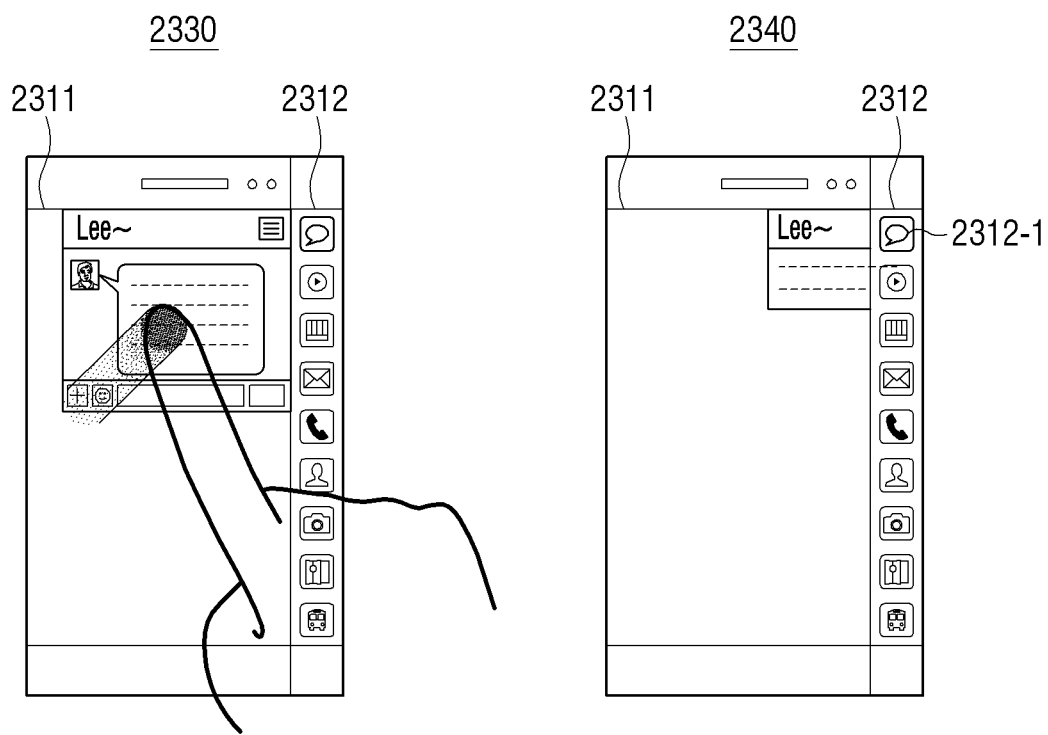

Referring to view 2310 of FIG. 23A, the electronic device 100 may control the display 130 to display an application identification information list on a side display area 2312. While the application identification information list is displayed, the sensor 180 may detect a user input touching one piece of application identification information 2312-1 included in the application identification information list, dragging in one direction, and then dragging again in the reverse direction of the one direction while still touching. For example, the one direction may be a direction in which the dragging starts from the touch location of the side display area 2312 and crosses over the front display area 2311 in the diagonal direction. In response to the user input, the controller 190 may control the display 130 to display the application execution screen, while gradually increasing the size of the application execution screen corresponding to the application identification information and then gradually decreasing the size of the application execution screen, as shown in view 2320 of FIG. 23A to view 2340 of FIG. 23B. In addition, as the size of the application execution screen increases, the amount of information included in the application execution screen may increase and then decrease. For example, when the one piece of application identification information 2312-1 is an icon of a messenger application, the information included in the application execution screen in view 2320 of FIG. 23A and view 2340 of FIG. 23B may be a text included in a message, and the information included in the application execution screen in view 2330 of FIG. 23B may be at least one of a text, an image, and an input field included in a message. As described above, in response to notification information such as a message being received through the electronic device 100, the user can simply identify detailed contents related to the notification information through a touch and drag gesture. The increasing and decreasing in size of the application execution screen may be proportional to the distance traveled by the dragging touch input by the user.

Figure 24A:
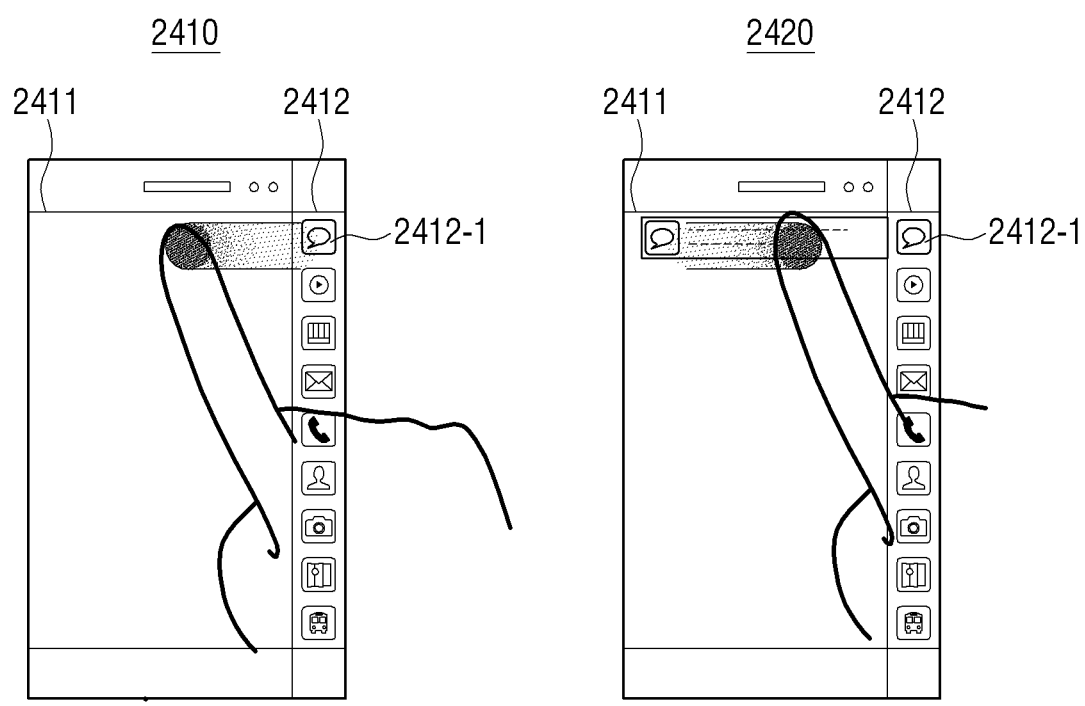
Figure 24B:
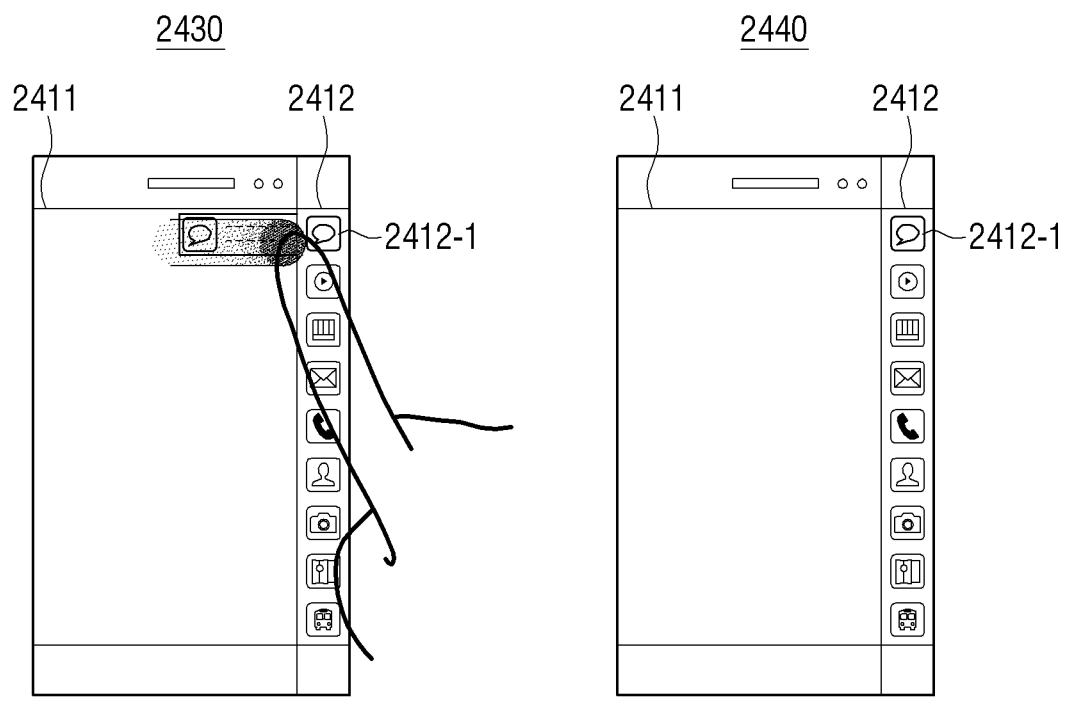

Referring to view 2410 of FIG. 24A, the electronic device 100 may control the display 130 to display an application identification information list on a side display area 2412. While the application identification information list is displayed, the sensor 180 may detect a user input touching one piece of application identification information 2412-1 included in the application identification information list, dragging in one direction, and then dragging again in the reverse direction of the one direction while still touching. For example, the one direction may be a horizontal direction in which the dragging starts from the touch location of the side display area 2412 and moves to the front display area 2411. In response to the user input, the controller 190 may control the display 130 to gradually increase the size of the application execution screen corresponding to the application identification information, gradually decreasing the size of the application execution screen, and then making the application execution screen disappear, as shown in view 2420 of FIG. 24A to view 2440 of FIG. 24B. For example, when the one piece of application identification information 2412-1 is an icon of a messenger application, the controller 190 may control the display 130 to increase the contents of a message transmitted from another user, reduce the contents, and then make the contents disappear. In this case, when the message is one time notification information, the one piece of application identification information 2412-1 may disappear from the side display area 2412 as the message disappears.

Figure 25A:
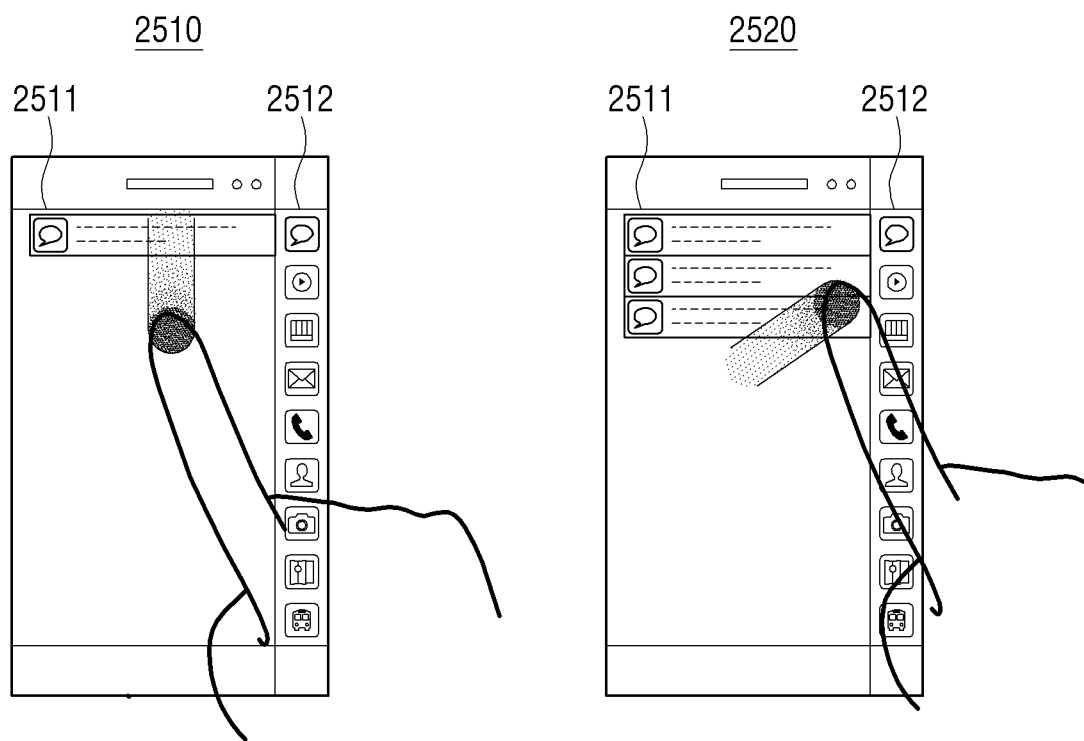
Figure 25B:
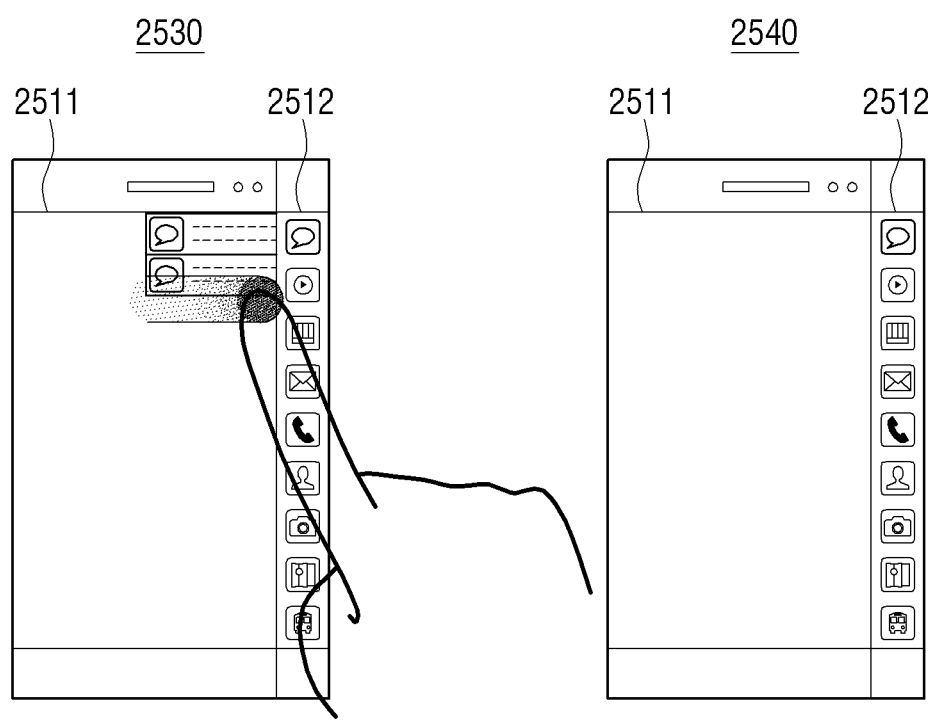

According to another exemplary embodiment, in view 2510 of FIG. 25A, the controller 190 may control the display 130 to display a message on a front display area 2511 in response to user's touch and drag as shown in view 2420 of FIG. 24A. Next, the sensor 180 may detect a user input dragging in the vertical direction (for example, downward direction) continuously from the user's touch and drag. In response to the user input, the controller 190 may control the display 130 to display a screen including previously received messages as shown in view 2520 of FIG. 25A. Next, the sensor 180 may detect a user input dragging the screen including the previously received messages toward the side display area 2512. In response to the user input, the controller 190 may control the display 130 to move the screen including the previously received messages to the side display area 2512 and make the screen disappear as shown in view 2530 of FIG. 25B. In addition, the controller 190 may control the display 130 to display the front display area 2511 from which the screen including the previously received messages disappears as shown in view 2540 of FIG. 25B.

Figure 26:
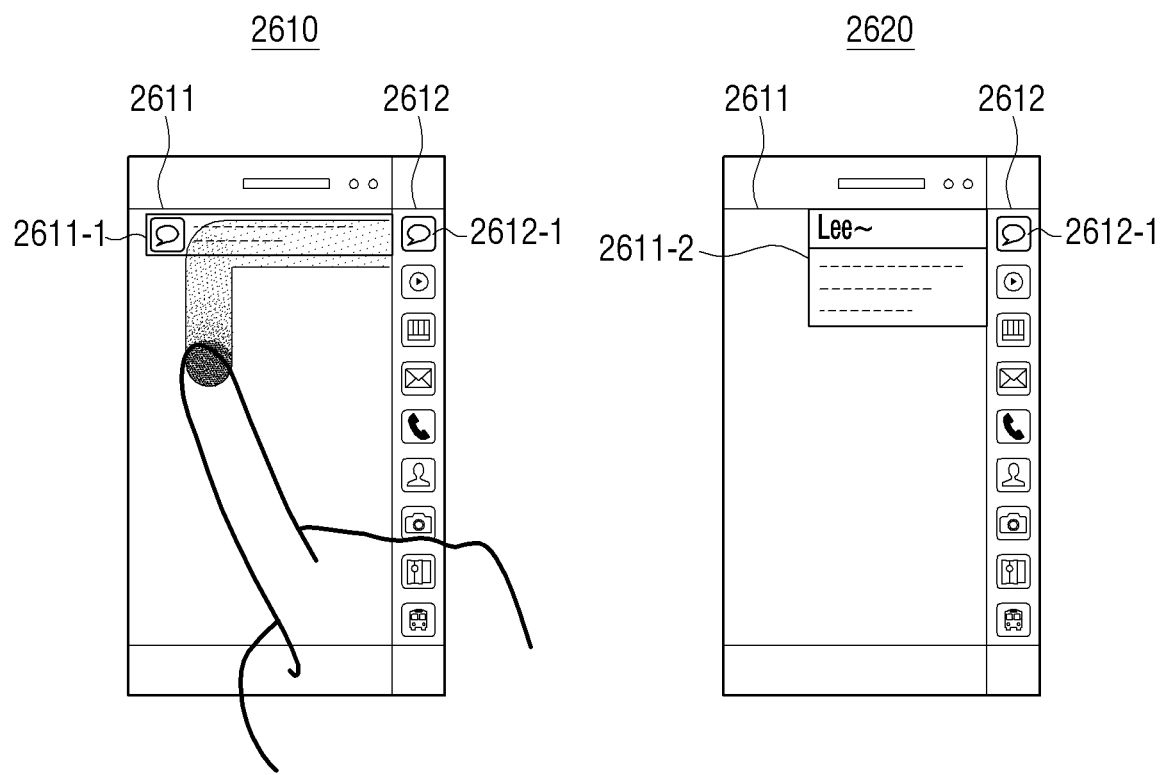

Referring to view 2610 of FIG. 26, while application identification information list is displayed on a side display area, the sensor 180 may detect a user input touching one piece of application identification information 2612-1 included in the application identification information list and then dragging in one direction. For example, the one direction may be a horizontal direction in which the dragging starts from the touch location of the side display area and moves to the front display area. In response to the user input, the controller 190 may control the display 130 to display an application execution screen corresponding to the application identification information on the front display area 2611. For example, when the one piece of application identification information 2612-1 is an icon of a messenger application, the controller 190 may control the display 130 to display a screen 2611-1 including a text of one to three lines. Next, the sensor 180 may detect a user input dragging in the vertical direction (for example, downward direction) continuously while still holding the previous dragging on the front display area 2611. In response to the user input, referring to view 2620 of FIG. 26, the controller 190 may control the display 130 to display a screen 2611-2 including more message contents on the front display area 2611. For example, when the screen 2611-1 including the text of one to three lines includes information on reception of the message or the title of the message, the screen 2611-2 including more message contents may be at least one of the main text of the message, contents attached to the message, or information of the contents attached to the message.

Figure 27A:
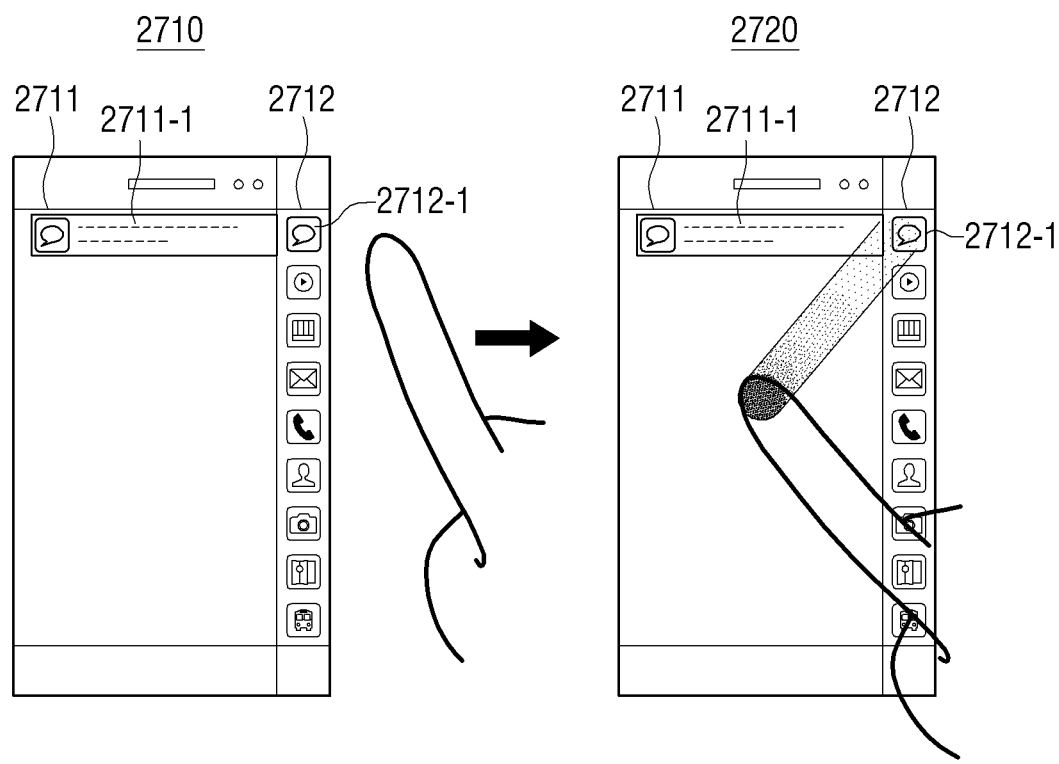
Figure 27B:
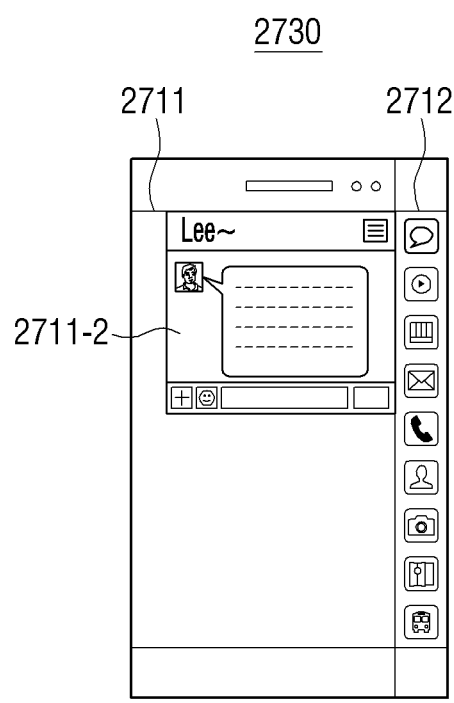

Referring to view 2710 of FIG. 27A, while a screen 2711-1 including a text of one to three lines is displayed on a front display area 2711, the sensor 180 may detect a user input taking the user's finger off. Next, referring to view 2720 of FIG. 27A and view 2730 of FIG. 27B, the sensor 180 may detect a user input touching one piece of application identification information 2712-1 included in application identification information list of a side display area 2712 and then dragging in one direction. In response to the user input, the controller 190 may control the display 130 to remove the existing screen 2711-1 including the text of one to three lines and display an application execution screen 2711-2 corresponding to the newly selected one piece of application identification 2712-1.

Figure 28A:
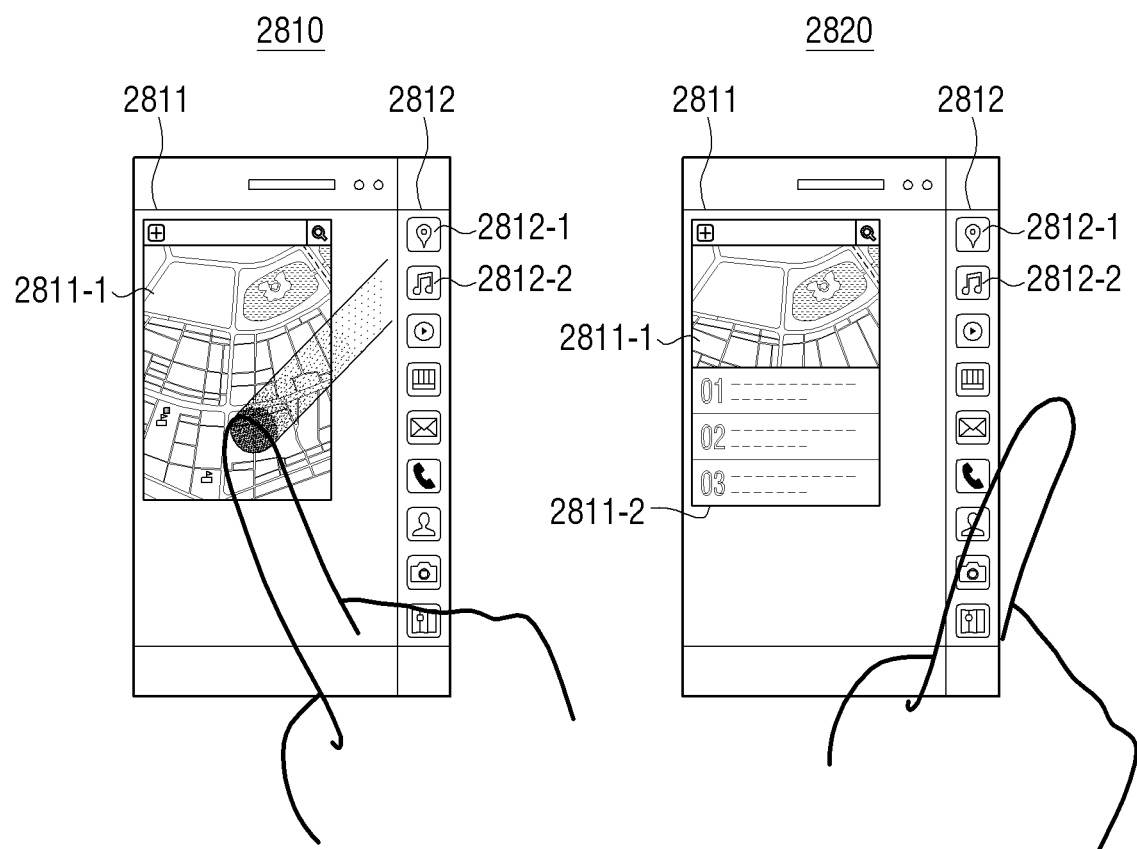
Figure 28B:
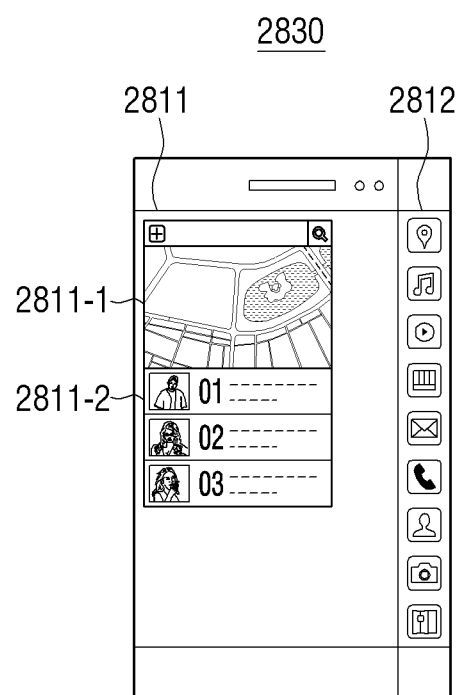

Referring to view 2810 of FIG. 28A, while an application identification information list is displayed on a side display area 2812, the sensor 180 may detect a user input touching one piece of application identification information 2812-1 included in the application identification information list and dragging toward a front display area 2811. In response to the user input, the controller 190 may control the display 130 to display one application execution screen 2811-1 corresponding to the one piece of application identification information 2812-1 on the front display area 2811. Next, the sensor 180 may detect a user input touching another piece of application identification information 2812-2 included in the application identification information list and dragging toward the front display area 2811. In response to the user input, the controller 190 may control the display 130 to display at least part of another application execution screen 2811-2 corresponding to another piece of application identification information 2812-2 on the front display area 2811, as shown in view 2820 of FIG. 28A. In this case, at least part of the one application execution screen 2811-1 may overlap another application execution screen 2811-2. In this case, in the state in which the touch of the user input is held, the controller 190 may control the display 130 to display the area where the application execution screens 2811-1 and 2811-2 overlap each other or another application execution screen 2811-2 as a translucent screen. Next, the sensor 180 may detect a user input to remove the touch which is being held on a predetermined location. In this case, the predetermined location may be in the center area of the front display area 2811. For example, the center area may be an area within ⅓ of the distance from the center of the front display area 2811 to the side vertically extending from the center of the front display area 2811. In response to the user input, the controller 190 may control the display 130 to combine the one application execution screen 2811-1 and another application execution screen 2811-2 and display the combined screens as a single screen, as shown in view 2830 of FIG. 28B.

Figure 28C:
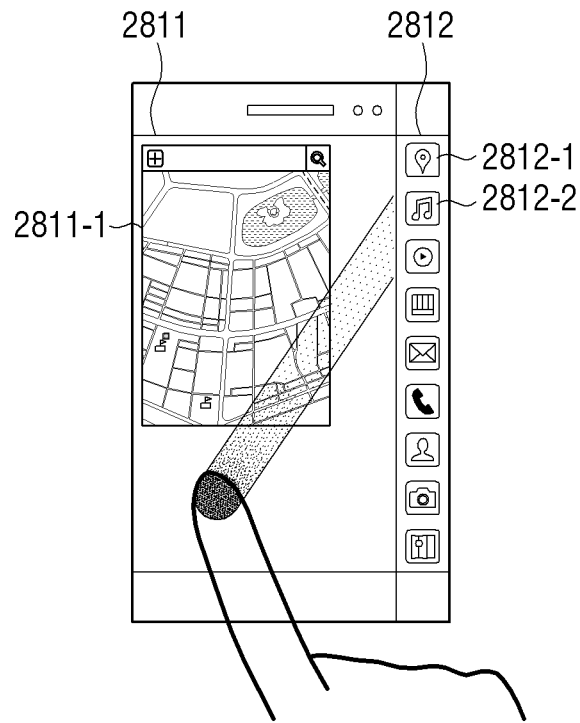
Figure 28C:
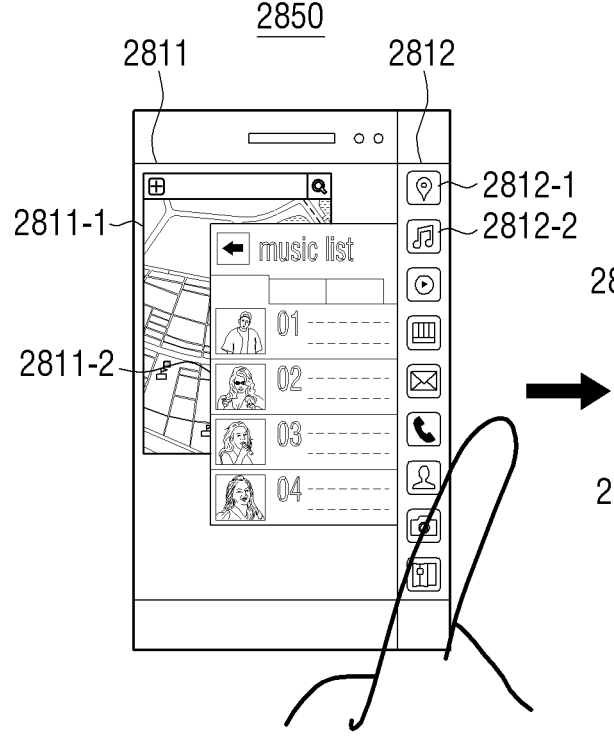
Figure 28C:
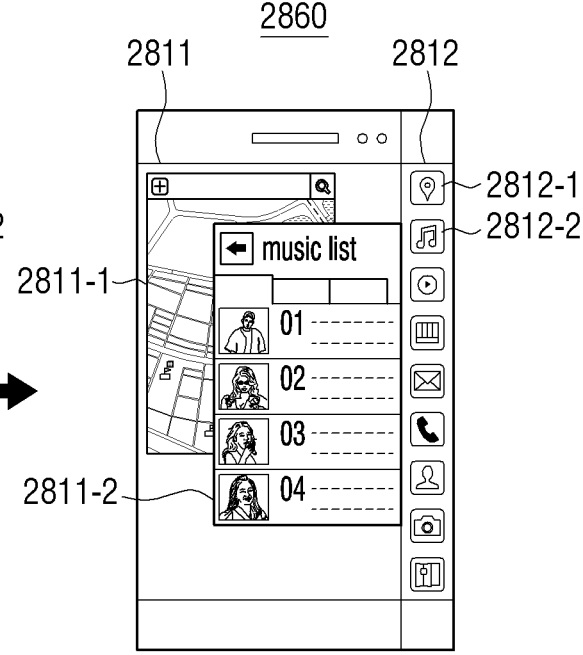

According to another exemplary embodiment, referring to view 2840 of FIG. 28C, while the one application execution screen 2811-1 is displayed on the front display area 2811, the sensor 180 may detect a user input touching another piece of application identification information 2812-2 included in the application identification information list and dragging toward the front display area 2811. In response to the user input, the controller 190 may control the display 130 to display at least part of another application execution screen 2811-2 corresponding to another piece of application identification information 2812-2 on the front display area 2811, as shown in view 2850 of FIG. 28C. Next, the sensor 180 may detect a user input to remove the touch which is being held in a predetermined location. In this case, the predetermined location may be a location which is out of the center area of the front display area 2811 of view 2820 of FIG. 28A. In response to the user input, as shown in view 2860 of FIG. 28C, the controller 190 may control the display 130 to display the one application execution screen 2811-1 and another application execution screen 2811-2 independently.

Figure 29A:
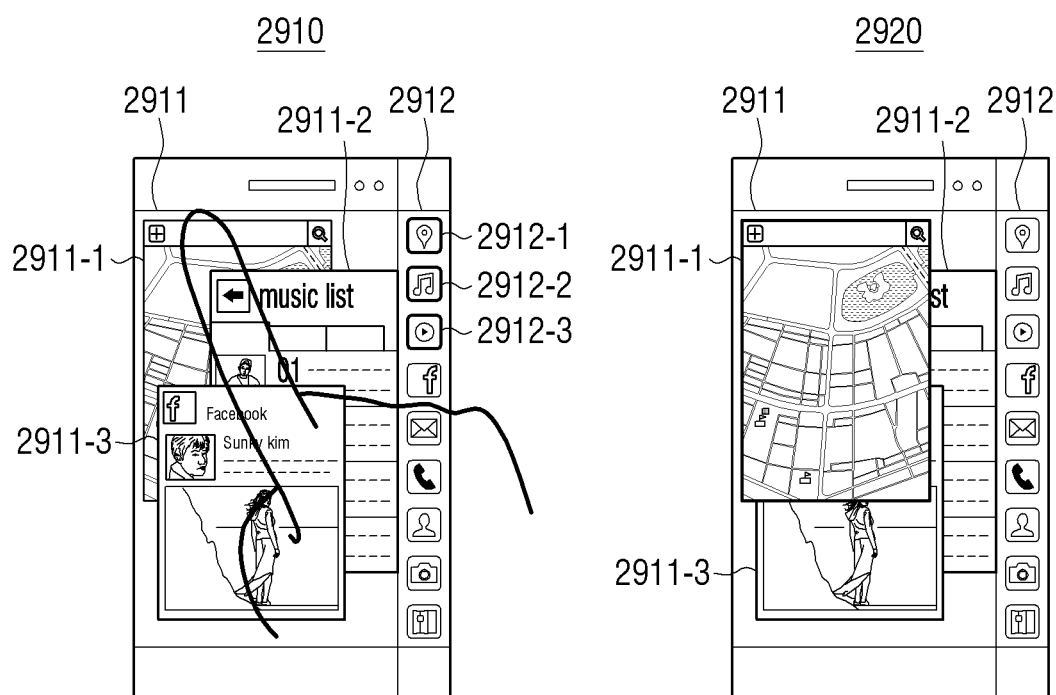

Referring to view 2910 of FIG. 29A, the display 130 may display a plurality of application execution screens 2911-1, 2911-2, and 2911-3 on a front display area 2911. In this case, application identification information 2912-1, 2912-2, and 2912-3 corresponding to the plurality of application execution screens 2911-1, 2911-2, and 2911-3 may be highlighted and displayed on a side display area 2912. In this state, the sensor 180 may detect a user input touching one application execution screen 2911-1 on the front display area 2911 of the plurality of applications. In response to the user input, the controller 190 may control the display 130 to display the selected one application execution screen 2911-1 from among the plurality of application execution screens 2911-1, 2911-2, and 2911-3 on the uppermost layer, as shown in view 2920 of FIG. 29A.

Figure 29B:
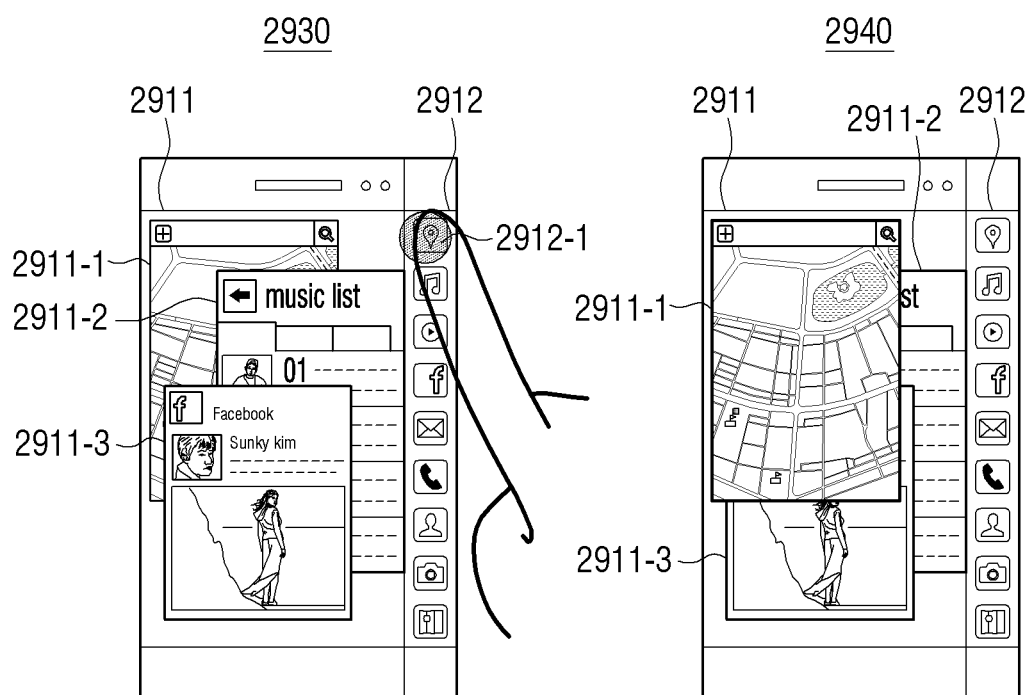

According to another exemplary embodiment, referring to view 2930 of FIG. 29B, the display 130 may display the plurality of application execution screens 2911-1, 2911-2, and 2911-3 on the front display area 2911. In this state, the sensor 180 may detect a user input touching one piece of application identification information 2912-1 corresponding to one application execution screen 2911-1 in the application identification information list of the side display area 2912. In response to the user input, the controller 190 may control the display 130 to display the selected one application execution screen 2911-1 from among the plurality of application execution screens 2911-1, 2911-2, and 2911-3 on the uppermost layer, as shown in view 2940 of FIG. 29B.

Figure 29C:
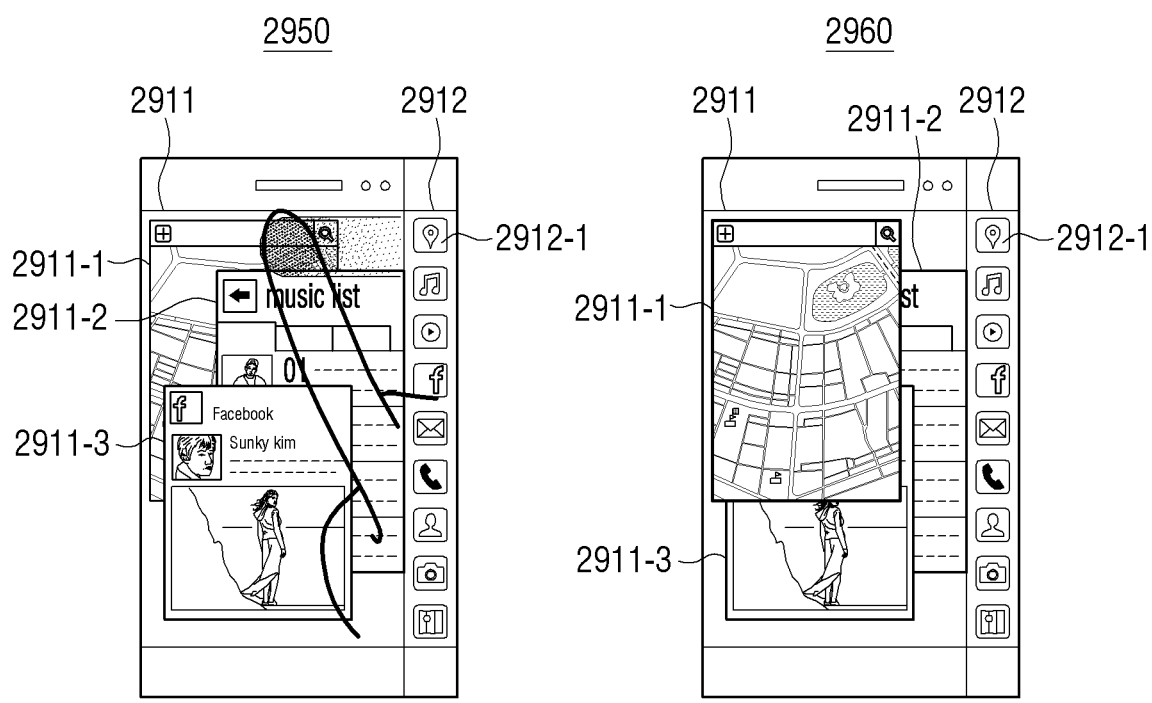

According to another exemplary embodiment, referring to view 2950 of FIG. 29C, the display 130 may display the plurality of application execution screens 2911-1, 2911-2, and 2911-3 on the front display area 2911. In this state, the sensor 180 may detect a user input touching one piece of application identification information 2912-1 corresponding to one application execution screen 2911-1 in the application identification information list of the side display area 2912, and then dragging toward the front display area 2911 in the horizontal direction. In response to the user input, the controller 190 may control the display 130 to display the selected one application execution screen 2911-1 from among the plurality of application execution screens 2911-1, 2911-2, and 2911-3 on the uppermost layer, as shown in view 2960 of FIG. 29C.

Figure 30:
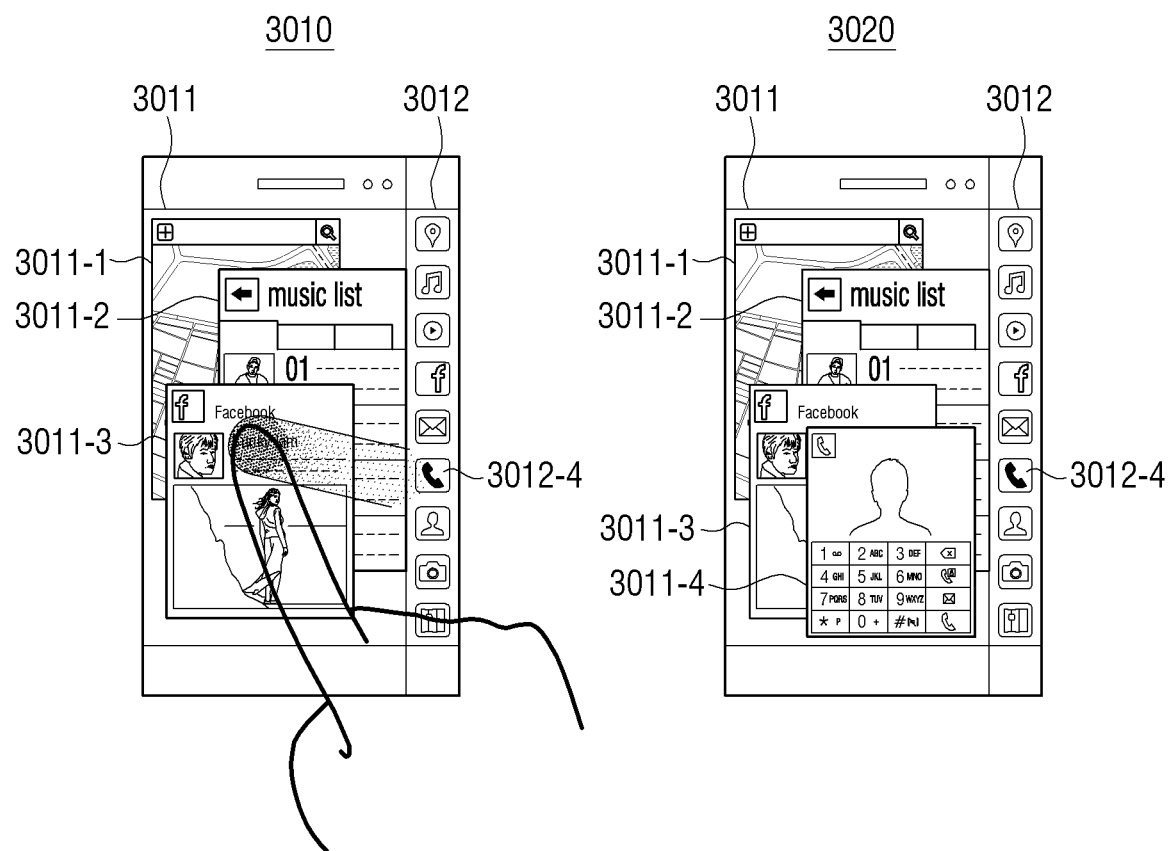

Referring to view 3010 of FIG. 30, the display 130 may display a plurality of application execution screens 3011-1, 3011-2, and 3011-3 on a front display area 3011. In this state, the sensor 180 may detect a user input touching one piece of application identification information 3012-4 in the application identification information list of a side display area 3012, and then dragging toward the front display area 3011 in the diagonal direction. In response to the user input, the controller 190 may control the display 130 to display an application execution screen 3011-4 corresponding to the selected one piece of application identification information 3012-4 on the front display area 3011, as shown in view 3020 of FIG. 30.

Figure 31A:
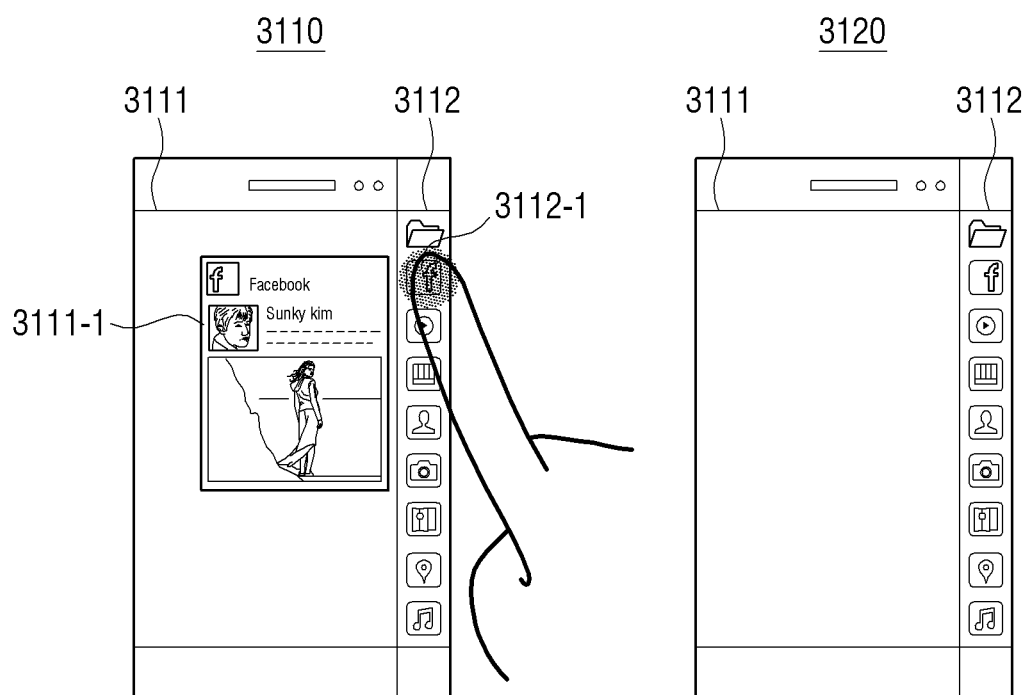

Referring to view 3130 of FIG. 31A, the display 130 may display an application execution screen 3111-1 on a front display area 3111. In this state, the sensor 180 may detect a user input touching application identification information 3112-1 corresponding to the application execution screen 3111-1 in the application identification information list of a side display area 3112. In response to the user input, the controller 190 may control the display 130 to remove the application execution screen 3111-1 or minimize and display the application execution screen 3111-1 on one side of the front display area 3111 or the side display area 3112 as shown in view 3120 of FIG. 31A.

Figure 31B:
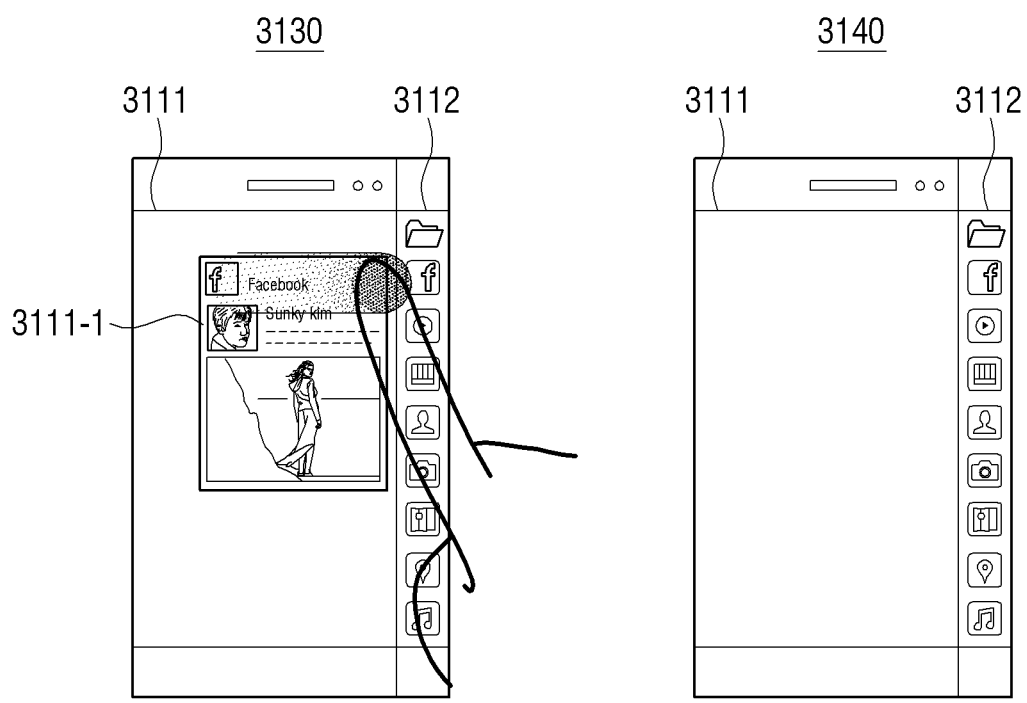

According to another exemplary embodiment, referring to view 3130 of FIG. 31B, the display 130 may display the application execution screen 3111-1 on the front display area 3111. In this state, the sensor 180 may detect a user input touching the application execution screen 3111-1 and then dragging or flicking toward the side display area 3112. In response to the user input, the controller 190 may control the display 130 to remove the application execution screen 3111-1 or minimize and display the application execution screen 3111-1 on one side of the front display area 3111 or the side display area 3112 as shown in view 3140 of FIG. 31B.

Figure 32A:
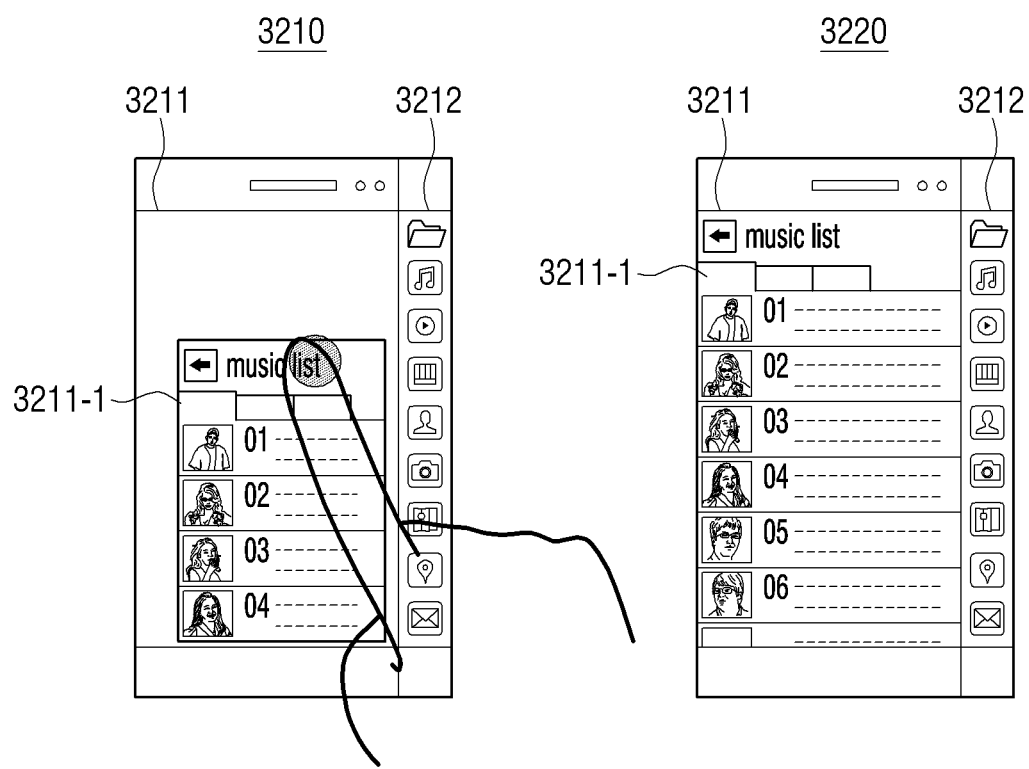

Referring to view 3210 of FIG. 32A, the display 130 may display a side display area 3212 (e.g., an auxiliary display area) and an application execution screen 3211-1 on a front display area 3211. In this state, the sensor 180 may detect a user input double touching the upper end of the application execution screen 3211-1. In response to the user input, the controller 190 may control the display 130 to increase the size of the application execution screen 3211-1 and display it as shown in view 3220 of FIG. 32A. The increasing the size of the application execution screen 3211-1 may refer to increasing the magnification ratio of the screen or increasing the size of the screen and thus including more information.

Figure 32B:
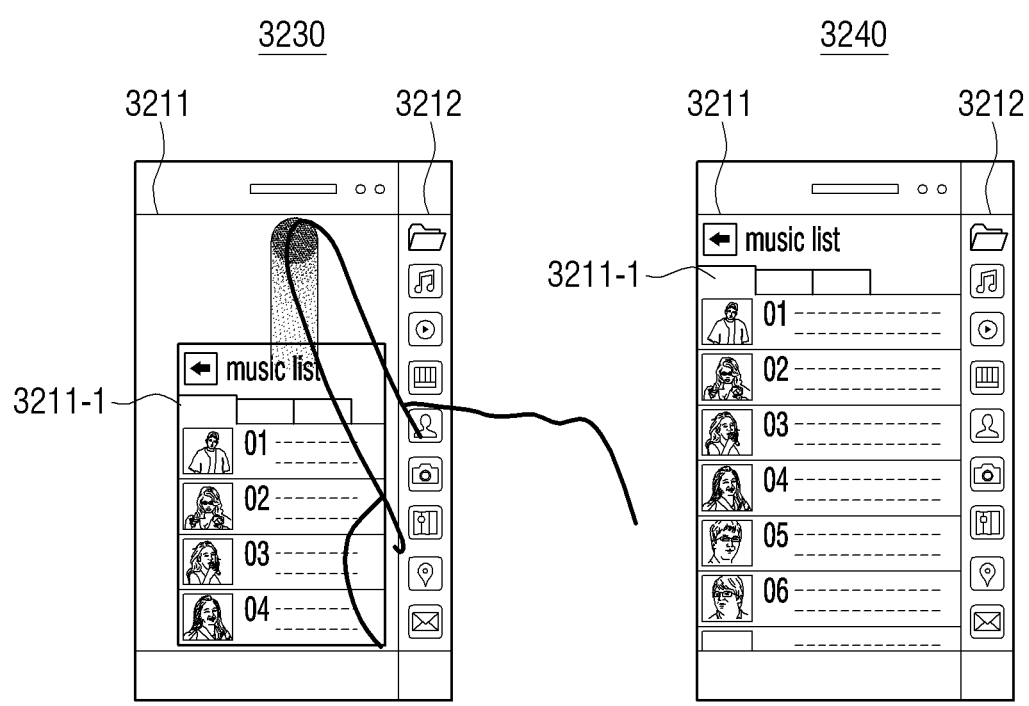

According to another exemplary embodiment, referring to view 3230 of FIG. 32B, the display 130 may display the application execution screen 3211-1 on the front display area 3211. In this state, the sensor 180 may detect a user input touching the upper end of the application execution screen 3211-1 and then flicking or dragging in the vertical direction (for example, upward direction). In response to the user input, the controller 190 may control the display 130 to increase the size of the application execution screen 3211-1 and display the application execution screen 3211-1, as shown in view 3240 of FIG. 32B.

Figure 33A:
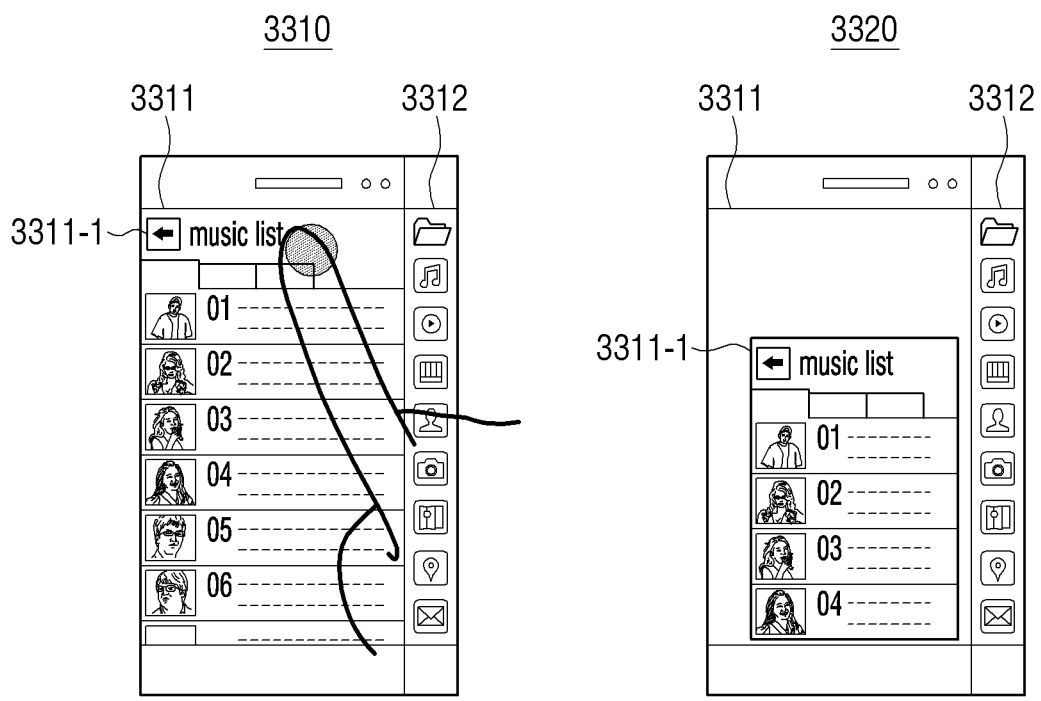

Referring to view 3310 of FIG. 33A, the display 130 may display a side display area 3312 and an application execution screen 3311-1 on a front display area 3311. In this state, the sensor 180 may detect a user input double touching or double tapping the upper end of the application execution screen 3311-1. In response to the user input, the controller 190 may control the display 130 to decrease the size of the application execution screen 3311-1 and display it as shown in view 3320 of FIG. 33A. The decreasing the size of the application execution screen 3311-1 may refer to decreasing the magnification ratio of the screen or decreasing the size of the screen and thus including less information.

Figure 33B:
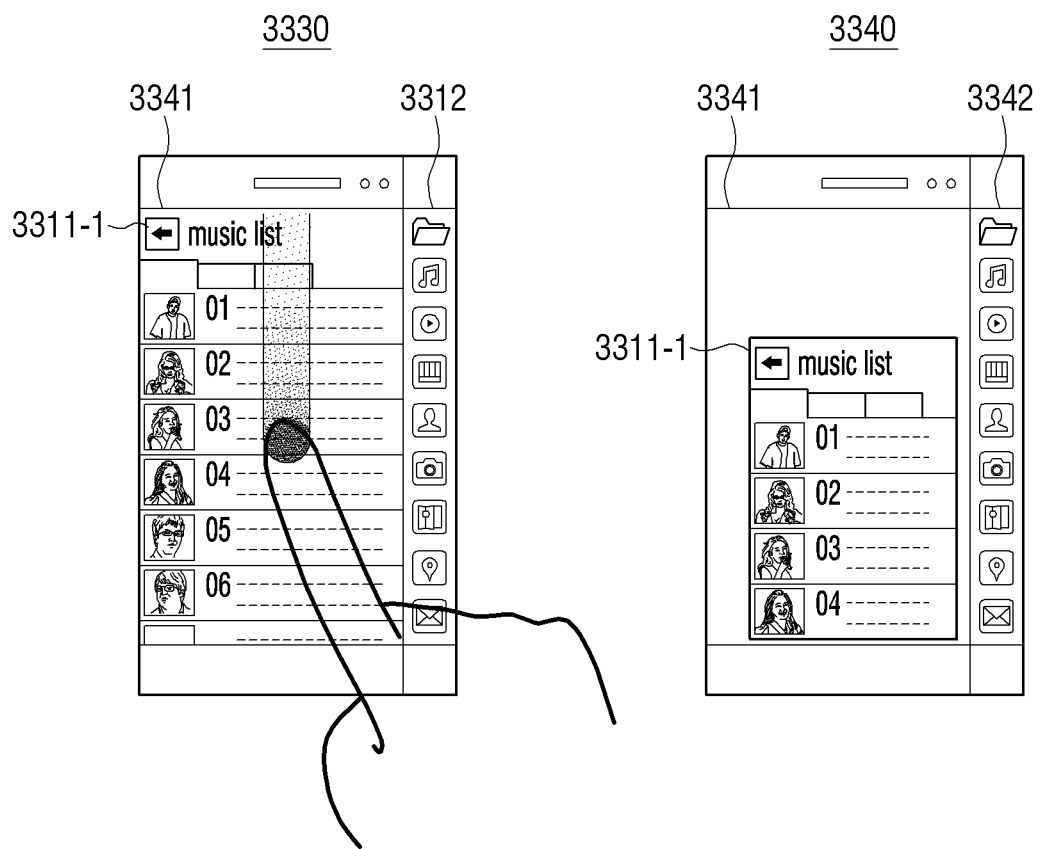

According to another exemplary embodiment, referring to view 3330 of FIG. 33B, the display 130 may display the application execution screen 3311-1 on the front display area 3311. In this state, the sensor 180 may detect a user input touching the upper end of the application execution screen 3311-1 and then flicking or dragging in the vertical direction (for example, downward direction). In response to the user input, the controller 190 may control the display 130 to increase the size of the application execution screen 3311-1 and display the application execution screen 3311-1, as shown in view 3340 of FIG. 33B.

Figure 34A:
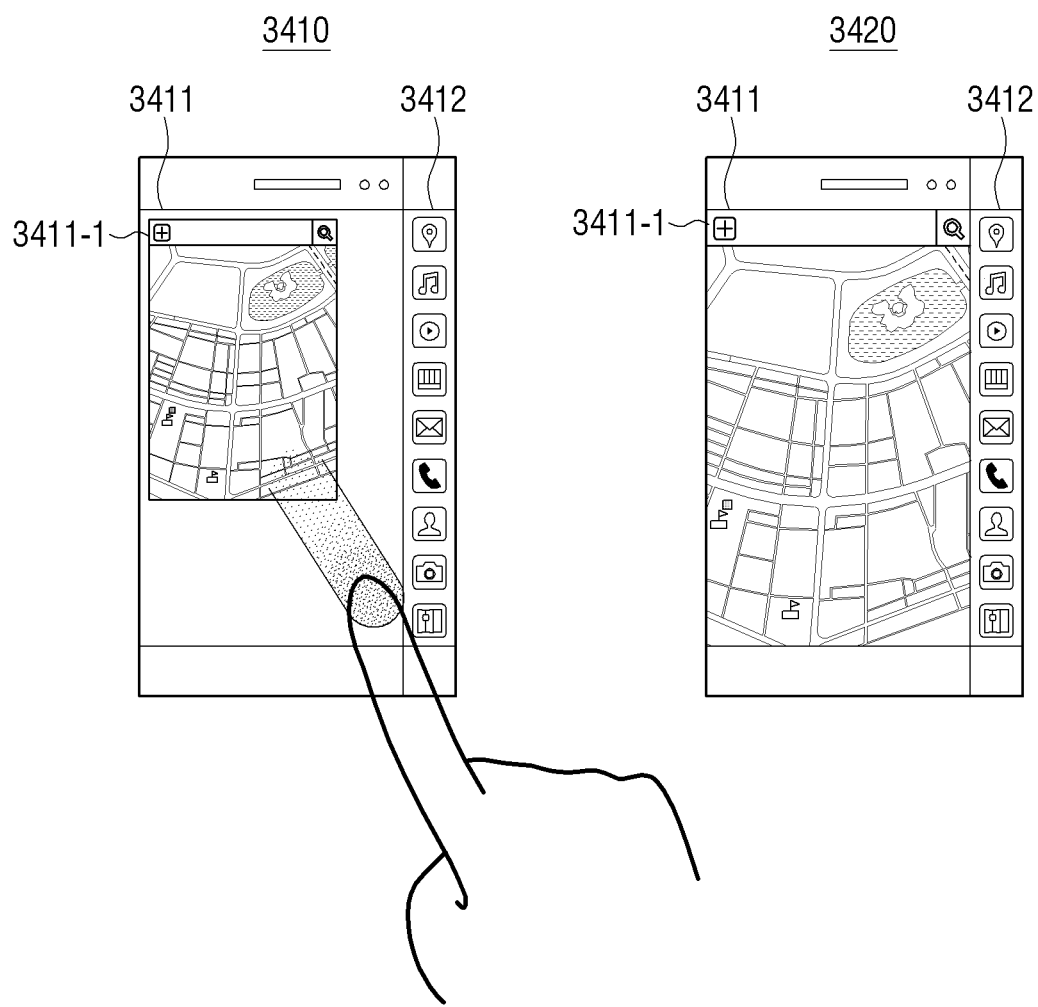

Referring to view 3410 of FIG. 34A, the display 130 may a side display area 3412 and display an application execution screen 3411-1 on a front display area 3411. In this state, the sensor 180 may detect a user input hovering over a corner of the application execution screen 3411-1 and then dragging. In response to the user input, the controller 190 may control the display 130 to increase the size of the application execution screen 3411-1 in proportion to the length of the dragging and display the application execution screen 3411-1 as shown in view 3420 of FIG. 34A. For example, when the user's dragging moves to a corner of the front display area 3411 or close to the corner, the size of the application execution screen 3411-1 may increase to correspond to the full size of the front display area 3411.

Figure 34B:
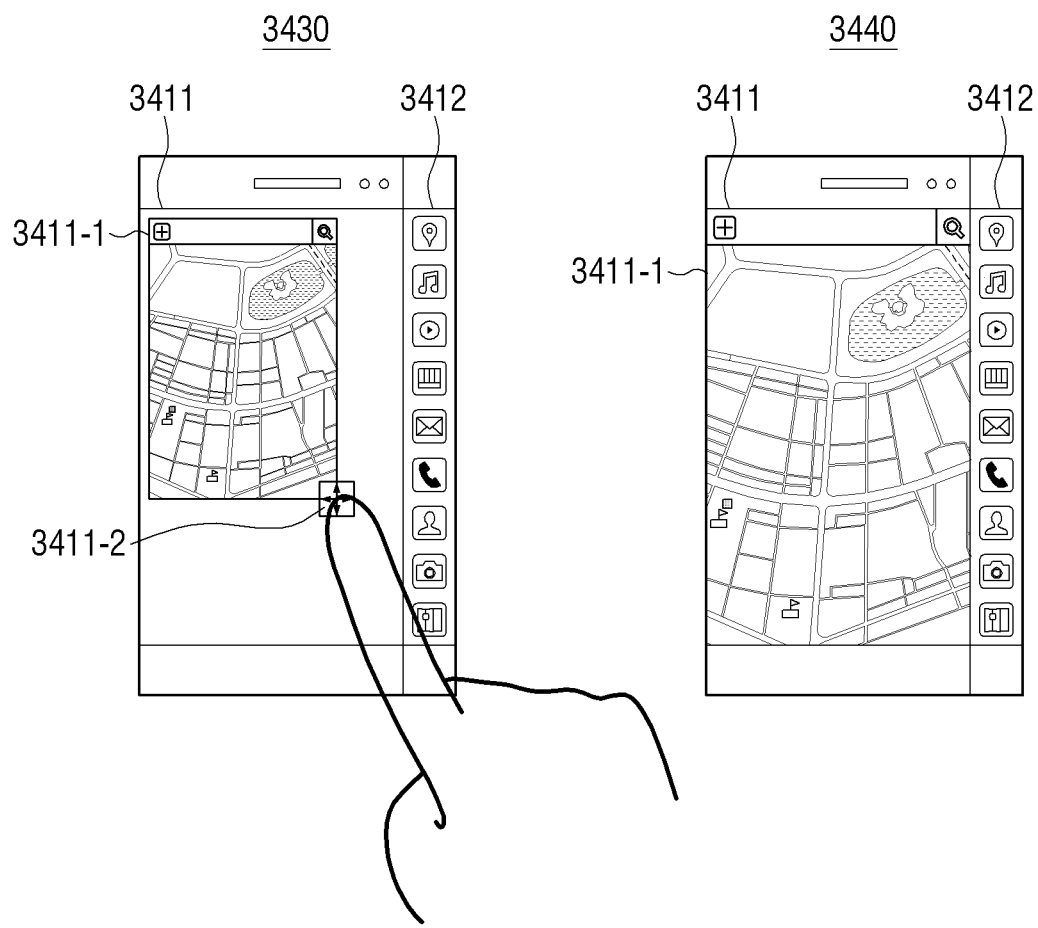

According to another exemplary embodiment, referring to view 3430 of FIG. 34B, the display 130 may display the application execution screen 3411-1 on the front display area 3411. In this state, the sensor 180 may detect a user input hovering over the corner of the application execution screen 3411-1. In response to the user input, the controller 190 may control the display 130 to display a UI element 3411-2 for adjusting the size of the application execution screen 3411-1 on the hovering location. While the UI element 3411-2 is displayed, the sensor 180 may detect a user input dragging while still hovering. In response to the user input, the controller 190 may control the display 130 to increase or decrease the size of the application execution screen 3411-1 in proportion to the length of the dragging, and display the application execution screen 3411-1. On the other hand, while the UI element is displayed, the sensor 180 may detect a user input touching the UI element. In this case, the controller 190 may control the display 130 to display the application execution screen 3411-1 to correspond to the full size of the front display area 3411 as shown in view 3440 of FIG. 34B.

Figure 35A:
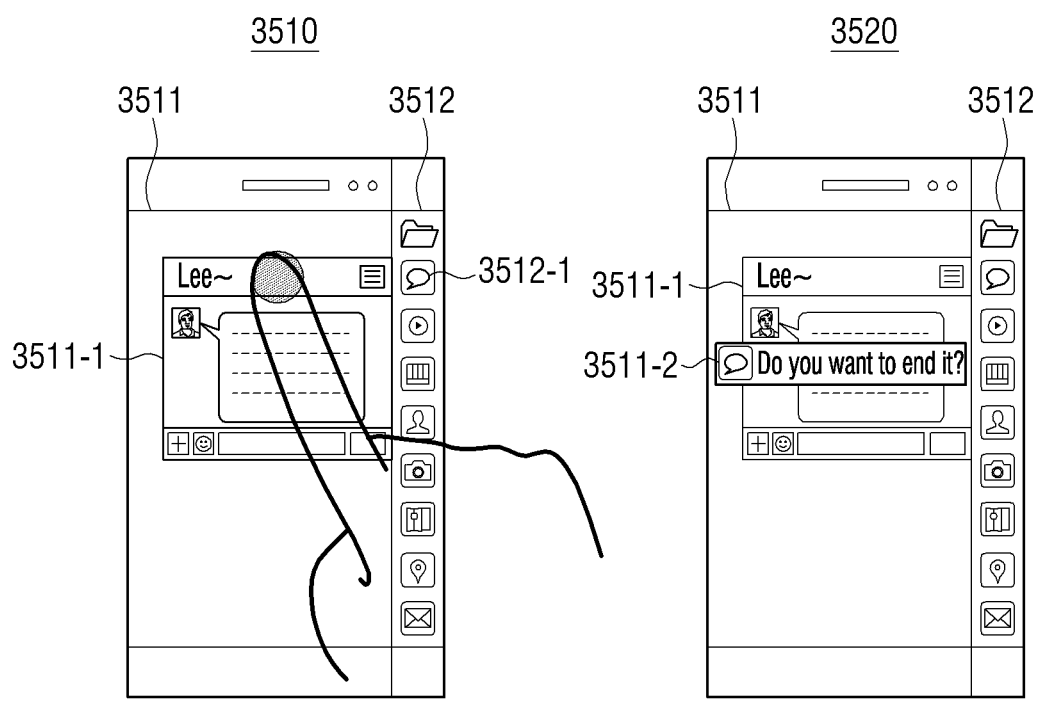

Referring to view 3510 of FIG. 35A, the display 130 may display an application execution screen 3511-1 on a front display area 3511. In this state, the sensor 180 may detect a user input touching the upper end of the application execution screen 3511-1 and holding the touch for a predetermined time (for example, 1 or 2 seconds). According to another exemplary embodiment, the sensor 180 may detect a user input touching application identification information 3512-1 corresponding to the application execution screen 3511-1 on a side display area 3512 and holding the touch for a predetermined time (for example, 1 or 2 seconds). In response to the user input, the display 130 may display a UI element 3511-2 asking whether to end the application execution screen 3511-1 on the front display area 3511 as shown in view 3520 of FIG. 35A. In response to a user input confirming ending of the application execution screen 3511-1, the controller 190 may remove the application execution screen 3511-1 from the front display area 3511.

Figure 35B:
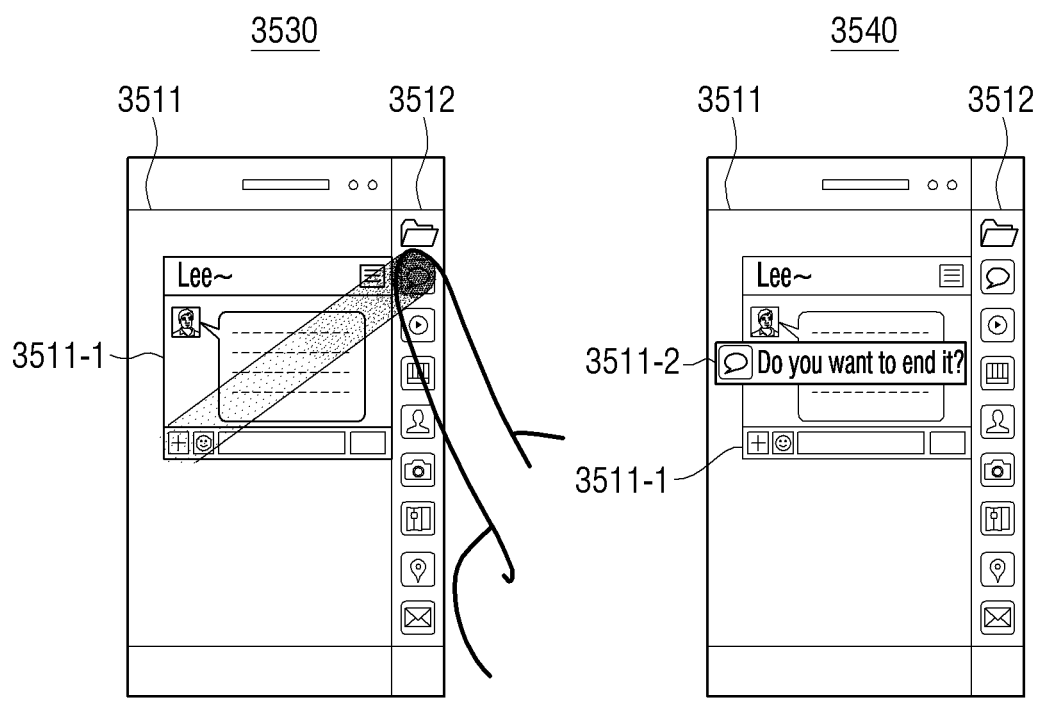

According to another exemplary embodiment, referring to view 3530 of FIG. 35B, the display 130 may display the application execution screen 3511-1 on the front display area 3511. In this state, the sensor 180 may detect a user input touching one point of the application execution screen 3511-1 and then dragging in the oblique direction. According to another exemplary embodiment, the sensor 180 may detect a user input touching one point of the application execution screen 3511-1 and then dragging toward the side display area 3512. In response to the user input, the display 130 may display the UI element 3511-2 asking whether to end the application execution screen 3511-1 on the front display area 3511 as shown in view 3540 of FIG. 35B. In response to a user input confirming ending of the application execution screen 3511-1, the controller 190 may remove the application execution screen 3511-1 from the front display area 3511.

Figure 36:
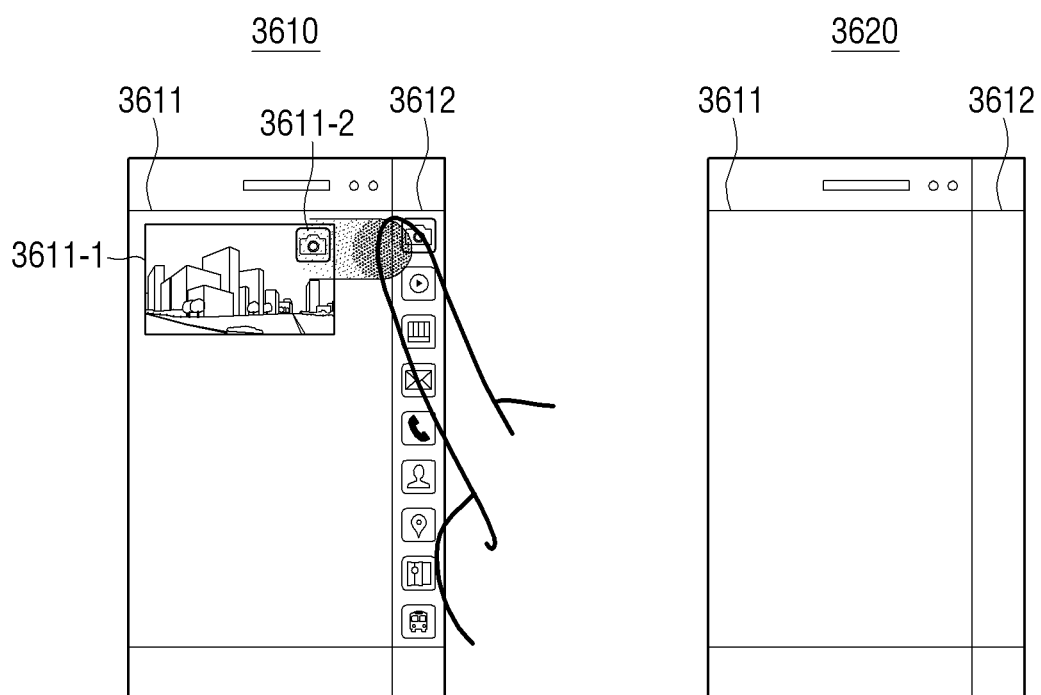

Referring to view 3610 of FIG. 36, the display 130 may display an application execution screen 3611-1 on a front display area 3611. In this case, a UI element 3611-2 for controlling the application execution screen 3611-1 may be displayed on one side of the application execution screen 3611-1. For example, the UI element 3611-2 may be displayed in the form of an icon representing the application execution screen 3611-1 and may help the user easily know the kind of the application execution screen 3611-1. In particular, the UI element 3611-2 may be selectively displayed when the application execution screen has no upper end bar. The user may perform a variety of interaction to control the application execution screen 3611-1 using the UI element 3611-2. For example, in response to the user touching the UI element 3611-2 and then dragging, the application execution screen 3611-1 may be moved. In addition, in response to the user double tapping the UI element 3611-2, the application execution screen 3611-1 may be magnified. In addition, in response to the user touching the UI element 3611-2 and then dragging toward a side display area 3612, the controller 190 may control the display 130 not to display the application execution screen 3611-1 as shown in view 3620 of FIG. 36. As described above, when the user controls the application execution screen 3611-1 using the UI element 3611-2 without using an upper end bar, the user can be provided with the application execution screen 3611-1 including more information as the upper end bard is deleted.

FIGS. 37 to 48 are views showing interaction using a front surface and a side surface of a electronic device 100 according to exemplary embodiments.

According to an exemplary embodiment, the sensor 180 may detect a user input dragging on a side display area while selecting a front display area. In response to the user input, the controller 190 may control information related to an image content included in the front display area. For example, the controller 190 may adjust the size of the image content, adjust the size of a part of the image content, or adjust the volume related to the image content by considering the length of the dragging. As described, by performing multiple touches on the front display area and the side display area simultaneously or serially, the convenience of the user using the electronic device 100 with the bent display can be enhanced. In addition, the user can easily and intuitively manipulate the electronic device 100 through a variety of interaction using the front display area and the side display area all together.

Figure 37:
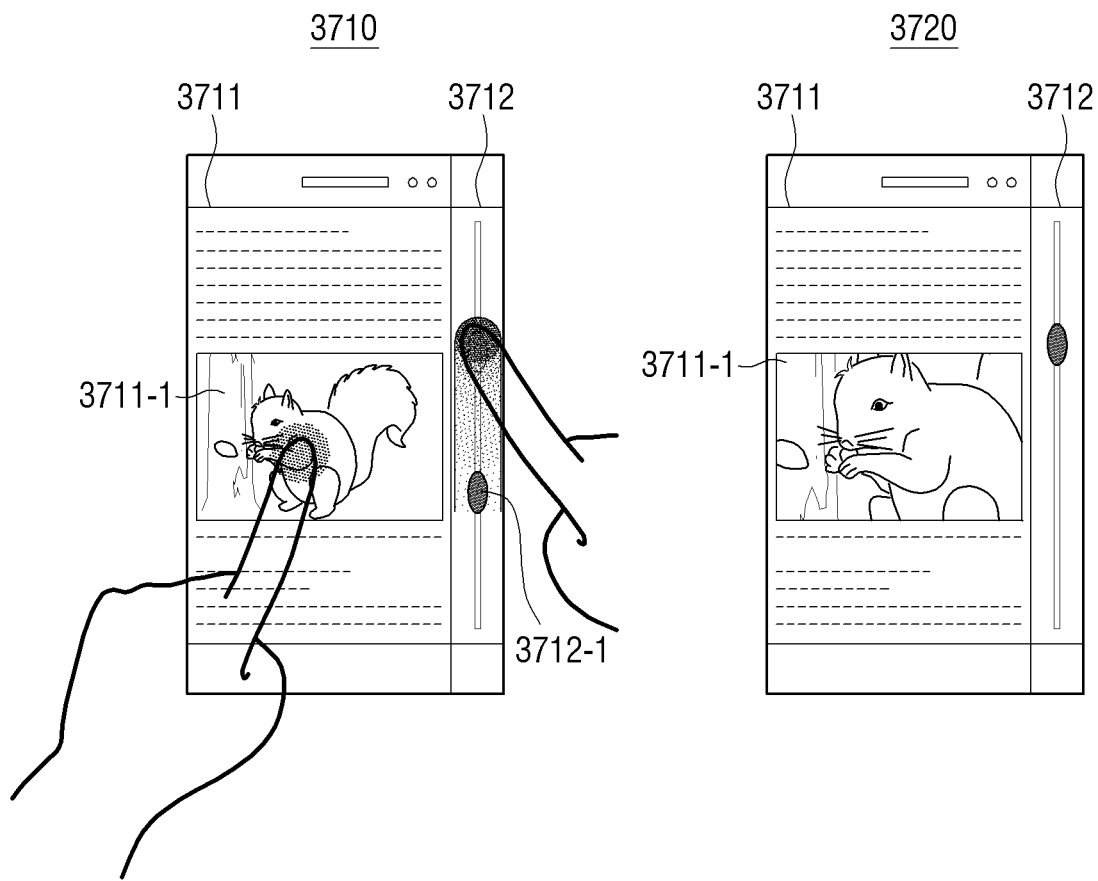
FIGS. 37 to 48 are views showing interaction using a front surface and a side surface of a electronic device according to exemplary embodiments.

Referring to view 3710 of FIG. 37, the controller 190 may execute an e-book application or a document edit application and control the display 130 to display a document including an image content 3711-1 (for example, an image or a moving image) on a front display area 3711. In addition, the controller 190 may control the display 130 to display a UI element 3712-1 (for example, an adjustment button movable along the longitudinal side of a side display area 3712) for controlling the image content 3711-1 on the side display area 3712. In this state, the sensor 180 may detect a user input touching the UI element 3712-1 of the side display area 3712 and then dragging along the longitudinal side, while touching the image content 3711-1 of the front display area 3711. In response to the user input, the controller 190 may control the display 130 to display the document including the image content 3711-1 the size of which has been changed as shown in view 3720 of FIG. 37. The size of the image content 3711-1 may be in proportion to the length of the dragging or the dragging direction on the UI element 3712-1. For example, in response to the UI element 3712-1 moving down, the size of the image content 3711-1 may be reduced. On the other hand, in response to the UI element 3712-1 moving up, the size of the image content 3711-1 may be increased.

Figure 38:
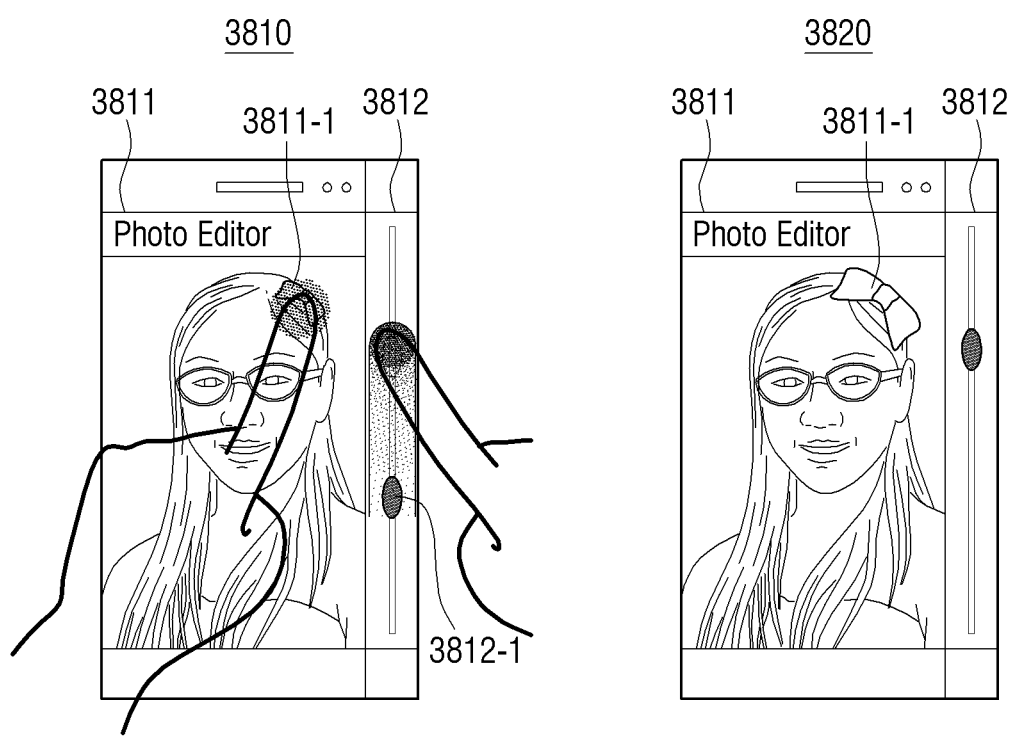

Referring to view 3810 of FIG. 38, the controller 190 may execute a gallery application or a photo edit application and control the display 130 to display an image content (for example, an image) on a front display area 3811. In addition, the controller 190 may control the display 130 to display a UI element 3812-1 for controlling the image content 3711-1 on a side display area 3812. In this state, the sensor 180 may detect a user input touching the UI element 3812-1 of the side display area 3812 and then dragging along the longitudinal side, while touching one object 3811-1 of the image content of the front display area 3811. The one object 3811-1 of the image content may be a part of the image content or a separate object (for example, a speech bubble, an icon, etc.) added to edit the image content. In response to the user input, the controller 190 may control the display 130 to display the object 3811-1 the size of which has been changed as shown in view 3820 of FIG. 38. In this case, the size of the object 3811-1 may be in proportion to the length of the dragging or the dragging direction on the UI element 3812-1. For example, in response to the UI element 3812-1 moving down, the size of the object 3811-1 may be reduced. On the other hand, in response to the UI element 3812-1 moving up, the size of the object 3811-1 may be increased.

Figure 39:
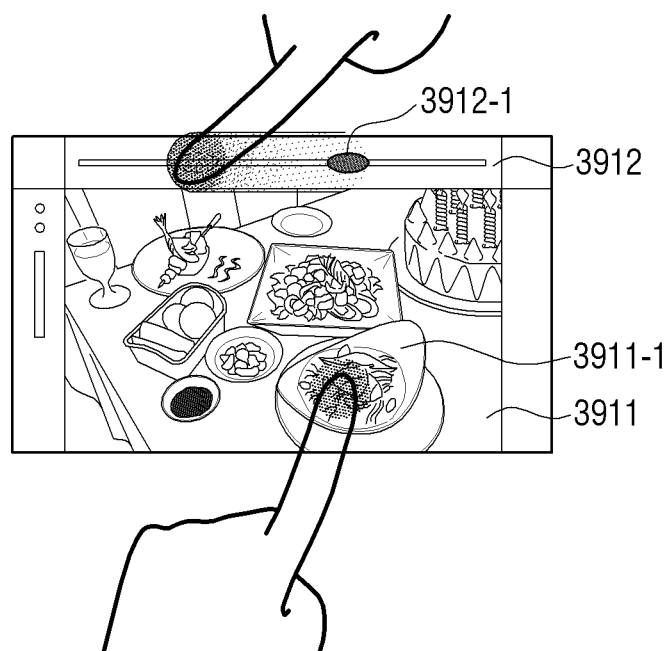
Figure 39:

Referring to view 3910 of FIG. 39, the controller 190 may execute a camera application and control the display 130 to display a preview image on a front display area 3911. In addition, the controller 190 may control the display 130 to display a UI element 3912-1 (for example, an adjustment button movable along the longitudinal side of a side display area 3912) for controlling image content on the side display area 3912. In this state, the sensor 180 may detect a user input touching the UI element 3912-1 of the side display area 3912 and then dragging along the longitudinal side, while touching one point 3911-1 of the preview image of the front display area 3911. In response to the user input, the controller 190 may control the display 130 to display the preview image which is in focus with reference to the one point 3911-1 as shown in view 3920 of FIG. 39. In this case, in proportion to the length of the dragging or the dragging direction on the UI element, the accuracy of being in focus with reference to the one point 3911-1 may vary.

Figure 40:
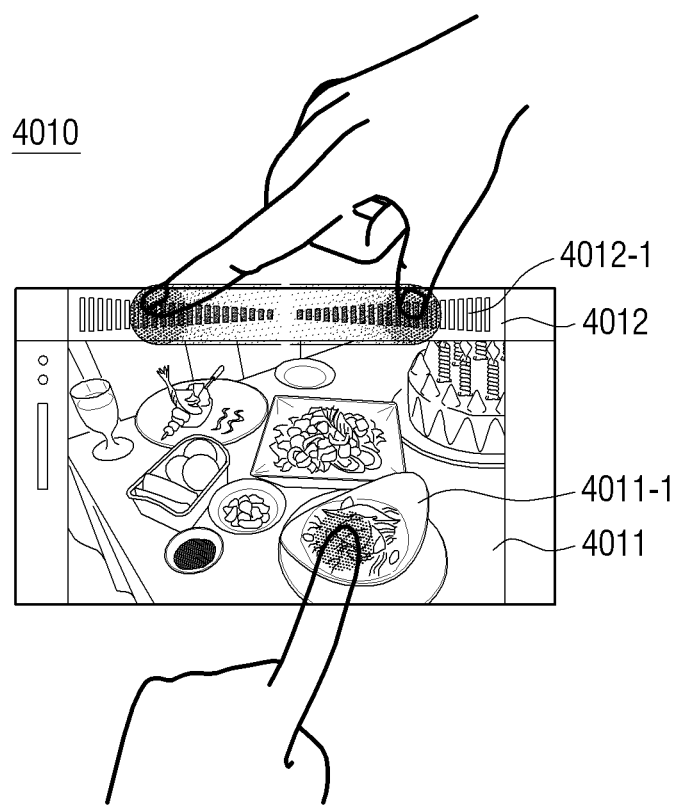
Figure 40:
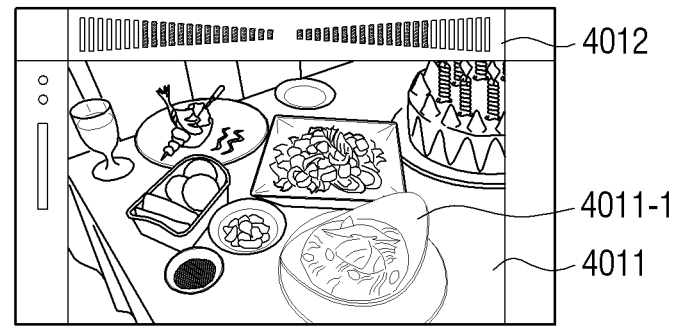

Referring to view 4010 of FIG. 40, the controller 190 may execute a camera application and control the display 130 to display a preview image on a front display area 4011. In addition, the controller 190 may control the display 130 to display a UI element 4012-1 for controlling image content on a side display area 4012. In this state, the sensor 180 may detect a user input touching one point 4011-1 of the preview image and multi-touching the UI element 4012-1 of the side display area 4012 and then dragging to move user's two fingers further apart. In response to the user input, the controller 190 may control the display 130 to adjust the degree of out focusing of neighboring images with reference to the one point 4011-1 as shown in view 4020 of FIG. 40. For example, in proportion to the distance between the two fingers, the clearness or the degree of blurring of the neighboring images with reference to the one point 4011-1 may be changed.

Figure 41:
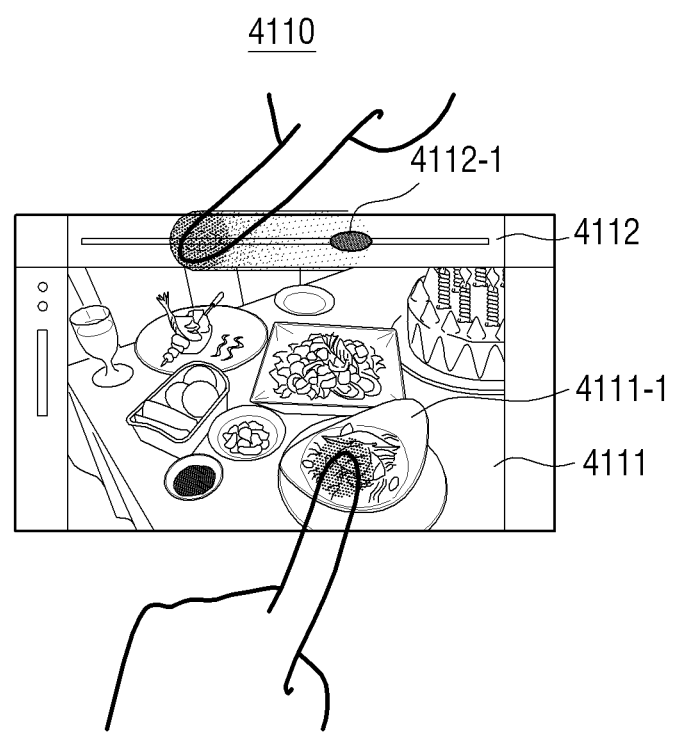
Figure 41:
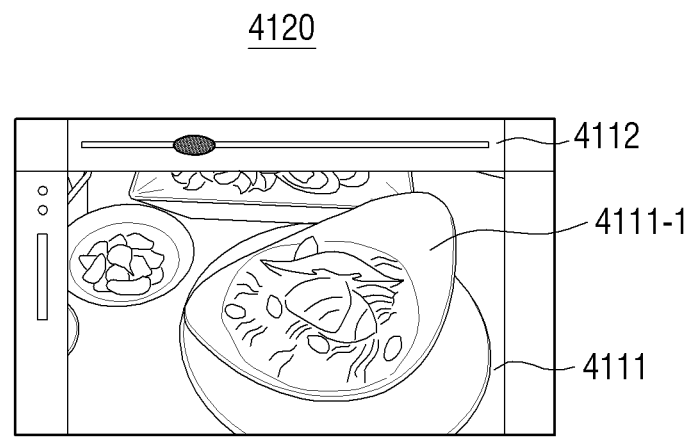

Referring to view 4110 of FIG. 41, the controller 190 may execute a camera application and control the display 130 to display a preview image on a front display area 4111. In addition, the controller 190 may control the display 130 to display a UI element 4112-1 for controlling image content on a side display area 4112. In this state, the sensor 180 may detect a user input touching one point 4111-1 of the preview image of the front display area 4111, and touching the UI element 4112-1 of the side display area 4112 and then dragging along the longitudinal side. In response to the user input, the controller 190 may control the display 130 to zoom in or zoom out the preview image with reference to the one point 4111-1 as shown in view 4120 of FIG. 41.

Figure 42:
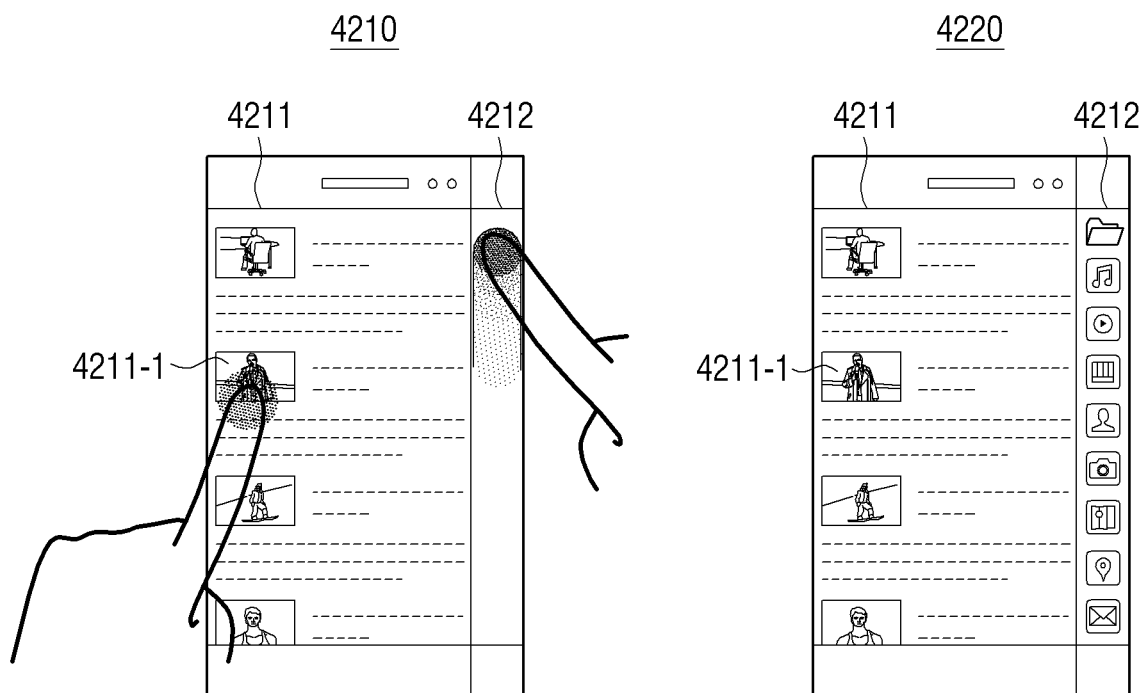

Referring to view 4210 of FIG. 42, the controller 190 may control the display 130 to display a document including an image content 4211-1 (for example, an image or a moving image) on a front display area 4211. In this state, the sensor 180 may detect a user input touching a side display area 4212 and then dragging along the longitudinal side, while touching the image content 4211-1 on the front display area 4211.

In response to the user input, the controller 190 may control the display 130 to display a UI element for rapidly controlling the selected image content 4211-1 on the side display area 4212, as shown in view 4220 of FIG. 42. The UI element displayed on the side display area 4212 may be at least one of a UI element which can edit the image content, a UI element which can transmit the image content 4211-1 to other persons, or a UI element which can store the image content 4211-1.

Figure 43:
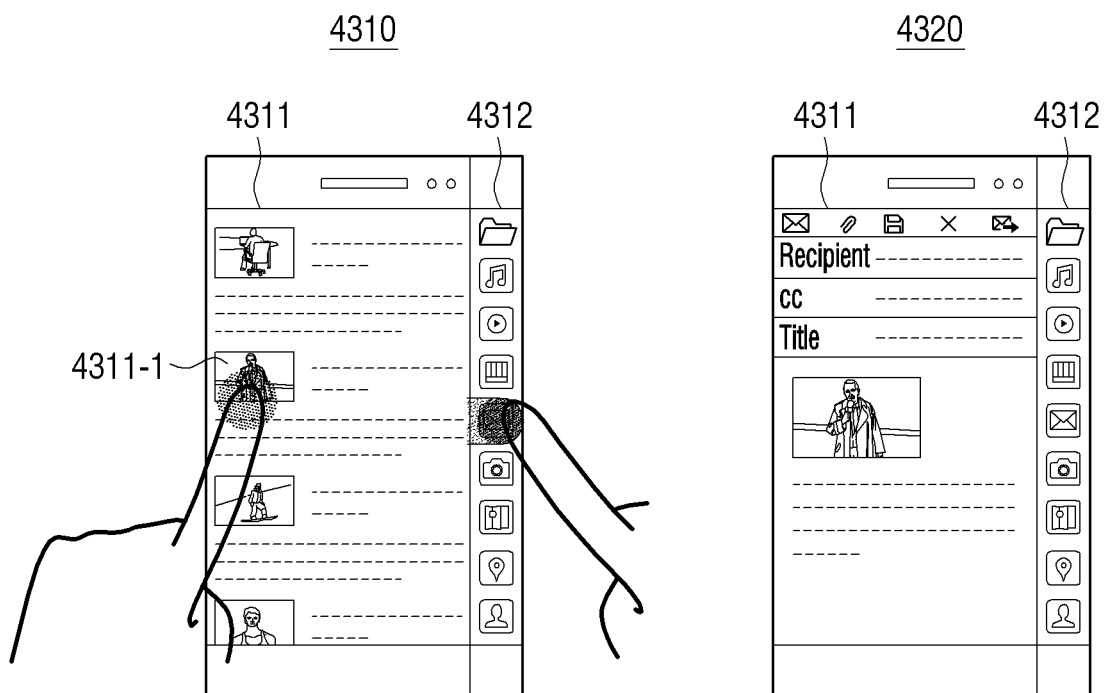

Referring to view 4310 of FIG. 43, the controller 190 may control the display 130 to display a document including an image content 4311-1 (for example, an image or a moving image) on a front display area 4311. In addition, the controller 190 may control the display 130 to display a UI element for controlling the image content 4311-1 on a side display area 4312. In this state, the sensor 180 may detect a user input touching one UI element 4312-1 of the side display area 4312 and then dragging along the short side, while touching the image content 4311-1 on the front display area 4211.

In response to the user input, the controller 190 may control the display 130 to display a function or application execution screen corresponding to the one UI element 4312-1 on the front display area 4311, as shown in view 4320 of FIG. 43. For example, when the one UI element 4312-1 is an icon of an email application, the application execution screen displayed on the front display area 4311 may be an email writing screen including the image content 4311 as an attached file.

Figure 44:
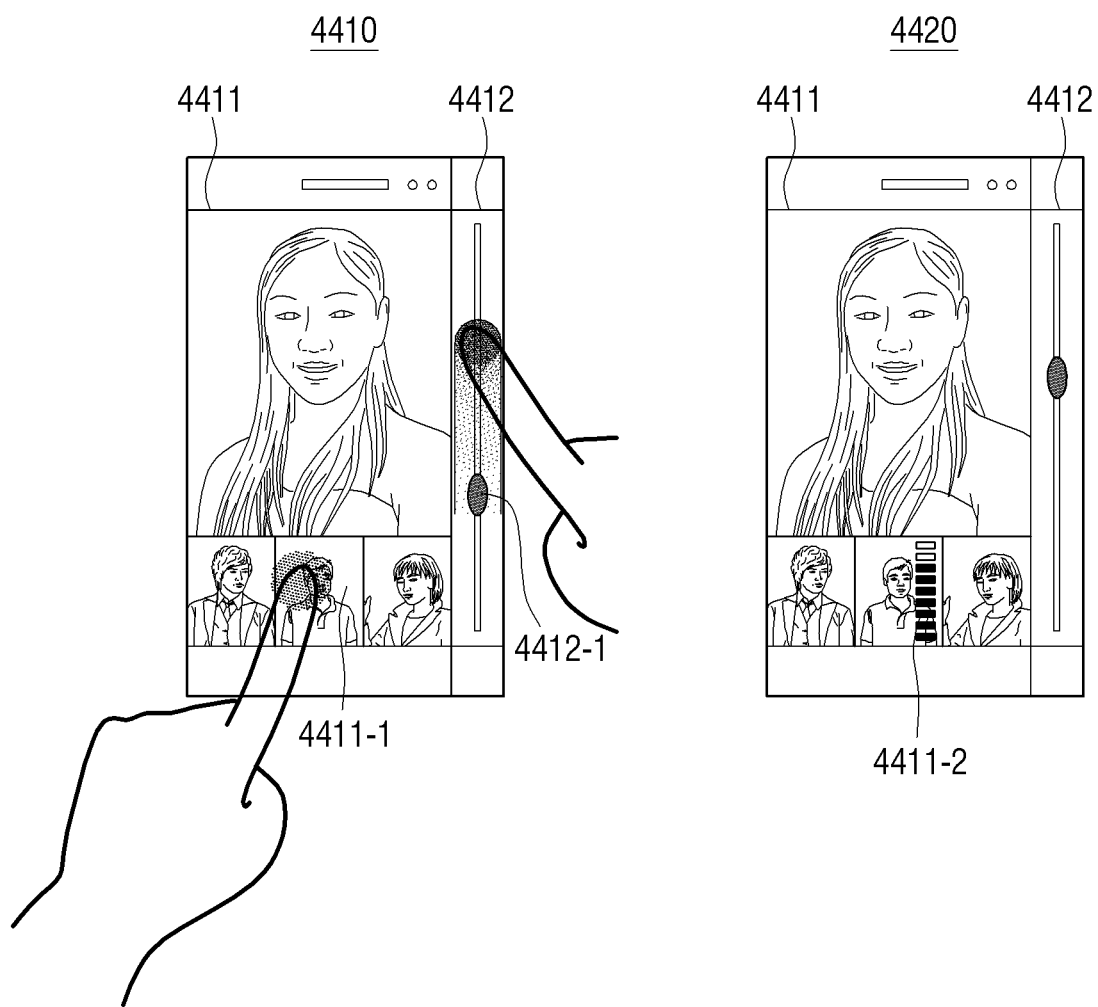

Referring to view 4410 of FIG. 44, the controller 190 may execute a telephone call application and control the display 130 to display a screen showing that the user are video calling with other persons on a front display area 4411. In addition, the controller 190 may control the display 130 to display a UI element 4412-1 for controlling image content on a side display area 4412. In this state, the sensor 180 may detect a user input selecting identification information of one person 4411-1 from among the identification information of other persons on the front display area 4412, and touching the UI element 4412-1 on the side display area 4412 and then dragging along the longitudinal side. In response to the user input, the controller 190 may control the speaker 170 to change the call volume for the selected one person as shown in view 4420 of FIG. 44. In addition, the controller 190 may control the display 130 to display an object 4411-2 indicating the change in the call volume.

Figure 45:
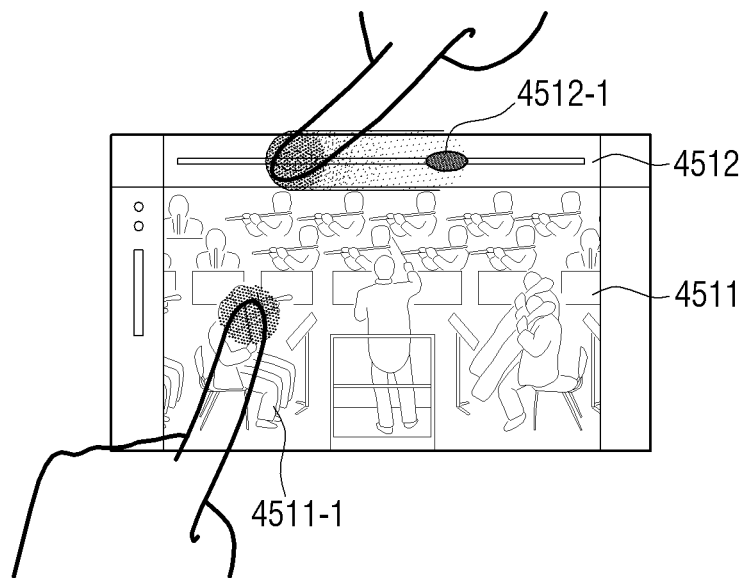
Figure 45:
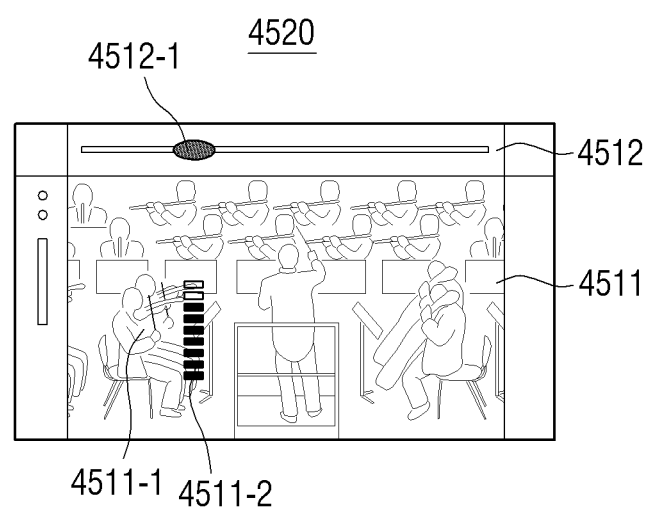

Referring to view 4510 of FIG. 45, the controller 190 may control the display 130 to display a screen including a plurality of objects on a front display area 4511. In this case, the plurality of objects may provide different sounds. For example, the objects may provide different instrument sounds such as a piano sound or a violin sound, or different human voices. In addition, the controller 190 may control the display 130 to display a UI element 4512-1 for controlling image content on a side display area 4512. In this state, the sensor 180 may detect a user input selecting one object 4511-1 from among the plurality of objects on the front display area 4511, and touching the UI element 4512-1 on the side display area 4512 and then dragging along the longitudinal side. In response to the user input, the controller 190 may control the speaker 170 to change the volume of the sound outputted from the selected object as shown in view 4520 of FIG. 45. In addition, the controller 190 may control the display 130 to display an object 4511-2 indicating the change in the volume of the sound.

Figure 46:
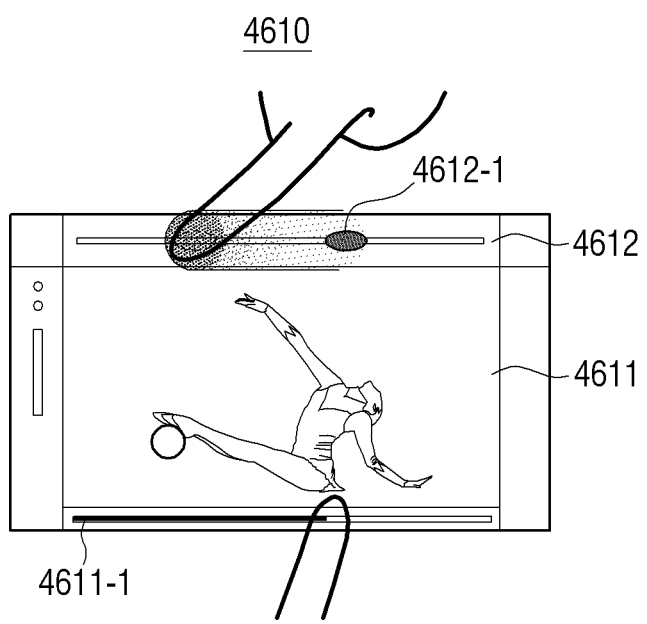
Figure 46:
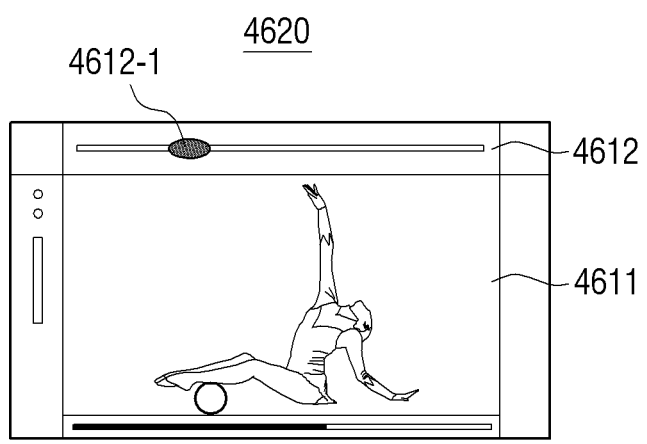

Referring to view 4610 of FIG. 46, the controller 190 may execute a media application and control the display 130 to display an image content (for example, a moving image) and a UI element 4611-1 for controlling the image content on a front display area 4611. The UI element 4611-1 may be a UI element related to a replay of the image content, for example, and the user may perform a function of adjusting a stop of the image content, a pause of the image content, a start of the image content or a replay time of the image content, using the UI element 4611-1. In addition, the controller 190 may control the display 130 to display a UI element 4612-1 for controlling the image content on a side display area 4612. In this state, the sensor 180 may detect a user input selecting the UI element 4611-1 to adjust the replay time of the image content, and touching the UI element 4612-1 on the side display area 4612 and then dragging along the longitudinal side. In response to the user input, the controller 190 may control the display 130 to minutely adjust the replay time of the image content (for example, 1 to 10 seconds) and display the image content, as shown in view 4620 of FIG. 46.

Figure 47:
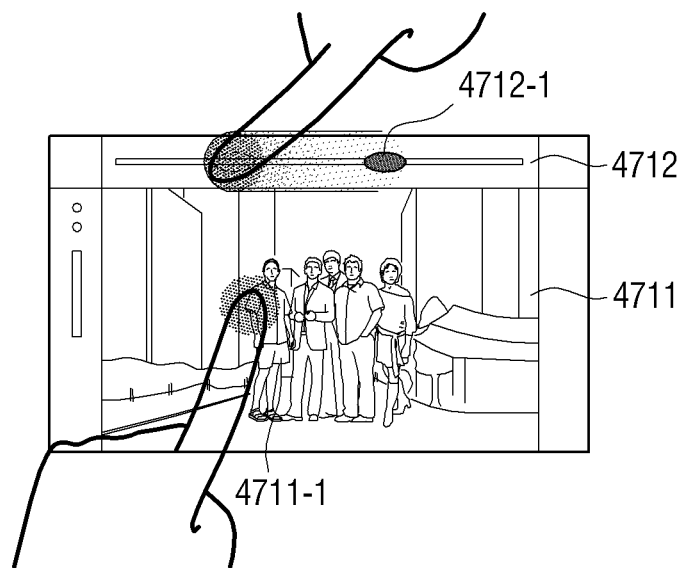
Figure 47:
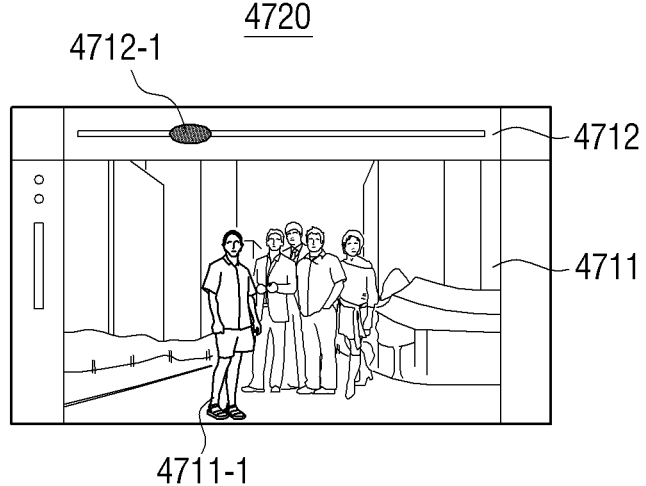

Referring to view 4710 of FIG. 47, the controller 190 may control the display 130 to display 3D objects on a front display area 4711. In addition, the controller 190 may control the display 130 to display a UI element 4712-1 for controlling image content on a side display area 4712. In this state, the sensor 180 may detect a user input selecting one object 4711-1 from among the 3D objects, and touching the UI element 4712-1 on the side display area 4712 and then dragging along the longitudinal side. In response to the user input, the controller 190 may control the display 130 to change the depth of the selected object 4711-1 and display the object 4711-1 as shown in view 4720 of FIG. 47.

Figure 48:
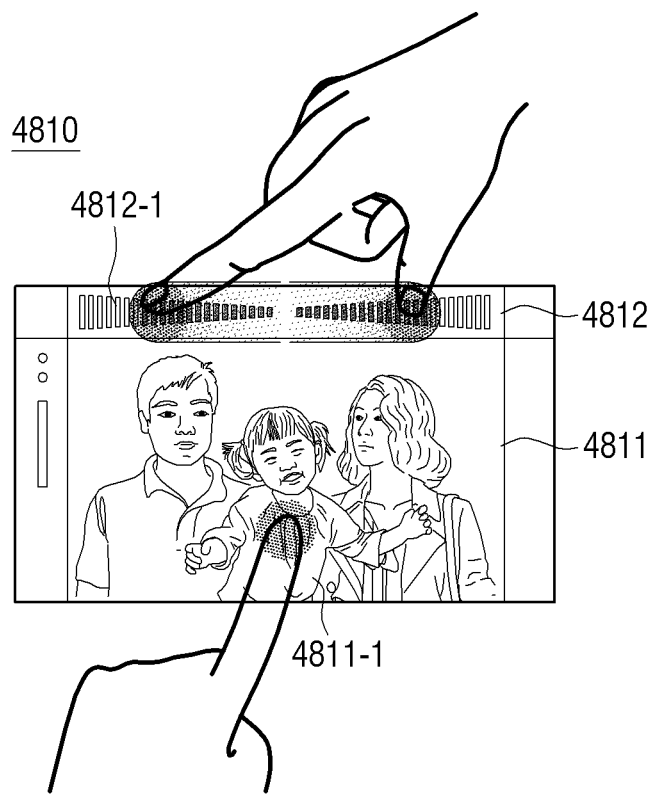
Figure 48:
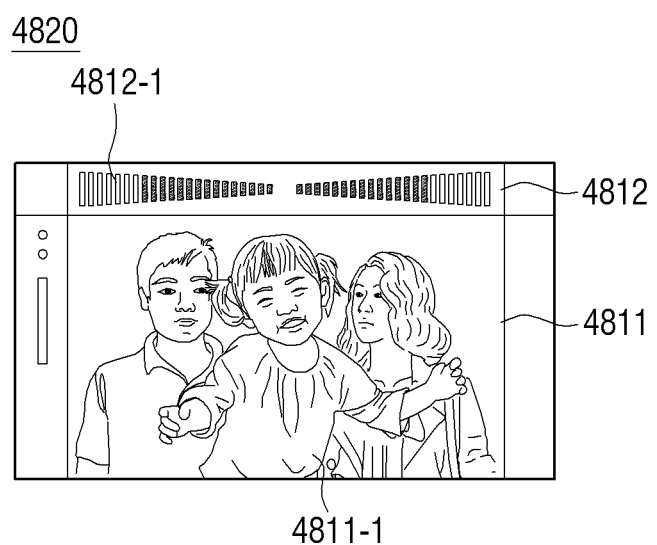

Referring to view 4810 of FIG. 48, the controller 190 may control the display 130 to display 3D objects on a front display area 4811. In addition, the controller 190 may control the display 130 to display a UI element 4812-1 for controlling image content on a side display area 4812. In this state, the sensor 180 may detect a user input selecting one object 4811-1 from among the 3D objects on the front display area 4812, and multi-touching the UI element 4812-1 on the side display area 4812 and then dragging to move user's two fingers further apart. In response to the user input, the controller 190 may control the display 130 to change the size of the selected object 4811-1 and display the object 4811-1 as shown in view 4820 of FIG. 48.

FIGS. 49 to 54 are views showing a process in which a electronic device 100 has a different capacitance for each display area according to exemplary embodiments.

According to an exemplary embodiment, the controller 190 may control the sensor 180 to have a different capacitance according to whether the cover of the bent display is opened or closed.

Figure 49:
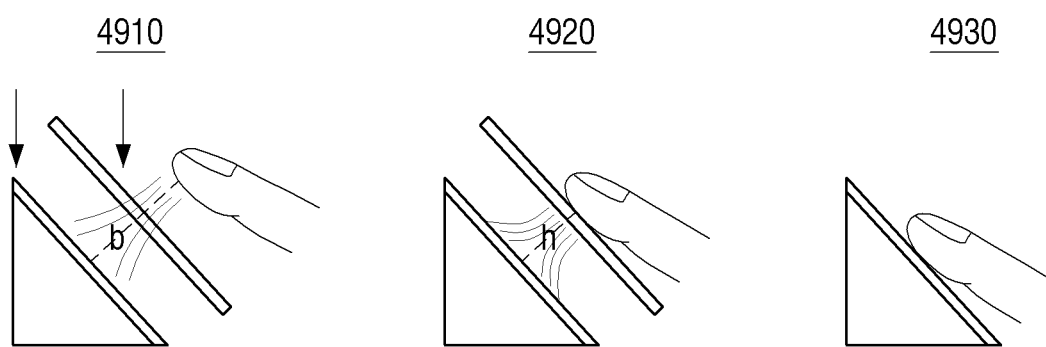
FIGS. 49 to 54 are views showing a process in which a electronic device has a different capacitance for each display area according to exemplary embodiments.

FIG. 49 is a view showing an exemplary embodiment in which the sensor 180 provides capacitances in different ways to receive a user input on a bent display area. For example, as shown in view 4910 of FIG. 49, the sensor 180 may provide a capacitance greater than a predetermined value to detect a hovering gesture of the user over the transparent cover of the bent display. Alternatively, as shown in view 4920 of FIG. 49, the sensor 180 may provide a capacitance lower than a predetermined value to detect a touch gesture of the user on the transparent cover of the bent display. Alternatively, as shown in view 4930 of FIG. 49, the sensor 180 may provide a capacitance lower than the capacitance of view 4920 of FIG. 49 to detect a touch gesture of the user on the bent display which is not covered by the transparent cover.

According to another exemplary embodiment, the controller 190 may control the sensor 180 to have a different capacitance according to a display area. The method for providing a different capacitance according to a display area may be applied to both a touch sensor and a pen recognition sensor. For example, this method may be applied to all of the capacitive touch and pen touch combining method, the capacitive touch and EMR pen recognition combining method, and the touch and pen integrated C-pen method. According to another exemplary embodiment, the input recognition or the processing of input may be based on the capacitance of the display area. Thresholds or predetermined values of capacitance may be used to detect input, process input and perform functions based on whether the detected capacitance is greater than or less than the thresholds or predetermined values.

Figure 50A:
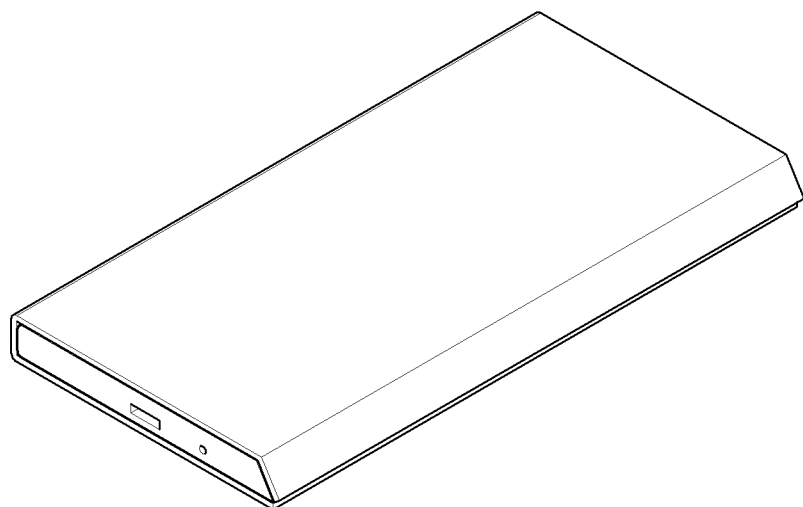
Figure 50A:
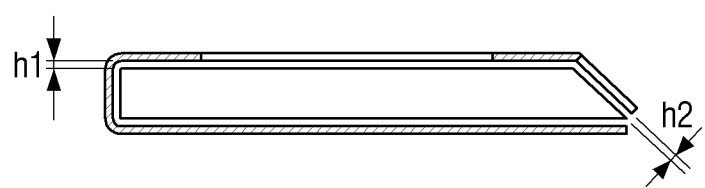

Referring to FIG. 50A, when the entirety of the bent display area of the electronic device 100 is covered by the cover, a distance h1 between the front display area and the cover and a distance h2 between the side display area and the cover may be different. This may be because the covering shape of the cover is different. For example, when the cover corresponding to the side display area covers in a curved shape, the distance between the side display area and the cover may increase. In this case, when the same capacitance is applied to the front display area and the side display area, the user may feel a difference in the touch sensitivity between the two areas.

Accordingly, the controller 190 may control the sensor 180 to have a different capacitance according to a bent display area such that two areas have the same or similar touch sensitivity. In other words, the controller 190 may provide different capacitances to the front display area and the side display area. For example, the controller 190 may provide the side display area with a higher capacitance than that of the front display area.

Figure 50B:
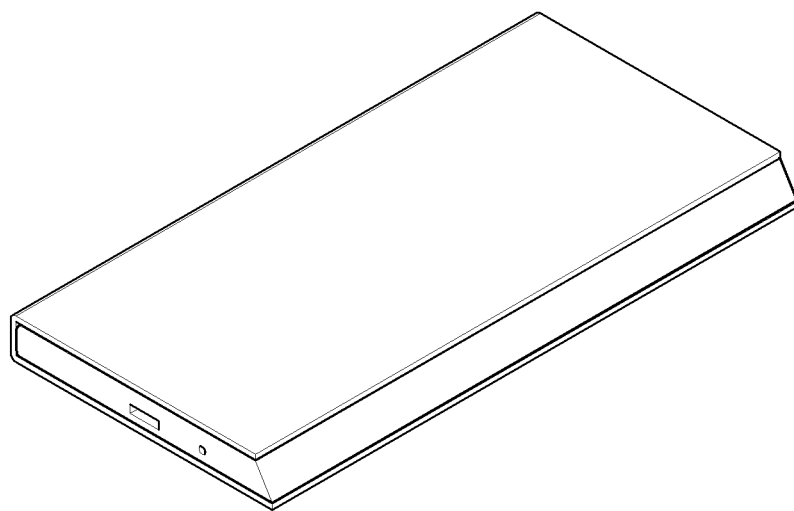
Figure 50B:

In another example, when the front display area of the electronic device 100 is covered by the cover as shown in FIG. 50B, and the same capacitance is applied to the front display area and the side display area, there is a difference in the touch sensitivity between the two areas. That is, the touch sensitivity of the front display area may be lower than that of the side display area. Therefore, the controller 190 may provide different capacitances to the front display area and the side display area such that the two areas have the same or similar touch sensitivity. For example, the controller 190 may provide the side display area with a lower capacitance than that of the front display area.

Figure 51:
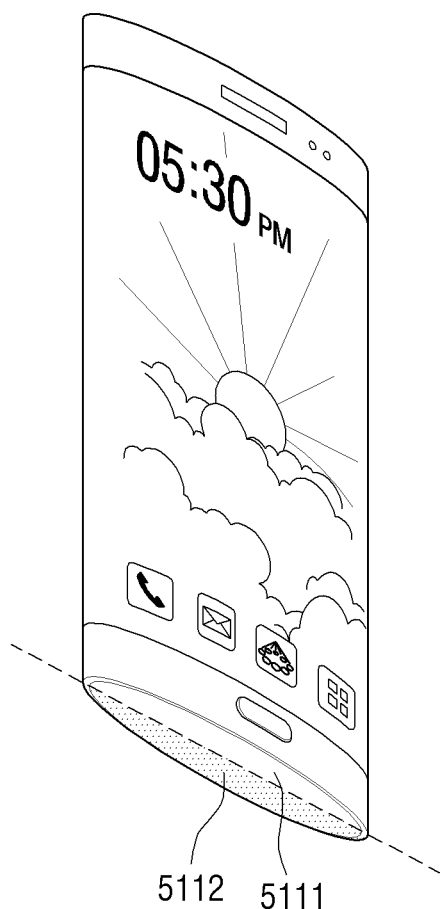
Figure 51:
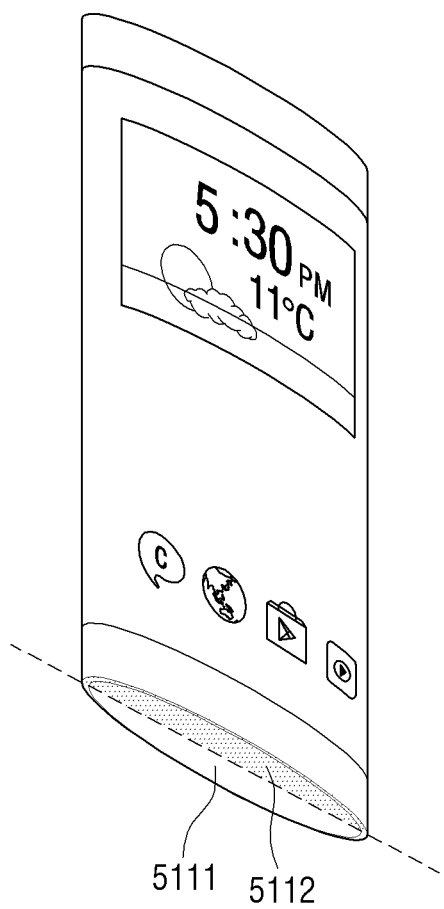

Referring to FIG. 51, in the electronic device 100 in which a touch input is possible on the front surface and the rear surface, the controller 190 may provide a different capacitance to a different display area according to the state, orientation, or posture of the electronic device 100. For example, when the front surface of the electronic device 100 is located in front of the user as shown in view 5110 of FIG. 51, the controller 190 may provide a capacitance greater than a predetermined value to the front surface 5111 of the electronic device 100 such that a user touch can be detected on the front surface 5111, and provide a capacitance lower than a predetermined value or may not provide a capacitance to the rear surface 5112 of the electronic device 100 such that a user touch is not detected on the rear surface 5112. Therefore, when the user grips the electronic device 100, malfunction which may be caused by a touch on the rear surface 5112 of the electronic device 100 can be reduced or removed. Alternatively, when the rear surface of the electronic device 100 is located in front of the user as shown in view 5120 of FIG. 51, the controller 190 may provide a capacitance greater than a predetermined value to the rear surface 5112 of the electronic device 100 such that a user touch can be detected on the rear surface 5112, and provide a capacitance lower than a predetermined value or may not provide a capacitance to the front surface 5111 of the electronic device 100 such that a user touch is not detected on the front surface 5111. Therefore, when the user grips the electronic device 100, malfunction which may be caused by a touch on the front surface 5111 of the electronic device 100 can be reduced or removed.

Figure 52:
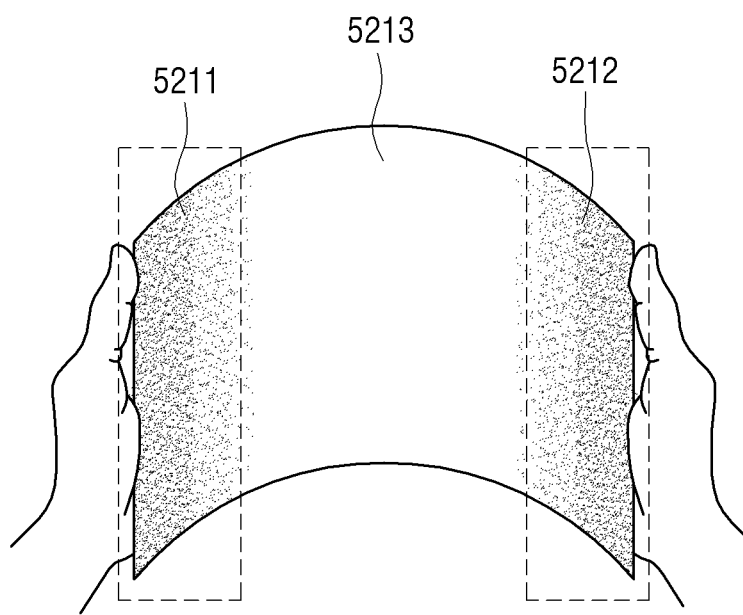

Referring to FIG. 52, in the electronic device 100 with a flexible display, the controller 190 may provide a different capacitance according to an area of the flexible display. For example, the capacitance in areas 5211 and 5212 where a user touch is frequently performed may be higher than that of the other area 5213. Therefore, the touch sensitivity of the areas 5211 and 5212 where a touch is frequently performed is higher than that of the other display area, and the user can easily manipulate the flexible display.

Figure 53:
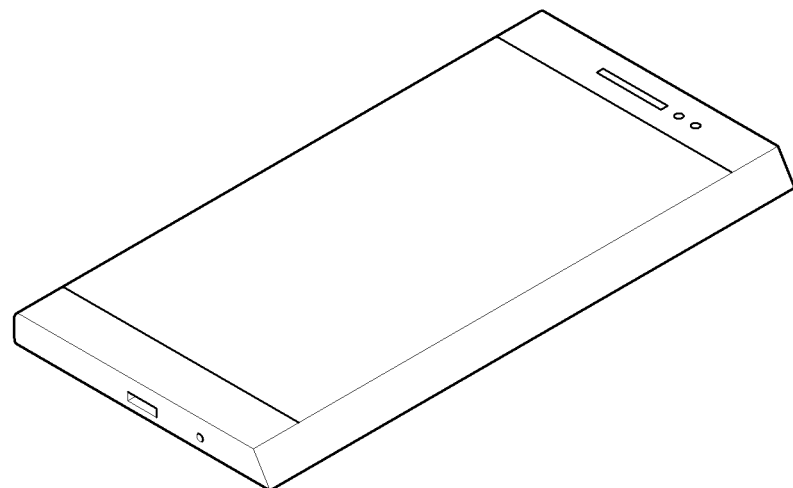
Figure 53:
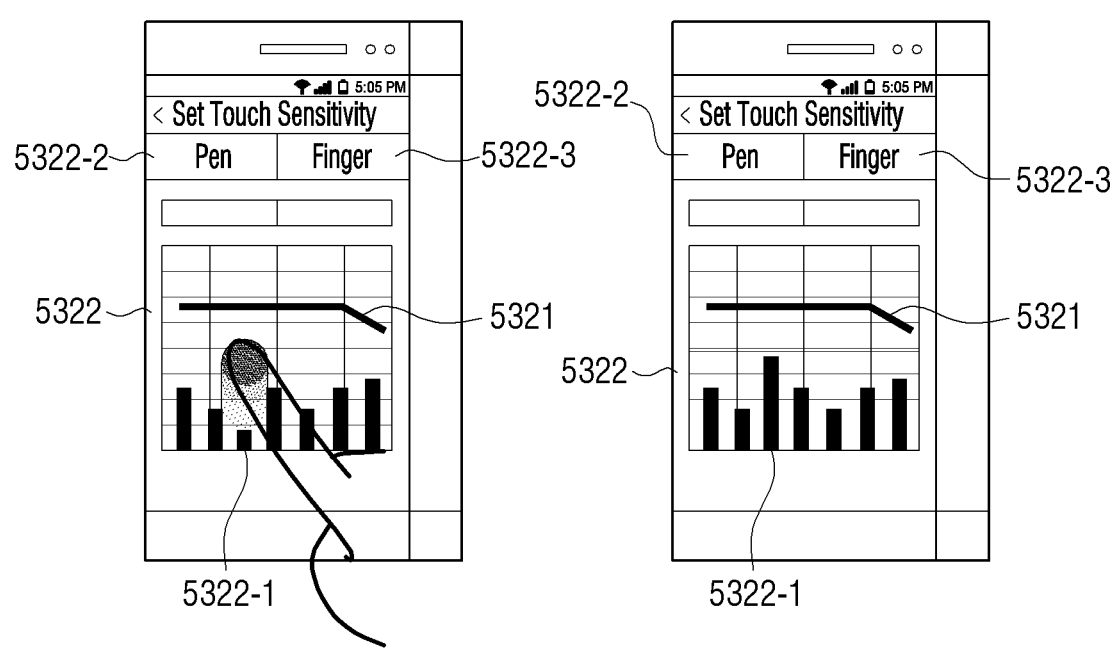

Referring to FIG. 53, the controller 190 may provide a menu to adjust the touch sensitivity of a bent display area. For example, when the display area is a bent displayer area which is divided into a front display area and a side display area as shown in view 5310 of FIG. 53, the controller 190 may provide a graphic 5321 indicating the shape of the bent display area through a touch sensitivity adjustment menu 5322 as shown in view 5320 of FIG. 53. In this case, the menu 5322 may display at least one of a UI element 5322-1 for adjusting the touch sensitivity, a UI element 5322-3 for selecting finger touch sensitivity as touch sensitivity to be adjusted, and a UI element 5322-2 for selecting pen touch sensitivity as touch sensitivity to be adjusted. In this state, the user may adjust the touch sensitivity for each area of the bent display using the UI element 5322-1 for adjusting the touch sensitivity for each display area. For example, the user may touch and drag one of the graphs indicating the touch sensitivity for respective areas of the bent display. As a result of the adjusting, the controller 190 may control the display 130 to display a screen indicating that the touch sensitivity of one area of the bent display area has been adjusted, as shown in view 5330 of FIG. 53.

Figure 54:
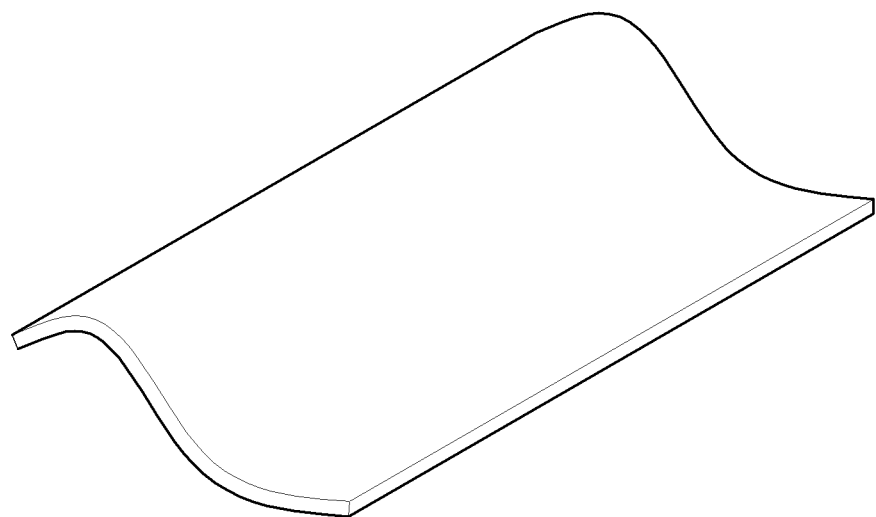
Figure 54:
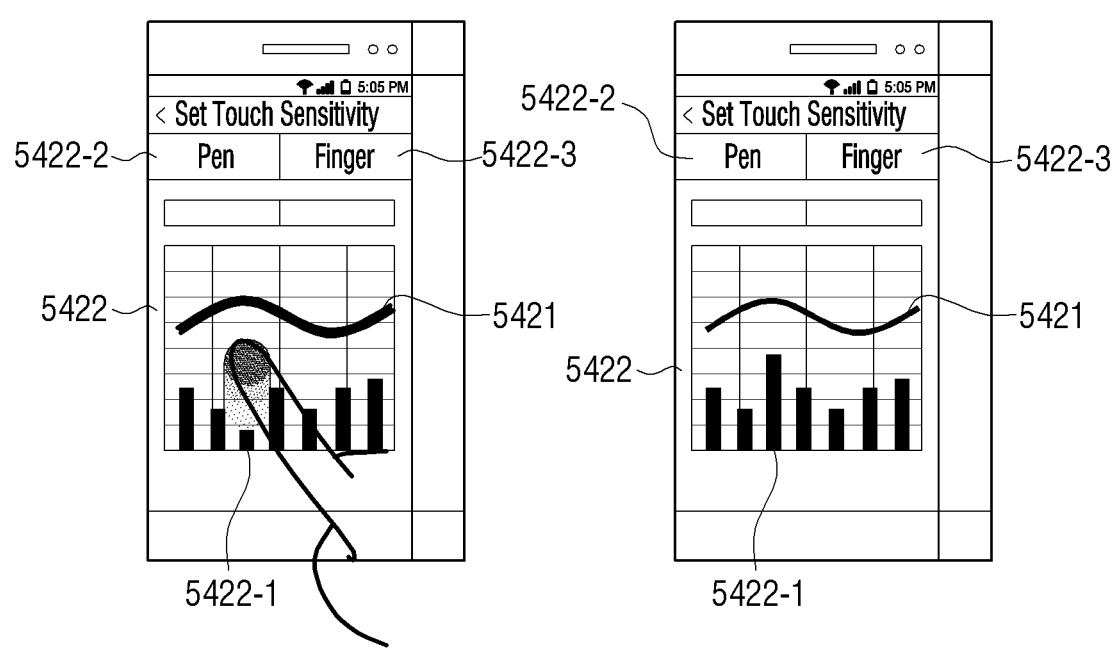

Referring to FIG. 54, the controller 190 may provide a menu to adjust the touch sensitivity of a flexible display area. For example, when the display area is a flexible display area as shown in view 5410 of FIG. 54, the controller 190 may provide a graphic 5421 indicating the shape of the flexible display area through a touch sensitivity adjustment menu as shown in view 5420 of FIG. 54. In this case, the menu may display at least one of a UI element 5422-1 for adjusting the touch sensitivity, a UI element 5422-3 for selecting finger touch sensitivity as touch sensitivity to be adjusted, and a UI element 5422-2 for selecting pen touch sensitivity as touch sensitivity to be adjusted. In this state, the user may adjust the touch sensitivity for each area of the flexible display using the UI element 5422-1 for adjusting the touch sensitivity for each flexible display area. For example, the user may touch and drag one of the graphs indicating the touch sensitivity for respective areas of the flexible display. As a result of the adjusting, the controller 190 may control the display 130 to display a screen indicating that the touch sensitivity of one area of the flexible display area has been adjusted, as shown in view 5430 of FIG. 54. The touch sensitivity of the display may be adjusted for each area of a plurality of areas of the touch display and may be adjusted to vary depending on the type of input device being used.

Figure 55:
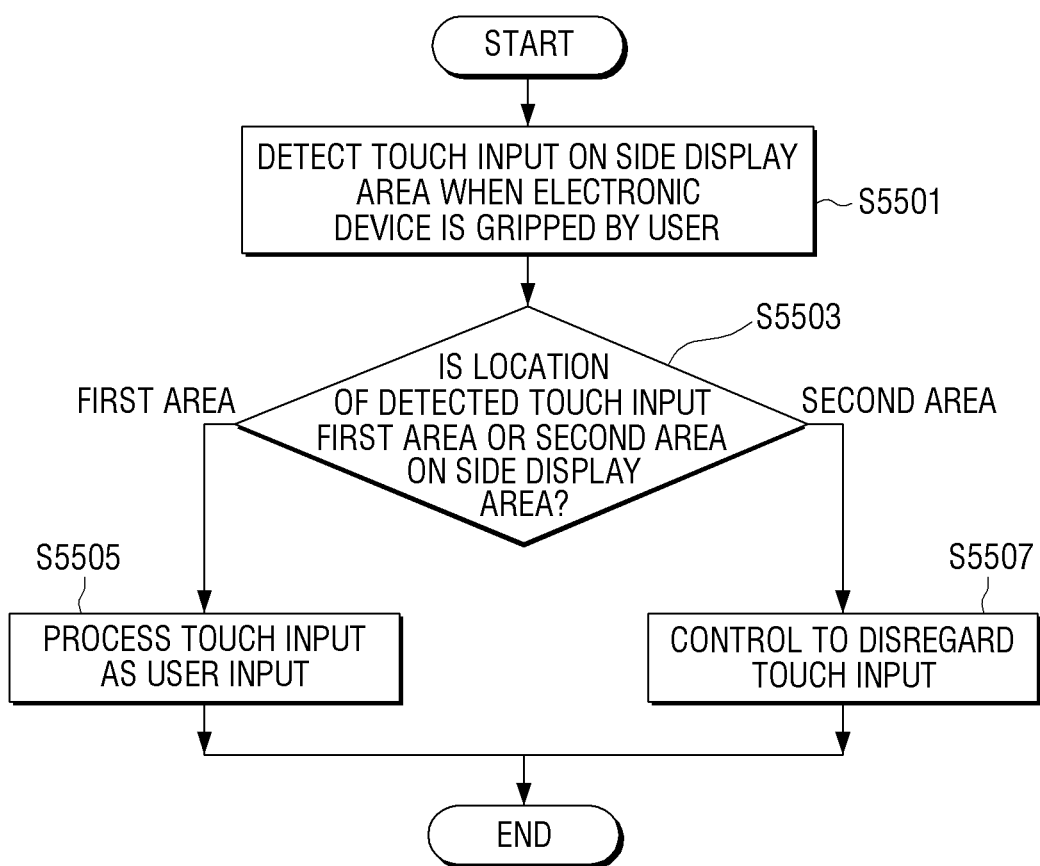
FIGS. 55 and 56 are flowcharts to explain a method for controlling a electronic device according to exemplary embodiments.
Figure 56:
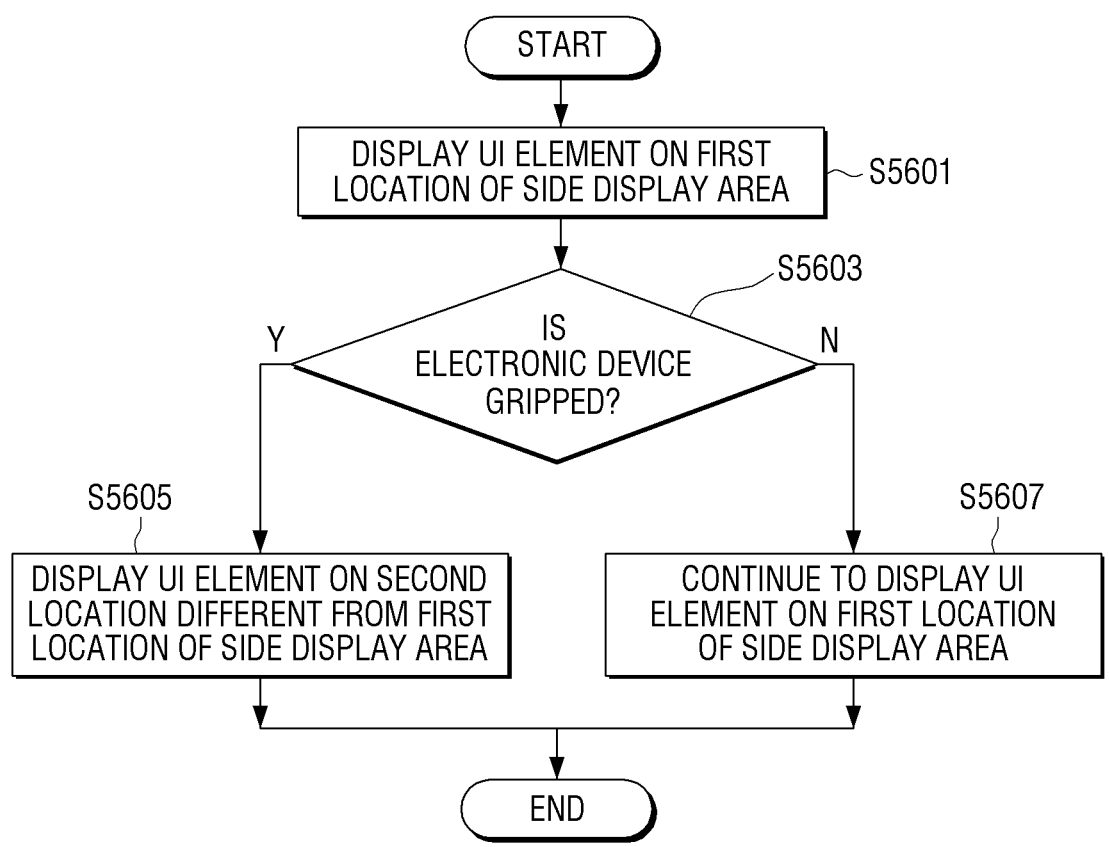

FIGS. 55 and 56 are flowcharts to illustrate a method for controlling a electronic device 100 according exemplary embodiments.

Referring to FIG. 55, in the state in which the electronic device 100 is gripped by the user, the electronic device 100 may detect a touch input on the side display area (operation S5501).

The electronic device 100 may determine whether the location of the detected touch input is a first area of the side display area or a second area of the side display area different from the first area (operation S5503).

In response to the touch input being detected on the first area of the side display area, the electronic device 100 may process the touch input as a user input (operation S5505). On the other hand, in response to the touch input being detected on the second area of the side display area, the electronic device 100 controls to disregard the touch input (operation S5507). For example, the controlling to disregard the touch input may include deactivating a touch sensor corresponding to the second area or not processing information related to the touch input through the touch sensor corresponding to the second area. In addition, the processing the touch input as the user input may include performing a function related to a UI element in response to a touch input touching the UI element displayed on the first area being detected.

Referring to FIG. 56, the electronic device 100 may display a UI element on a first location of the side display area (operation S5601).

While the UI element is displayed, the electronic device 100 may determine whether the electronic 100 is gripped or not (operation S5603).

In response to the electronic device 100 being gripped (operation S5603-Y), the electronic device 100 may display the UI element on a second location of the side display area different from the first location (operation S5605). On the other hand, in response to the electronic device 100 not being gripped (operation S5603-N), the electronic device 100 may continue to display the UI element on the first location of the side display area (S5607).

Figure 57:
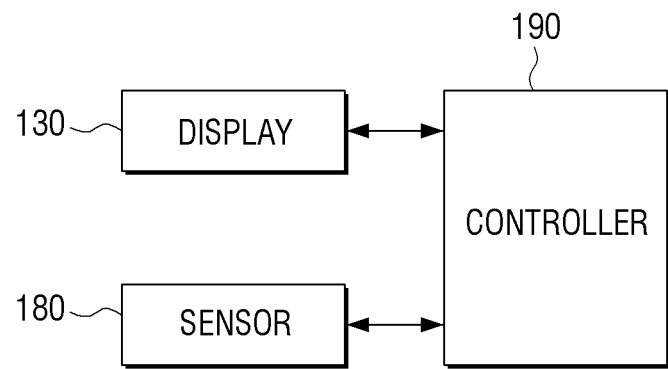
FIG. 57 is a block diagram showing a configuration of a electronic device according to another exemplary embodiment.

FIG. 57 is a block diagram showing a configuration of a electronic device 100 briefly according to another exemplary embodiment.

Referring to FIG. 57, the electronic device 100 includes a display 130, a sensor 180, and a controller 190. The configurations of the display 130, the sensor 180, and the controller 190 have been described above and thus a redundant explanation is omitted. The display 130 may be connected with the front area and the side area of the electronic device 100 in the form of a bent or deformed display.

According to an exemplary embodiment, in the state in which the electronic device 100 is gripped by the user, the sensor 180 may detect a touch input on the side display area.

In response to the touch input being detected on a first area of the side display area through the sensor 180, the controller 190 may process the touch input as a user input, and, in response to the touch input being detected on a second area of the side display area different from the first area, the controller 190 may control to disregard or discard the touch input.

According to another exemplary embodiment, while a UI element is displayed on a first location of the side display area, the controller 190 may determine whether the electronic device 100 is gripped by the user based on information acquired through the sensor 180. In response to the electronic device 100 being gripped, the controller 190 may display the UI element on a second location of the side display area different from the first location.

The control method of the electronic device 100 according to various exemplary embodiments may be implemented as a program and provided to the electronic device 100. Specifically, a non-transitory computer readable medium in which the program including the control method of the electronic device 100 is stored may be provided.

The non-transitory computer readable medium refers to a medium that stores data semi-permanently rather than storing data for a very short time, such as a register, a cache, and a memory, and is readable by an apparatus. Specifically, the above-described programs may be stored in a non-transitory computer readable medium such as a compact disc (CD), a digital versatile disk (DVD), a hard disk, a Blu-ray disk, a universal serial bus (USB), a memory card, and a read only memory (ROM), and may be provided. In addition, the above-described programs may be stored in the storage 150 of the electronic device 100, as an example of the non-transitory computer readable medium, and provided.

The foregoing exemplary embodiments and advantages are merely exemplary and are not to be construed as limiting the present inventive concept. The exemplary embodiments can be readily applied to other types of apparatuses. The description of the exemplary embodiments is intended to be illustrative, and not to limit the scope of the claims, and many alternatives, modifications, and variations will be apparent to those skilled in the art.

What is claimed is:

1. An electronic device comprising:
    a display comprising a main display area and a curved auxiliary display area that is extended from the main display area in an integrated manner, is curved toward one side of the main display area, and is smaller than the main display area;
    a detector configured to detect a first touch input on the display; and
    a controller configured to:

control the display to provide first information on the main display area;

control the display to provide second information on a first area of the curved auxiliary display area, wherein the second information comprises at least one user interface element, and the first area is an inactive touch input area in which any user interface element cannot be activated by a touch input;

determine whether the electronic device is gripped by a hand of a user while the first information is provided on the main display area and the second information is provided on the first area of the curved auxiliary display area, based on the first touch input that is detected on the main display area and the curved auxiliary display area; and in response to the electronic device being determined to be gripped by the hand while the first information is provided on the main display area and the second information is provided on the first area of the curved auxiliary display area:

determine a second area of the curved auxiliary display area, the second area being contacted by a thumb of the hand while the electronic device is gripped by the hand, based on the first touch input that is detected on the main display area and the curved auxiliary display area, wherein the second area is an active touch input area in which any user interface element can be activated by a touch input; and control the display to move the second information provided on the curved auxiliary display area, from the first area of the curved auxiliary display area to the second area that is determined, while maintaining the first information provided on the main display area, wherein the detector is further configured to detect a user input of dragging the at least one user interface element provided on the second area, from the second area to the first area, while the electronic device is gripped by the hand, and the controller is further configured to, based on the user input of dragging the at least one user interface element being detected while the electronic device is gripped by the hand, control the display to provide the at least one user interface element on the first area, wherein the at least one user interface element provided on the first area cannot be activated by a touch input.

2. The electronic device as claimed in claim 1, wherein the controller is further configured to, while the electronic device is determined to be gripped by the hand, disregard a second touch input on the first area of the curved auxiliary display area, the first area being untouchable by the thumb while the electronic device is gripped by the hand.

3. The electronic device as claimed in claim 1, wherein the detector is further configured to detect a second touch input on the display, and the controller is further configured to:

determine whether the electronic device is gripped differently by the hand while the first information is provided on the main display area and the second information is provided on the curved auxiliary display area, based on the second touch input that is detected; and in response to the electronic device being determined to be gripped differently by the hand while the first information is provided on the main display area and the second information is provided on the curved auxiliary display area, control the display to move the second information provided on the curved auxiliary display area to the first area of the curved auxiliary display area without the second touch input that is detected, while maintaining the first information provided on the main display area.

4. The electronic device as claimed in claim 3, wherein the controller is further configured to, in response to the electronic device being determined to be gripped differently by the hand while the first information is provided on the main display area and the second information is provided on the curved auxiliary display area, control the display to move, based on a rotation state of the electronic device, the second information provided on the curved auxiliary display area to the first area of the curved auxiliary display area without the second touch input that is detected, while maintaining the first information provided on the main display area.

5. The electronic device as claimed in claim 1, wherein the controller is further configured to determine whether the electronic device is gripped by the hand while the first information is provided on the main display area and the second information is provided on the curved auxiliary display area, based on a motion of the electronic device and a location of the first touch input that is detected on any one or any combination of the main display area, the curved auxiliary display area, and a rear surface of the electronic device.

6. A display method of an electronic device comprising a display comprising a main display area and a curved auxiliary display area that is extended from the main display area in an integrated manner, is curved toward one side of the main display area, and is smaller than the main display area, the method comprising:

providing first information on the main display area;

providing second information on a first area of the curved auxiliary display area, wherein the second information comprises at least one user interface element, and the first area is an inactive touch input area in which any user interface element cannot be activated by a touch input;

determining whether the electronic device is gripped by a hand of a user while the first information is provided on the main display area and the second information is provided on the first area of the curved auxiliary display area, based on a first touch input that is detected on the main display area and the curved auxiliary display area;

in response to the electronic device being determined to be gripped by the hand while the first information is provided on the main display area and the second information is provided on the first area of the curved auxiliary display area:

determining a second area of the curved auxiliary display area, the second area being contacted by a thumb of the hand while the electronic device is gripped by the hand, based on the first touch input that is detected on the main display area and the curved auxiliary display area, wherein the second area is an active touch input area in which any user interface element can be activated by a touch input; and moving the second information provided on the curved auxiliary display area, from the first area of the curved auxiliary display area to the second area that is determined, while maintaining the first information provided on the main display area;

detecting a user input of dragging the at least one user interface element provided on the second area, from the second area to the first area, while the electronic device is gripped by the hand; and based on the user input of dragging the at least one user interface element being detected while the electronic device is gripped by the hand, providing the at least one user interface element on the first area, wherein the at least one user interface element provided on the first area cannot be activated by a touch input.

7. The method as claimed in claim 6, further comprising, while the electronic device is determined to be gripped by the hand, disregarding a second touch input on the first area of the curved auxiliary display area, the first area being untouchable by the thumb while the electronic device is gripped by the hand.

8. The method as claimed in claim 6, further comprising:
detecting a second touch input on the display;
determining whether the electronic device is gripped differently by the hand while the first information is provided on the main display area and the second information is provided on the curved auxiliary display area, based on the second touch input that is detected; and
in response to the electronic device being determined to be gripped differently by the hand while the first information is provided on the main display area and the second information is provided on the curved auxiliary display area, moving the second information provided on the curved auxiliary display area to the first area of the curved auxiliary display area without the second touch input that is detected, while maintaining the first information provided on the main display area.

9. The method as claimed in claim 8, wherein the moving the second information comprises, in response to the electronic device being determined to be gripped differently by the hand while the first information is provided on the main display area and the second information is provided on the curved auxiliary display area, moving, based on a rotation state of the electronic device, the second information provided on the curved auxiliary display area to the first area of the curved auxiliary display area without the second touch input that is detected, while maintaining the first information provided on the main display area.

10. The method as claimed in claim 6, wherein the determining whether the electronic device is gripped comprises determining whether the electronic device is gripped by the hand while the first information is provided on the main display area and the second information is provided on the curved auxiliary display area, based on a motion of the electronic device and a location of the first touch input that is detected on any one or any combination of the main display area, the curved auxiliary display area, and a rear surface of the electronic device.

11. The electronic device as claimed in claim 1, wherein the detector is further configured to detect a user input of removing the thumb from the curved auxiliary display area while the electronic device is gripped by the hand, and
the controller is further configured to control the display to move the second information provided on the curved auxiliary display area toward the second area that is determined, while maintaining the first information provided on the main display area, in response to the user input of removing the thumb being detected while the electronic device is gripped by the hand.

12. The electronic device as claimed in claim 2, wherein the controller is further configured to, in response to the electronic device being determined to be gripped by the hand while the first information is provided on the main display area and the second information is provided on the curved auxiliary display area:
determine a third area of the curved auxiliary display area to be a range from a first location touchable by bending the thumb to a second location touchable by stretching the thumb, based on the first touch input that is detected, a posture of the electronic device, an orientation of the electronic device, an age of the user, a sex of the user, a size of the hand, and a fourth area that is touched by a palm of the user; and
control the display to move the second information provided on the curved auxiliary display area to the third area that is determined, while maintaining the first information provided on the main display area.

13. The electronic device as claimed in claim 1, wherein the second area is immediately underneath the thumb when the second area is contacted by the thumb, and
wherein the first area is not immediately underneath the thumb when the second area is contacted by the thumb.

* * * * *